United States Patent [19]
Takagi et al.

[11] Patent Number: 5,412,578
[45] Date of Patent: May 2, 1995

[54] METHOD AND DEVICE FOR PATTERN FORM RECOGNITION AND AUTOMATIC PATTERN MATCH CUTTING DEVICE

[75] Inventors: Yoichi Takagi, Hitachi; Kazunori Fujiwara, Katsuta, both of Japan

[73] Assignee: Hitachi, Ltd., Tokyo, Japan

[21] Appl. No.: 142,556

[22] Filed: Oct. 22, 1993

[30] Foreign Application Priority Data

Oct. 30, 1992 [JP] Japan .................. 4-292419

[51] Int. Cl.⁶ .............................. G06F 15/46
[52] U.S. Cl. ..................... 364/474.34; 364/474.22; 364/470
[58] Field of Search ............ 382/18, 21, 22, 51, 382/8, 37, 41, 44, 14, 30; 364/470, 474.22, 188; 358/252, 92, 101, 125, 166

[56] References Cited

U.S. PATENT DOCUMENTS

| | | | |
|---|---|---|---|
| 4,551,850 | 11/1985 | Werth et al. | 382/18 |
| 4,567,610 | 1/1986 | McConnell | 382/18 |
| 4,807,143 | 2/1989 | Matsuura | 364/470 |
| 4,823,194 | 4/1989 | Mishima et al. | 358/282 |
| 4,853,866 | 8/1989 | Andrad Galan et al. | 364/470 |
| 4,961,231 | 10/1990 | Nakayama et al. | 382/21 |
| 5,204,913 | 4/1993 | Morooka et al. | 382/8 |

FOREIGN PATENT DOCUMENTS

| | | |
|---|---|---|
| 63-98070 | 4/1988 | Japan . |
| 1-33587 | 7/1989 | Japan . |
| 1-250465 | 10/1989 | Japan . |
| 4-240261 | 8/1992 | Japan . |

Primary Examiner—James P. Trammell
Attorney, Agent, or Firm—Kenyon & Kenyon

[57] ABSTRACT

A pattern recognition method for a cloth having a striped or checked pattern form comprising the steps of: inputting the pattern image for displaying the same on a display screen for teaching; generating X and Y axis concentration accumulated projection histograms from the input screen image over one pitch of the pattern for the teaching; performing a shading correction on the generated projection histograms; selecting a characteristic quantity and an evaluation function of the corrected projection histogram for the pattern based on the input screen image and the corrected projection histograms; further generating X and Y axis concentration accumulated projection histograms from the input screen image over one pitch of the pattern form for the actual pattern recognition; further generating an evaluation function diagram of the corrected projection histograms based on the selected characteristic quantity and the evaluation function; and determining a key pattern position on the input screen image of the pattern based on the generated evaluation function diagrams.

19 Claims, 65 Drawing Sheets

HISTOGRAM BEFORE CORRECTION AND STANDARD HISTOGRAM

HISTOGRAM AFTER CORRECTION

PATTERN PITCH
DETERMINATION

H(x): X AXIS PROJECTION HISTOGRAM OF TEACHING SCREEN IMAGE $$\omega 1(\zeta) = \sum_{\kappa=0}^{m} H(\zeta + x\kappa)$$

: EVALUATION FUNCTION

CALCULATION STEPS OF $\omega 1$

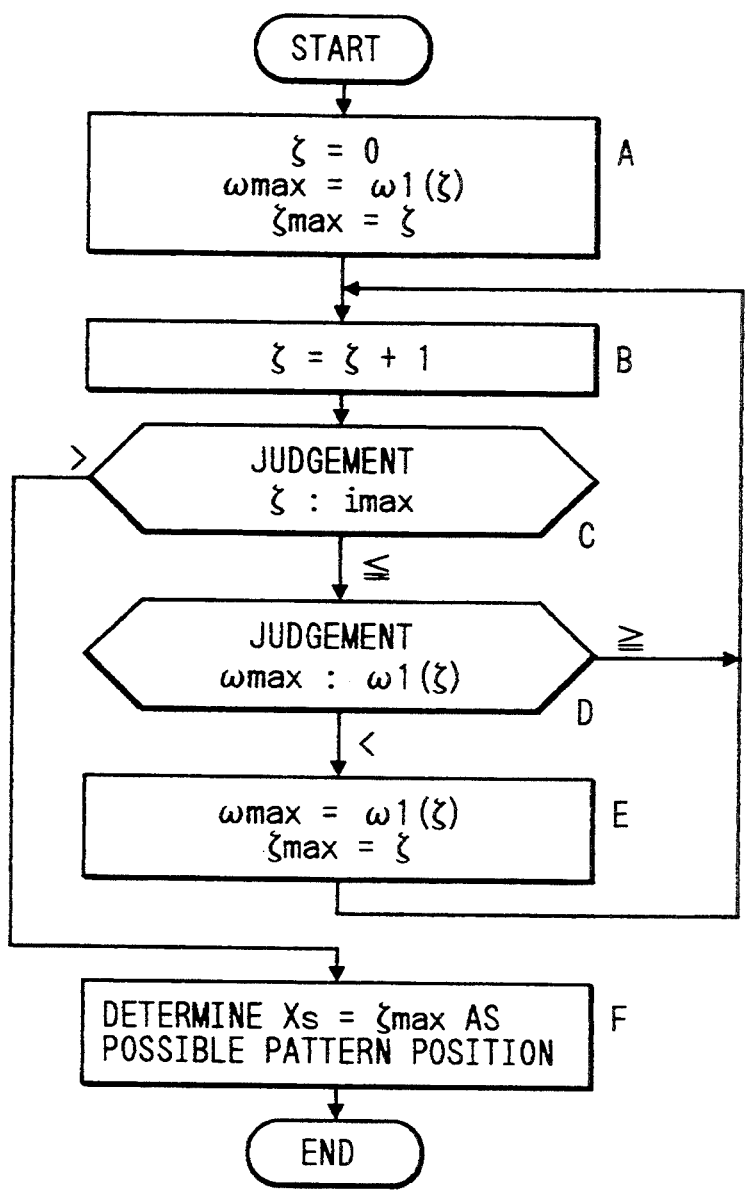

INPUT SCREEN IMAGE OF CLOTH

X AXIS PROJECTION HISTOGRAM

X AXIS PROJECTION HISTOGRAM $H(x)$ : X AXIS PROJECTION HISTOGRAM

CALCULATION RESULT OF PATTERN RECOGNITION EVALUATION FUNCTION $$\omega 2(\zeta) = \sum_{\beta=0}^{B} ABS(\Delta H(\zeta + \beta))$$

: PATTERN RECOGNITION EVALUATION FUNCTION

WAVY PATTERN DISPLAY MARK
(PREPARED BY OPERATOR DURING TEACHING OR PREPARED
AUTOMATICALLY VIA SCREEN IMAGE ANALYSIS AND
DISPLAYED FOR CONFIRMATION)

INPUT SCREEN IMAGE OF CLOTH

X AXIS PROJECTION HISTOGRAM

X AXIS PROJECTION HISTOGRAM $H(x)$ : X AXIS PROJECTION HISTOGRAM

CALCULATION RESULT OF PATTERN RECOGNITION EVALUATION FUNCTION $$\omega 3(\zeta) = \sum_{\beta=0}^{B} H(\zeta + \beta)$$

: PATTERN RECOGNITION EVALUATION FUNCTION

WAVY PATTERN DISPLAY MARK
(PREPARED BY OPERATOR DURING TEACHING OR PREPARED
AUTOMATICALLY VIA SCREEN IMAGE ANALYSIS AND
DISPLAYED FOR CONFIRMATION)

HIGH SPEED CALCULATION STEPS OF $\omega 3$

INPUT SCREEN IMAGE OF CLOTH

X AXIS PROJECTION HISTOGRAM

X AXIS PROJECTION HISTOGRAM $H(x)$ : X AXIS PROJECTION HISTOGRAM

CALCULATION RESULT OF PATTERN RECOGNITION EVALUATION FUNCTION $$\omega 4(\zeta) = \sum_{\beta=0}^{B} H(\zeta + \beta)$$

: PATTERN RECOGNITION EVALUATION FUNCTION

WAVY PATTERN DISPLAY MARK
(PREPARED BY OPERATOR DURING TEACHING OR PREPARED
AUTOMATICALLY VIA SCREEN IMAGE ANALYSIS AND
DISPLAYED FOR CONFIRMATION)

INPUT SCREEN IMAGE OF CLOTH

X AXIS PROJECTION HISTOGRAM $$\omega5(\zeta) = \sum_{\beta=-B1}^{B2} ABS(\Delta H(\zeta+\beta))$$

$\omega6(\kappa)$ : CREST HEIGHT ON HISTOGRAM

X AXIS PROJECTION HISTOGRAM $H(x)$ : X AXIS PROJECTION HISTOGRAM

CALCULATION RESULT OF PATTERN RECOGNITION EVALUATION FUNCTION $$\omega 5(\zeta) = \sum_{\beta=-B1}^{B2} ABS(\Delta H(\zeta+\beta))$$

$\omega 6(\kappa)$ : CREST HEIGHT ON HISTOGRAM

WAVY PATTERN DISPLAY MARK
(PREPARED BY OPERATOR DURING TEACHING OR PREPARED
AUTOMATICALLY VIA SCREEN IMAGE ANALYSIS AND
DISPLAYED FOR CONFIRMATION)

PROCESSING OF TWO X AXIS PROJECTION CONCENTRATION ACCUMULATED HISTOGRAMS

EXAMPLE OF PATTERN RECOGNITION PROCESS USING TWO X AXIS PROJECTION CONCENTRATION ACCUMULATED HISTOGRAMS AND TWO Y AXIS PROJECTION CONCENTRATION ACCUMULATION HISTOGRAMS

INPUT SCREEN IMAGE OF REPEATING CIRCULAR PATTERN

X AXIS PROJECTION HISTOGRAM

X AXIS PROJECTION
HISTOGRAM OF PORTION A

Y AXIS PROJECTION
HISTOGRAM OF PORTION B

PROCESS CONTENTS IN BOXES B AND F

AUTOMATIC OPTIMUM CHARACTERISTIC QUANTITY DETERMINATION (VIA TEACHING)

PATTERN POSITION DECISION PROCESS (PATTERN RECOGNITION EXECUTION)

PROCESSING OF X AXIS PROJECTION CONCENTRATION ACCUMULATED HISTOGRAM

BEAR DATA

AVERAGED DATA

PATTERN PITCH DETERMINATION $$\omega 7(\zeta) = \sum_{k=0}^{m} E(\zeta + Xk)$$

: EVALUATION FUNCTION

CALCULATION STEPS OF $\omega 7$

CALCULATION STEPS OF $Xs = \zeta\{AT\ MAX\ (\omega 7)\}$

F : CHARACTERISTIC
    QUANTITY

F : CHARACTERISTIC
    QUANTITY

F : CHARACTERISTIC
    QUANTITY

METHOD AND DEVICE FOR PATTERN FORM RECOGNITION AND AUTOMATIC PATTERN MATCH CUTTING DEVICE

BACKGROUND OF THE INVENTION

1. Field of the Invention

The present invention relates to pattern recognition method and device for position matching between a flat substance having a regularly repeating pattern on the surface thereof such as cloth, semiconductor wafer, wood board, metal plate, leather and paper, and a landscape photograph in which buildings and natural matters regularly appear, and a reference figure, and, in particular, relates to a pattern recognition method and device for position matching between a cloth with a pattern which is an object for cutting and a predetermined reference cutting pattern via an image processing, and relates to an automatic pattern match cutting device which performs cutting of the cloth with a pattern according to the predetermined reference cutting pattern.

2. Description of Related Art

Heretofore, in the case of pattern match cutting of a cloth with a pattern, the cloth is cut manually after a paper pattern is put on the cloth. Because such manual cutting is inferior in efficiency to the automated cutting of a cloth without a pattern, a demand for automation of pattern matching has been strong. Cutting devices directed to the automation of pattern matching are described, for example, in JP-A-1-250465(1989), JP-B-1-33587(1989) and the like.

In JP-A-1-250465(1989) a system for performing pattern matching while moving the contour of parts of cutting pattern through an operator after superposing both the pattern of a cloth from a camera and the contour of parts of cutting pattern on a display is disclosed. According to the system, a direct cutting can be made without use of a paper pattern.

In JP-B-1-33587(1989), which corresponds to U.S. Pat. No. 4,853,866, a full automatic pattern match cutting device is realized by performing pattern recognition of a cloth having a pattern through an image processor. This is a system in which the effect can be expected in the case of pattern match cutting of a cloth having a clear pattern. Further, a method in which the operator performs pattern matching manually by using an image on a monitor and a digitizer when automatic pattern matching is impossible is disclosed therein.

In JP-A-4-240261(1992), which corresponds to U.S. patent application Ser. No. 07/825,193 filed on Jan. 24, 1992 and Spanish patent application No. P 9200142 filed on Jan. 23, 1992, an automatic pattern match cutting device which performs an automatic pattern recognition via image analysis as well as a measure permitting intervention of an operator for dealing with a subtle pattern when there appears a pattern matching point which is difficult for the automatic pattern recognition. The device uses a method of locally matching X axis or Y axis concentration accumulated projection histogram for the pattern recognition, and a key position on a similar configuration portion is determined via a matching process between a characteristic portion of a sampled histogram during a teaching operation and a histogram generated based on an image of a recognition object.

Further, in JP-A-63-98070(1988), a method in which small regions of two dimensional data are sequentially selected and their correlation is processed in high speed is disclosed.

Other than the above conventional methods, a binary template matching method and a concentration correlating pattern matching method are well known.

However, all of these conventional pattern recognition methods are ones which compare a pattern form in a local area with a reference data and are for recognizing a pattern on a surface of a hard substance.

There are several conventional methods which are thought effective for recognizing pattern forms as indicated above, however, when these methods are actually applied to a cloth, their recognition rates are far more inferior than those expected. The reasons why a recognition of a pattern form on a cloth is difficult are due to the following features inherent to a cloth.

(1) Meshes and weaves inherent to the surface of a cloth operate as noises during the image recognition thereof. Moreover, when a smoothing process and the like for erasing signals relating to the meshes and weaves are performed, the information relating to the pattern form itself can be lost.

(2) A cloth is likely to be subjected to expansion and contraction and deformation due to external forces so that it is difficult to expect always a coincidence of pattern forms during pattern matching operation between pattern forms of a standard template used in such as the conventional binary template matching method and the conventional concentration pattern matching method, and of an object cloth.

(3) Kinds of patterns which can be used for pattern matching are limited to checked patterns and striped patterns among many pattern forms of cloths. The task of pattern recognition for the checked patterns and the striped patterns is to determined a starting point of the pattern form which is repeated with a predetermined pitch. However, with the conventional pattern recognition methods which are performed via comparison of a local configuration, it was difficult to fully achieve the task and it will be difficult to achieve an accurate pattern recognition, other than a pattern recognition method which permits selective use of all of the characteristic quantities of a concentration accumulated projection histogram generated from a pattern form over one pitch such as number of crests, position thereof, width thereof, height thereof, area thereof, height difference of crests, number of bottoms, position thereof, width thereof, depth thereof, area thereof, depth difference of bottoms, position and width of flat portions and position and width of crowded crests depending upon necessity of individual pattern recognitions.

(4) In particular, many pattern forms on cloths for men's wear are subtle ones which are sometimes difficult to recognize as having a pattern form even with human eyes if the inspection is performed partially. In such instance, it is thought that there is no proper information other than a concentration acumulated projection histogram taken along the X axis and Y axis on an input screen image of a cloth.

For achieving the above tasks, different from the conventional methods which include a comparison of a local configuration, a method which makes use of all of the characteristic quantities of a generated projection histogram such as on vertical lines and lateral lines over one pitch of the pattern form for the pattern recognition is proposed, thereby a pattern recognition method, in other words, a pattern recognition algorithm which can be applied to variety of pattern forms is realized.

SUMMARY OF THE INVENTION

An object of the present invention is to provide a pattern recognition method or a pattern recognition algorithm and device which can overcome noise signals relating to expansion and contraction, and meshes and weaves inherent to cloths, and a variety of pattern forms, and further to provide an automatic pattern match cutting device using the same which can be applied to a pattern form for cutting to which the conventional automatic pattern match cutting devices were inapplicable.

For achieving the above object, the pattern recognition method according to the present invention includes at least one of the following features which make use of inherent characteristics of pattern forms of cloths.

(1) Since patterns applicable for pattern matching are limited to checked patterns and striped patterns, the vertical lines and the lateral lines in the respective pattern forms constitute their fundamental elements, therefore, X axis and Y axis concentration accumulated projection histograms are prepared and the prepared X axis and Y axis histograms are independently analyzed to separately obtain characteristic quantities for the vertical pattern forms and the lateral pattern forms.

(2) All of the characteristic quantities in the generated histograms in connection with the vertical lines and lateral lines within one pitch are noted and one or more optimum characteristic quantities are selected manually or automatically for the pattern recognition for individual pattern forms of cloths.

(3) The histograms prepared based upon an input screen image according to the above method show a characteristic of which center portion rises due to a shading caused by influences of an optical system and an electronic system in a device used for the image processing. Accordingly, these histograms are corrected in such a manner that the center portion and both end portions of the histograms are maintained at same levels. An advantage of this correction method resides in a fact that a desirable correction effect is obtained regardless of lightness variation of objects for pattern recognition.

(4) In case that vertical lines and/or lateral lines constituting a pattern form are inclined, an error caused by the inclination is corrected to maintain a predetermined accuracy for respective characteristic quantities in histograms.

(5) A pattern is recognized by selecting characteristic quantities such as relating to a remarkable crest, a plurality of crests and a bottom within one pitch in a histogram.

(6) When a histogram over one pitch is divided into two parts, one shows an intense variation and the other shows a slight variation, the difference of the states is used as a characteristic quantity for the recognition.

(7) When a histogram over one pitch is divided into two parts, one shows a light appearance and the other shows a dark appearance, the difference of lightness is used as a characteristic quantity for the recognition.

(9) The histograms prepared based upon an input screen image according to the above further includes small noises caused by influences of an optical system and an electric system in a device used for the pattern recognition. Accordingly, these small noises are eliminated by averaging these histograms.

(10) At least one of the height difference of crests, the crest area, the crest width, depth difference of bottoms, the bottom area, the bottom width and the height difference between crest and bottom in a prepared histogram are used as characteristic quantities for the recognition.

(11) A second histogram is prepared which enables a pattern recognition even when a size of the pattern form slightly deviates between teaching and actual pattern recognition by allocating a predetermined band for a characteristic quantity.

(12) In case when a top of a crest in a histogram is distorted and can not be used as a pattern key position during pattern key position determination, a true pattern key position can be determined by correcting the histogram.

According to the present invention, all of characteristic quantities in a histogram of a pattern form within one pitch such as number of crests, position thereof, width thereof, height thereof, area thereof, height difference of crests, number of bottoms, position thereof, width thereof, depth thereof, area thereof, depth difference of bottoms, position and width of flat portions and position and width of crowded crests are taken into account for determining a key pattern point. Thereby a recognition rate of a pattern form is remarkably improved in comparison with the conventional pattern recognition methods which make use of only a local pattern information. Further, the present method can be applied to a pattern constituted by inclined vertical lines and/or inclined lateral lines with a high recognition accuracy. Still further, with the shading correction of a prepared histogram according to the present invention, a desirable corrected histogram of an object pattern can be obtained even when lightness varies by every pattern object. Moreover, with the small noise removal from a prepared histogram according to the present invention, a desirable corrected histogram can be obtained. With these corrected histograms a pattern recognition rate is further improved.

BRIEF DESCRIPTION OF THE DRAWINGS

FIG. 14 is a flow chart for determining a key pattern position based on the calculated first evaluation function $\omega$1.

DETAILED DESCRIPTION

Figure 70:
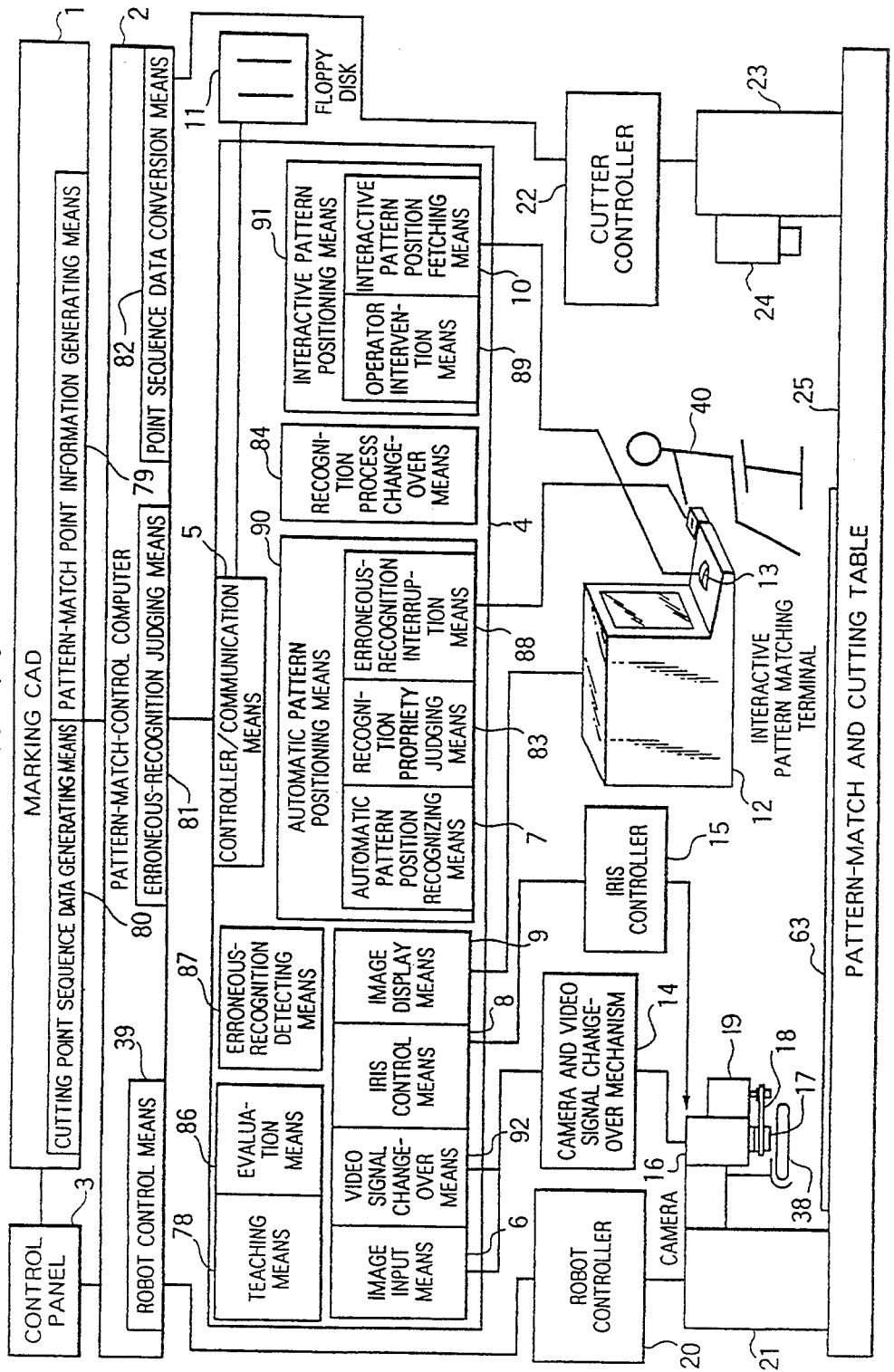
FIG. 70 is a block diagram of an automatic pattern match cutting device to which the pattern recognition method according to the present invention is applied.

Hereinbelow preferred embodiments of the present invention are explained with reference to the drawings (1) Automatic pattern match cutting device:

FIG. 70 is a block diagram of an automatic pattern match cutting device disclosed in the above mentioned JP-A-4-240261(1992) which has been applied for by the same applicant as the present invention and to which the present invention is applicable.

The pattern match cutting device is constituted by a marking CAD 1, a pattern match control computer 2, a control panel 3, a pattern recognition device body 4, a floppy disc 11, a monitor television and console 12, a mouse 13, an erroneous recorgnition interruption button 93, a camera and video signal changeover mechanism 14, an iris controller 15, a camera lens 17, an iris control lens driving belt 18, an iris control small size motor 19, an illuminator 38, a robot controller 20, a camera-positioning two directional robot 21, a cutting controller 22, a cutting device body 23, a cutting head 24, and a pattern matching and cutting table 25, and so on. The pattern recognition device body 4 is constituted by a controller and communication means 5, a teaching means 78, an evaluation means 86 for evaluating the result of the teaching, an image input means 6, a video signal changeover means 92, an iris control means 8, an image display means 9, an automatic pattern positioning means 90, an interactive (or manual) pattern positioning means 91, a recognition process changeover means 84, an erroneous recognition detecting means 87, and so on. The automatic pattern positioning means 90 is constituted by an automatic pattern position recognizing means 7, a recognition propriety judging means 83, erroneous recognition interruption means 88, and so on. The interactive (or manual) pattern positioning means 91 is constituted by an operator intervention means 89, an interactive (or manual) pattern position fetching means 10, and so on. The marking CAD 1 is constituted by a cutting point sequence data generating means 80, a pattern match point information generating means 79, and so on. The pattern match control computer 2 is constituted by a robot control means 39, an erroneous recognition judging means 81, a point sequence data conversion means 82, and so on. The pattern recognition method or algorithm according to the present invention is incorporated in the teaching means 78 and the automatic pattern position recognizing means 7 of the automatic pattern match cutting device.

Figure 1:
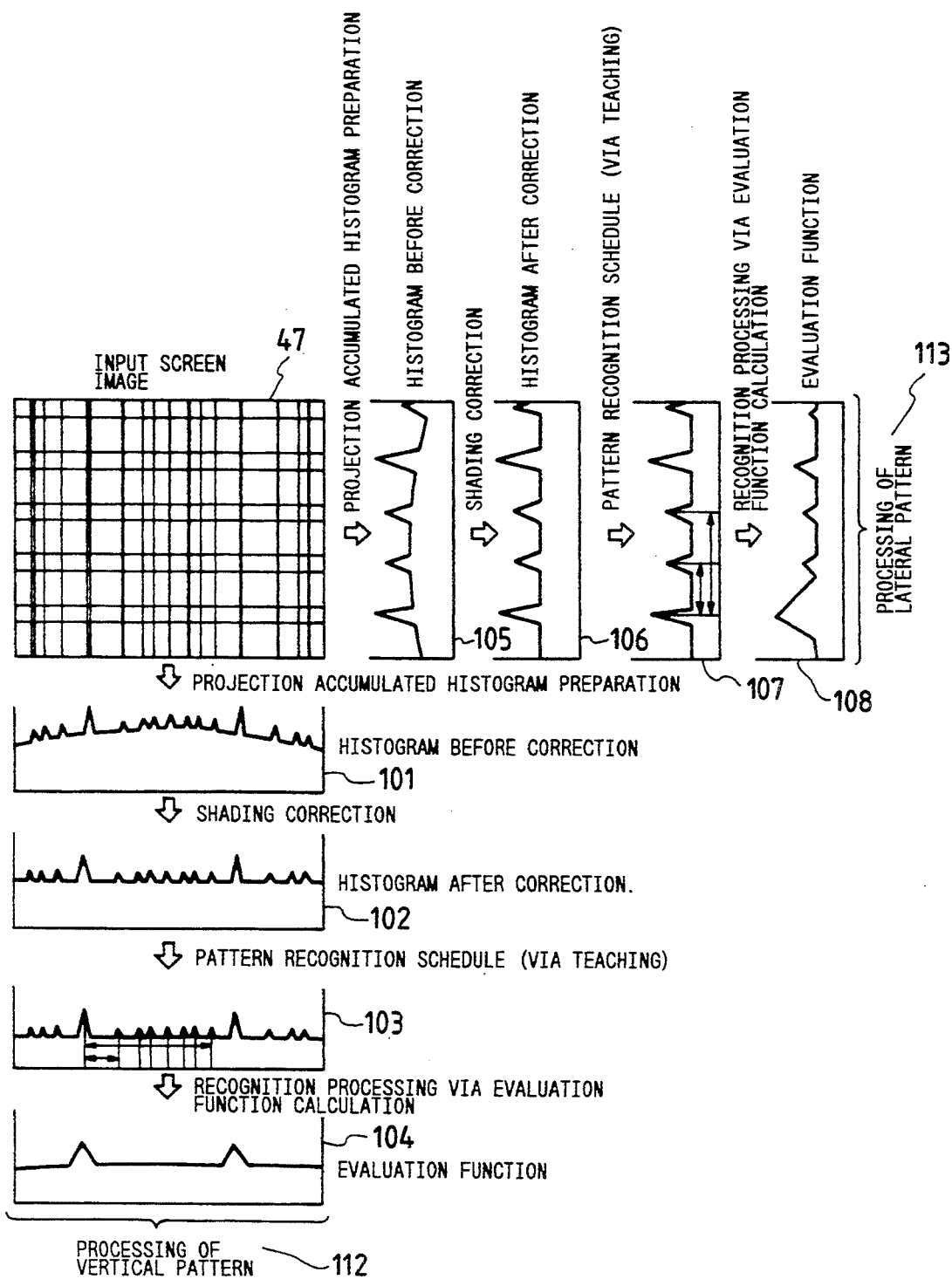
FIG. 1 is a view for explaining a major portion of one embodiment of the pattern recognition methods according to the present invention.

(2) Pattern recognition process in the automatic pattern match cutting device:

FIG. 1 shows an example of a striped pattern recognition process which makes use of one embodiment of pattern recognition methods according to the present invention. Numeral 47 is an input screen image which constitutes an object for pattern recognition. Vertical pattern recognition step 112 and lateral pattern recognition step 113 can be performed separately. The vertical pattern recognition step 112 includes an X axis concentration accumulated projection histogram generating step 101, a histogram correction step 102, a pattern recognition schedule selection step 103 which takes into account all of the characteristic quantities of the pattern form over one pitch of the object, a calculation step 104 of an evaluation function corresponding to the selected pattern recognition schedule and so on. During teaching operation an optimum pattern recognition schedule is selected in view of the pattern form constituting the object for pattern recognition and in the step of executing pattern recognition, the calculation of the corresponding evaluation function for the specific pattern recognition schedule selected during the teaching operation is performed. Like the vertical pattern recognition step 112 explained hitherto, the lateral pattern recognition step 113 includes a histogram generating step 105, a histogram correction step 106, a pattern recognition schedule selection step 107, a calculation step 108 of a corresponding evaluation function and so on.

Figure 2:
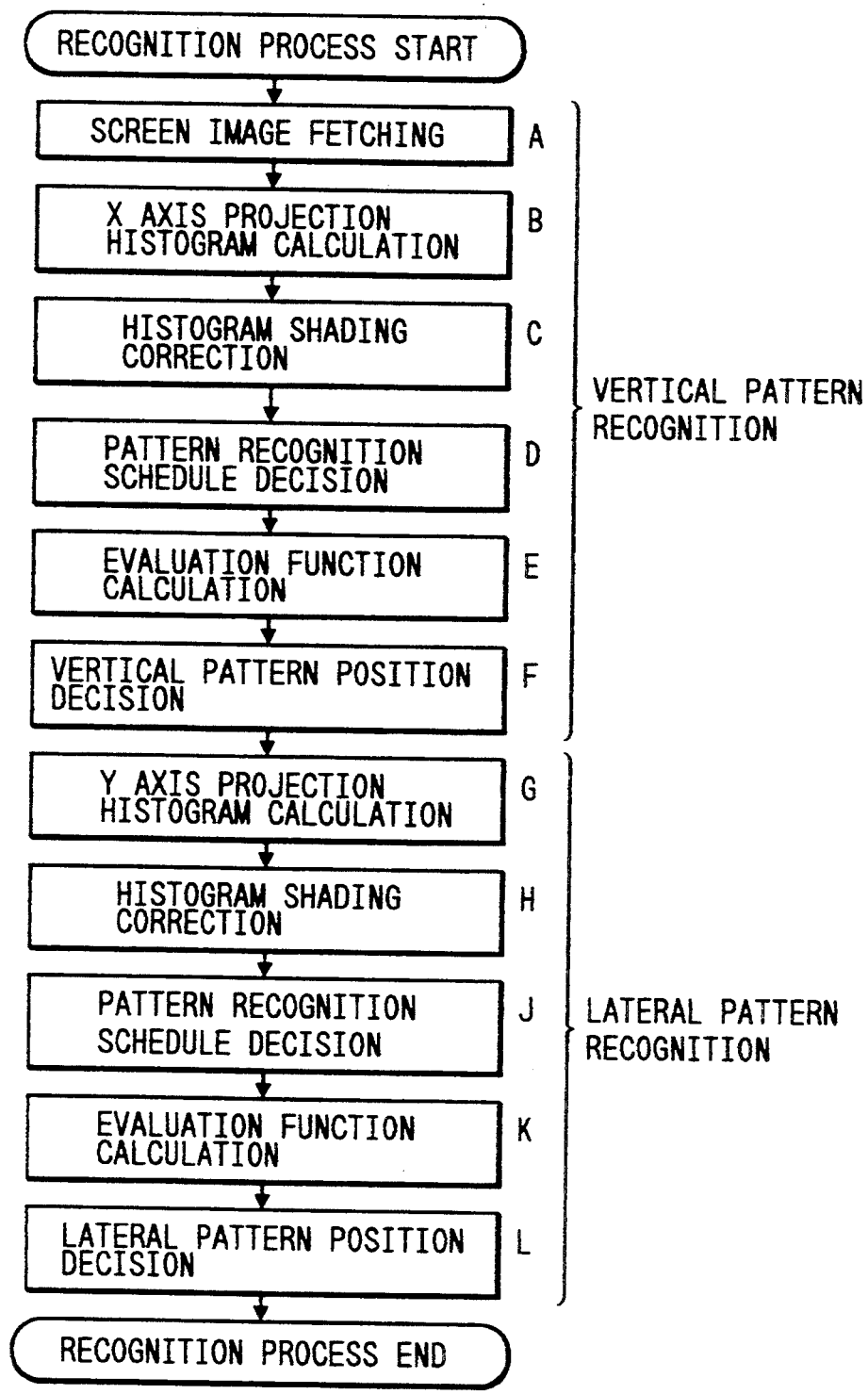
FIG. 2 is a flow chart of a pattern recognition process executed in the embodiment shown in FIG. 1.

FIG. 2 shows in a flow chart an outline of the pattern recognition process according to the present invention as illustrated in FIG. 1. The process is performed, for example, in an order of the vertical pattern recognition process and the lateral pattern recognition process. However the order can be reversed. Although not illustrated in FIG. 2 flow chart, when processing a striped pattern it is enough if either the vertical pattern or the lateral pattern is processed. Since the lateral pattern recognition processing is basically the same as the vertical pattern recognition processing, hereinbelow the present invention is explained only with reference to the vertical pattern recognition processing thereof, in that the lateral pattern recognition processing can be understood to be performed in the same manner as the vertical pattern recognition processing which will be explained in detail hereinbelow.

(3) Shading correction of the histogram

Figure 3:
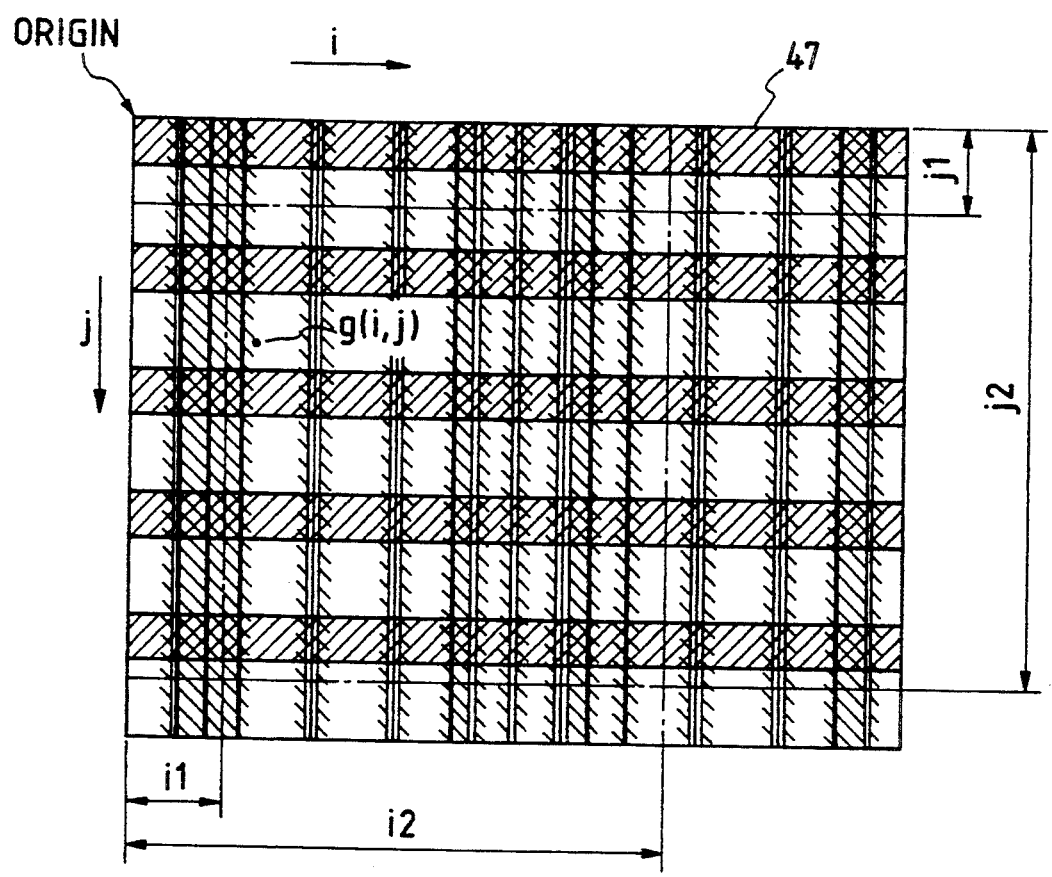
FIG. 3 is an example of input screen images which constitute an object of the pattern recognition process according to the present invention.
Figure 4:
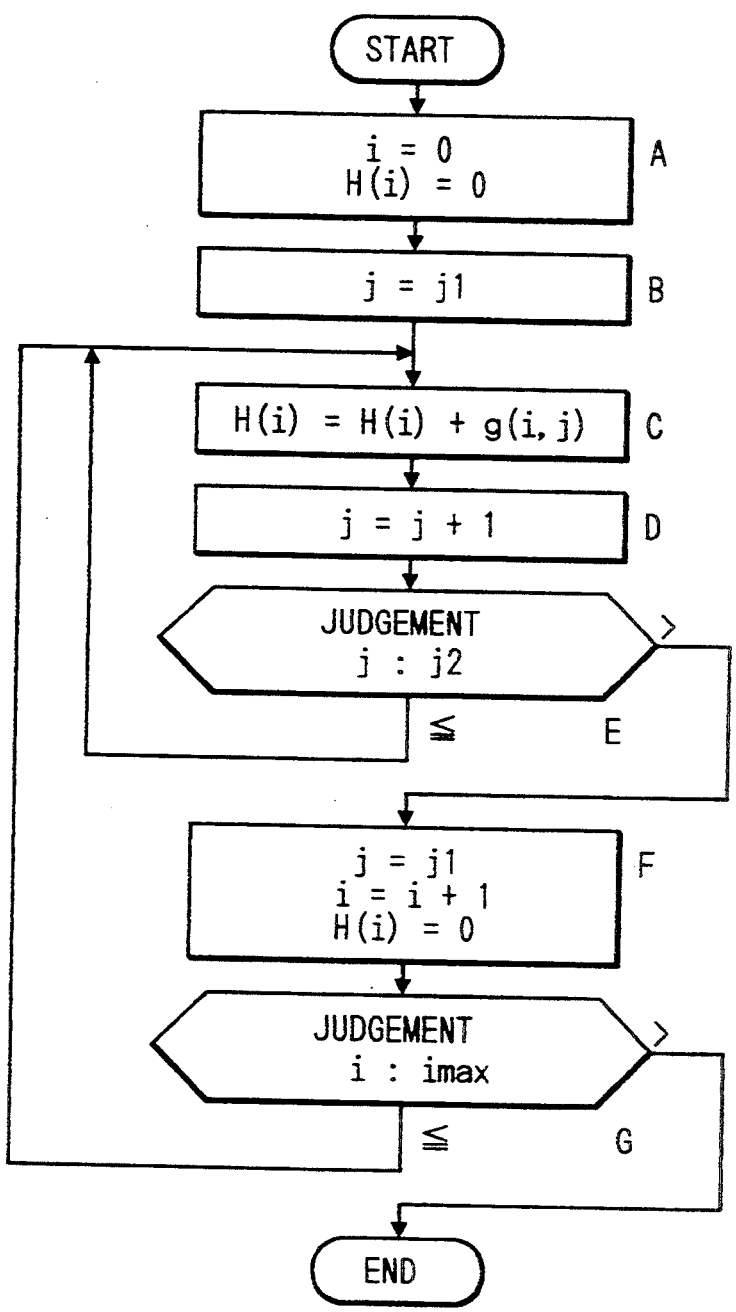
FIG. 4 is a flow chart for preparing an X axis concentration accumulated projection histogram in the pattern recognition process according to the present invention.

FIG. 3 and FIG. 4 are views for explaining a X axis concentration accumulated projection histogram generated from the input screen image 47 constituting an object for pattern recognition. The input screen image is constituted by two dimensional data g (i, j). The data g (i, j) contain information with regard to brightness at respective points in the input screen image.

The X axis concentration accumulated projection histogram is obtained by adding the respective pixel values in vertical direction which is expressed by the following formula (1);

$$H(i) = \sum_{j=j1}^{j2} g(i, j) \quad (1)$$

Y axis concentration accumulated projection histogram is likely expressed as follows;

$$H(j) = \sum_{i=i1}^{i2} g(i, j) \quad (2)$$

FIG. 4 shows in a flow chart a generating process of X axis concentration accumulation projection histogram represented by the formula (1) of which generating process is well known.

Figure 5:
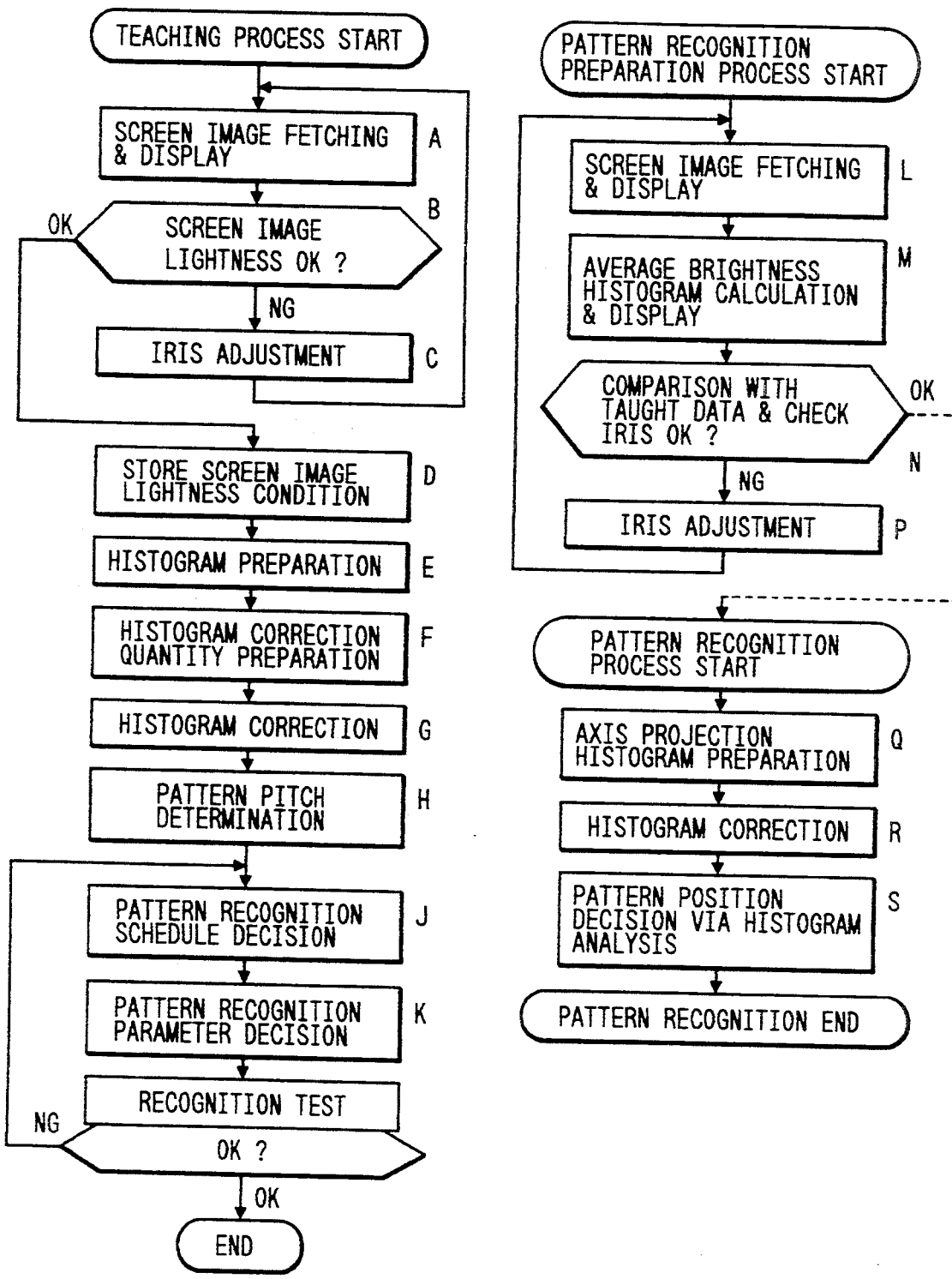
FIG. 5 is a flow chart of a pattern recognition process including a pattern teaching process, a pattern recognition preparation process and an actual pattern recognition process executed in one embodiment of automatic pattern match cutting devices according to the present invention.

FIG. 5 shows in a flow chart the pattern recognition process dividing it into three stages: a teaching process, a preparation process and a pattern recognition process. In the teaching processing stage, such processings are performed as an iris optimizing adjustment of the camera, a generation of histogram correction quantity corresponding to the respective patterns (Box F) namely to generate HXstd in FIG. 6(a), a determination of pattern recognition schedule and a determination of pattern recognition parameter. In the preparation processing stage, an image and brightness information of the image is displayed on the screen, and the camera is adjusted to meet the teaching condition (Boxes L~P). In the pattern recognition stage, after generation and correction of a histogram (Boxes Q, R), a key pattern position determining process (Box S) are performed.

Figure 6A:
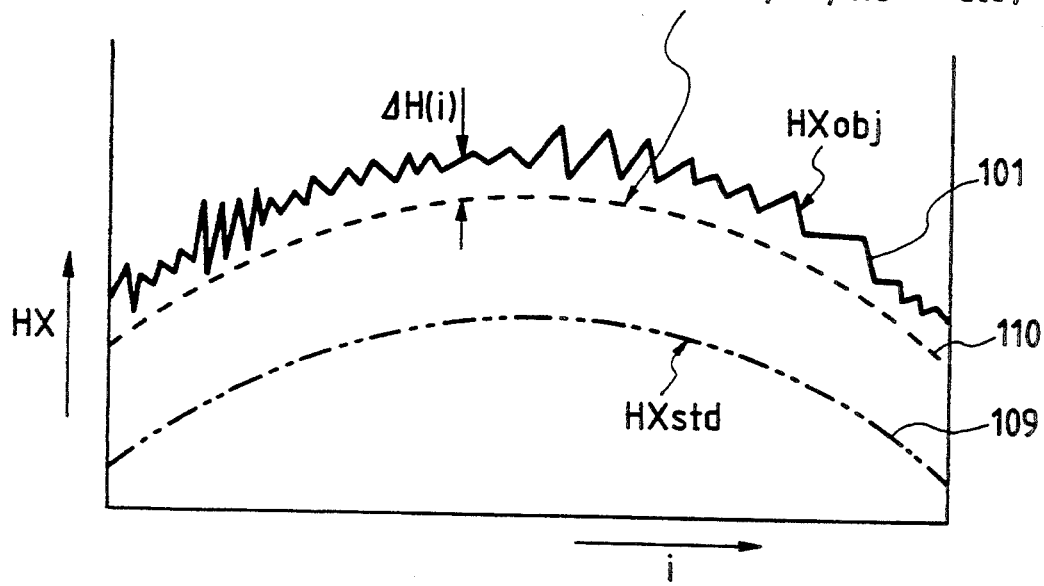
FIG. 6(a) and FIG. 6(b) are views for explaining a shading correction of a prepared histogram performed in the pattern recognition process according to the present invention.
Figure 6B:
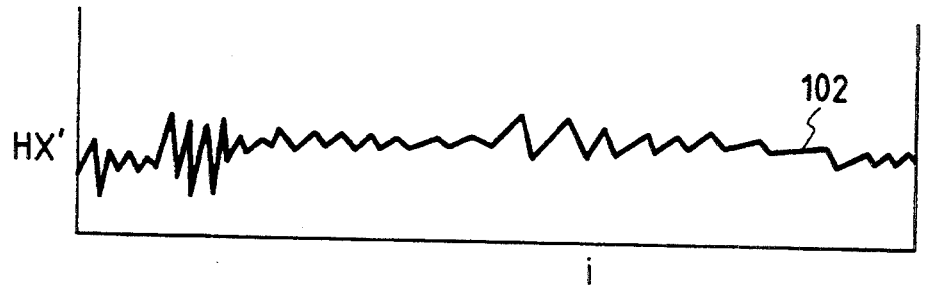
Figure 7:
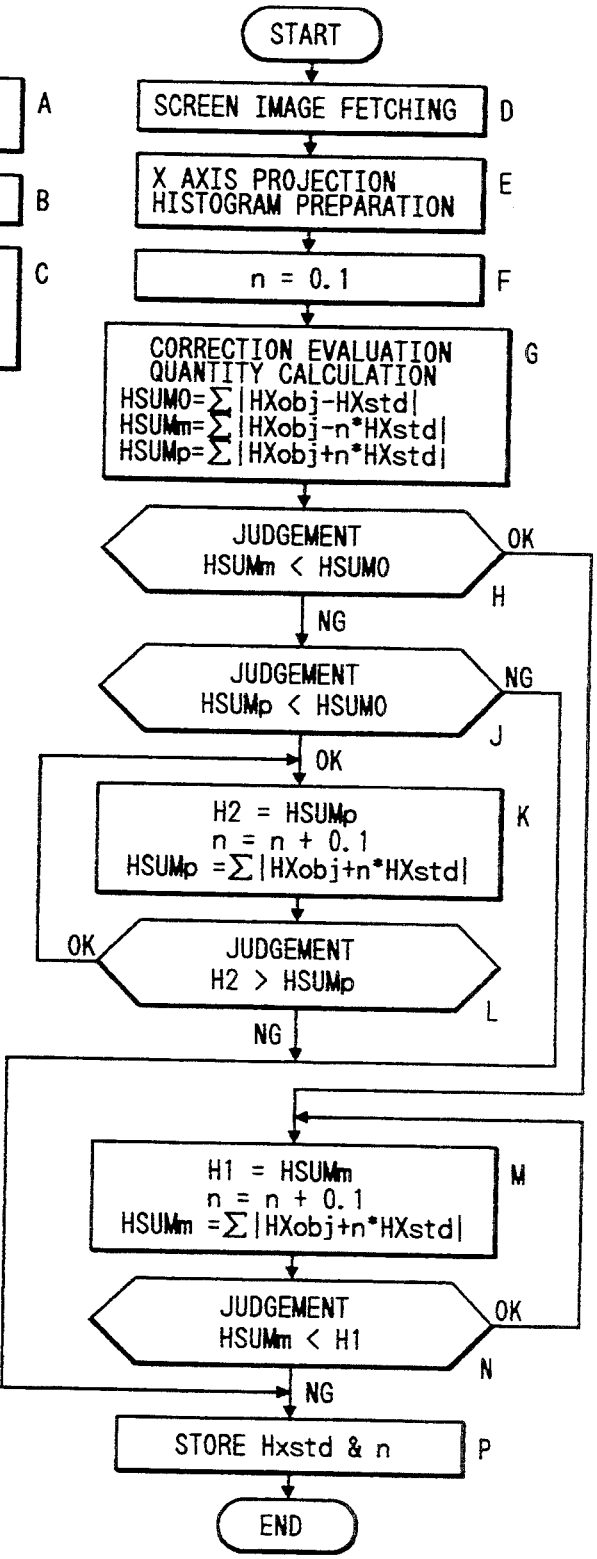
FIG. 7 is an example of flow charts of X axis projection histogram correction via the shading correction performed in the pattern recognition process according to the present invention.

FIG. 6(a), FIG. 6(b) and FIG. 7 show the shading correction of a histogram. Numeral 101 represents a histogram before correction. The noncorrected histogram shows a rise at the center thereof so that if no correction is applied thereto, a processing of the histogram becomes difficult because the lightness level thereof is different between the center and the both ends. Accordingly, an image of a flat object having no pattern is inputted beforehand and a histogram thereof represented by numeral 109 is generated and stored. According to the shading correction of the present invention, the stored data can be used again as it is, even when the lightness of the cloth has been changed as long as the conditions of the camera and the illuminator are not changed. The shading correction of the present invention is explained in detail hereinbelow. In order to generate a histogram 102 (HX'obj) after correction of the histogram 101 (HXobj) by making use of a standard data for correction 109 (HXstd), at first a difference $\Delta H(i)$ is obtained based on a modified data 110 (HXcrct) of the standard data for correction 109 (HXstd) according to one of the following two formulas (3) and (3');

$$\Delta H(i) = ABS\ (HXobj(i) - HXcrct\ (i)) \quad (3)$$

$$\Delta H(i) = (HXobj(i) - HXcrct\ (i))^2 \quad (3')$$

wherein ABS: absolute value $$HXcrct(i) = HXstd(i) - nXstd(i)$$

$$n = 0, \pm 0.1, \pm 0.2, \pm 0.3$$

and then n which minimizes $\Sigma \Delta H(i)$ is determined. When putting the thus determined n as N, the histogram 102 (HX'obj) after correction is expressed as follows;

$$HX'obj(i) = HXobj(i) - (1 - N)\ HXstd(i) \quad (4)$$

Hereinbelow, pattern regognition schedules, one of the important features of the present invention, are explained.

(4) Recognition of a pattern form of which positions of crests and bottoms in a histogram appear invariably:

The features of the histogram of such pattern form are enumerated as follows;

(a) There is at least one crest in the histogram corresponding to a specific form in the pattern form of which height order is always constant (for example, there is one highest crest in the histogram of which order is invariable even when the starting point of the histogram generation is varied).

(b) A plurality of remarkable crests within one pitch in a histogram are selectable of which height orders are variable, however the intervals between the crests are distinguishable, in that, no crests within one pitch appear at positions of an equal interval (for example, when a remarkable crest appears in every ½ pitch, the present pattern recognition schedule can not be applied).

Figure 8:
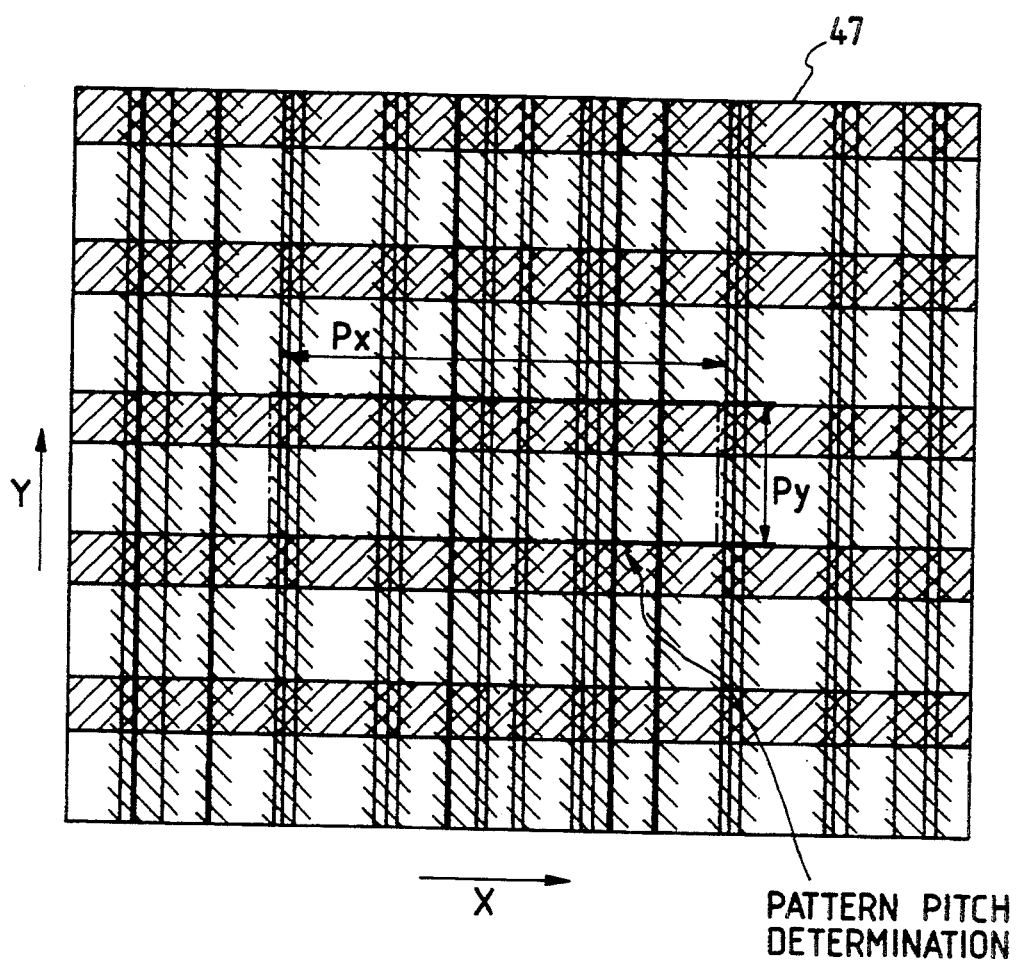
FIG. 8 is an example of input screen images of a pattern form for explaining a pattern pitch determination.

The pattern recognition schedule or algorithm for the present pattern form is characterized by noting the height and position of a remarkable crest within one pitch and determining the same as a key pattern position. FIG. 8 is a displayed screen image for determining a pattern pitch. The pattern pitch can be determined automatically or inputted by an operator. In FIG. 8, the pattern pitch determined automatically or inputted by the operator is displayed on the screen by superposing over the input screen image for confirmation. When the pitch is erroneously determined or inputted, the pattern recognition result is significantly affected thereby, therefore the supperposed screen display for confirmation is important. After confirming correctness of the pattern pitch in vertical and lateral directions via the screen display as shown in FIG. 8, a pattern recognition is performed for every object pattern form according to the following pattern recognition schedule.

Figure 9A:
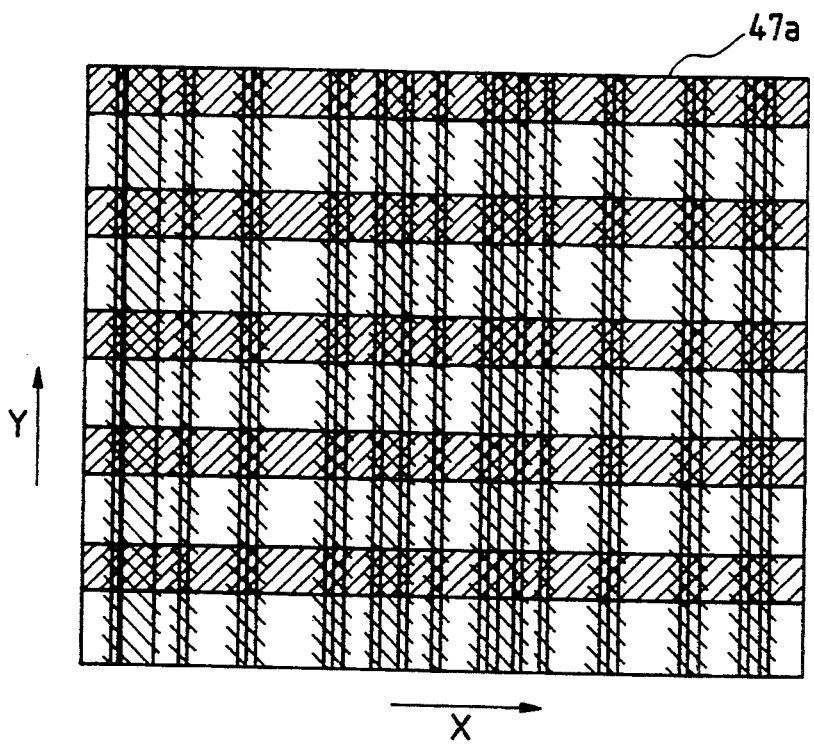
FIG. 9(a) is an input screen image of a first pattern form constituting an object for the pattern recognition process according to the present invention.
Figure 9B:
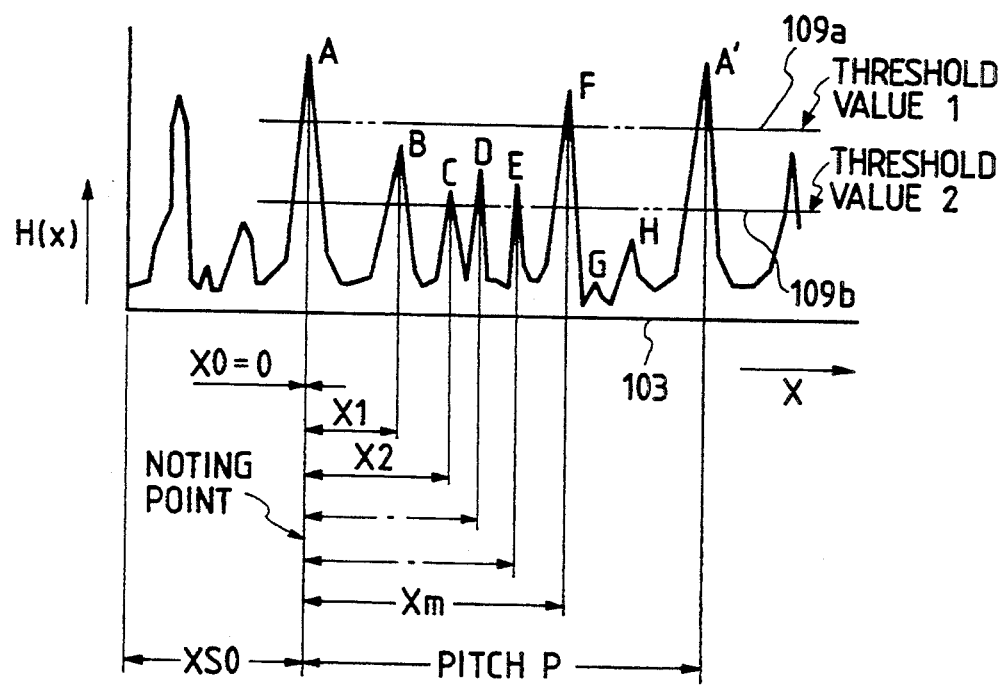
FIG. 9(b) is a X axis projection histogram of the first pattern form prepared based on the input screen image for explaining sampling of teaching data of the first pattern form illustrated in FIG. 9(a).
Figure 10:
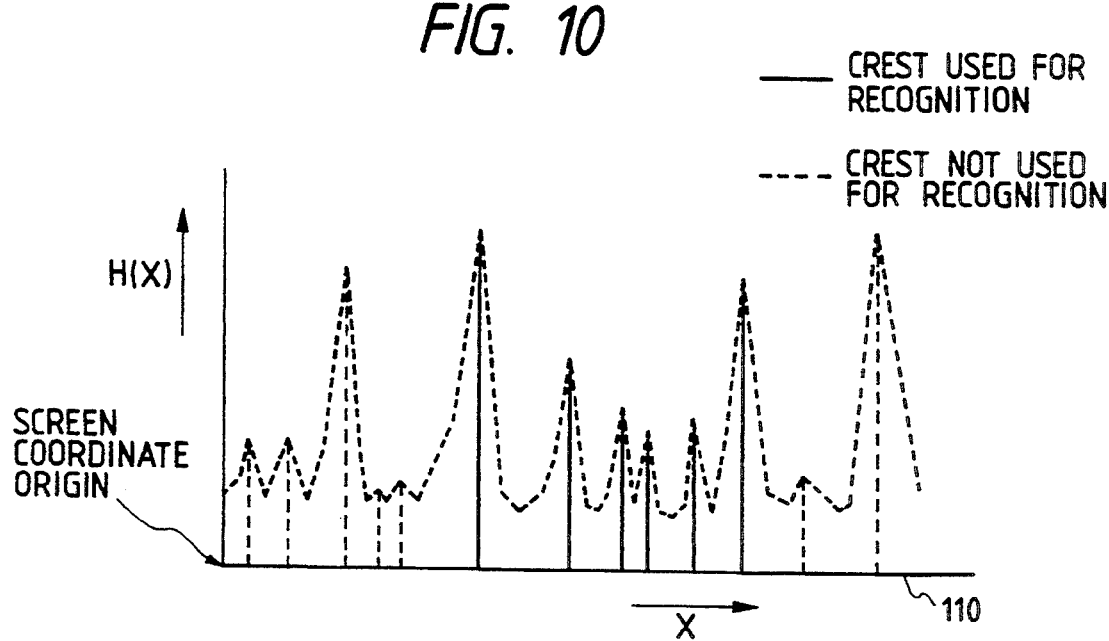
FIG. 10 is a display example on a man-machine screen of a modified histogram shown in FIG. 9(b) for confirming the crests in the histogram which are selected to be used for pattern recognition.
Figure 11:
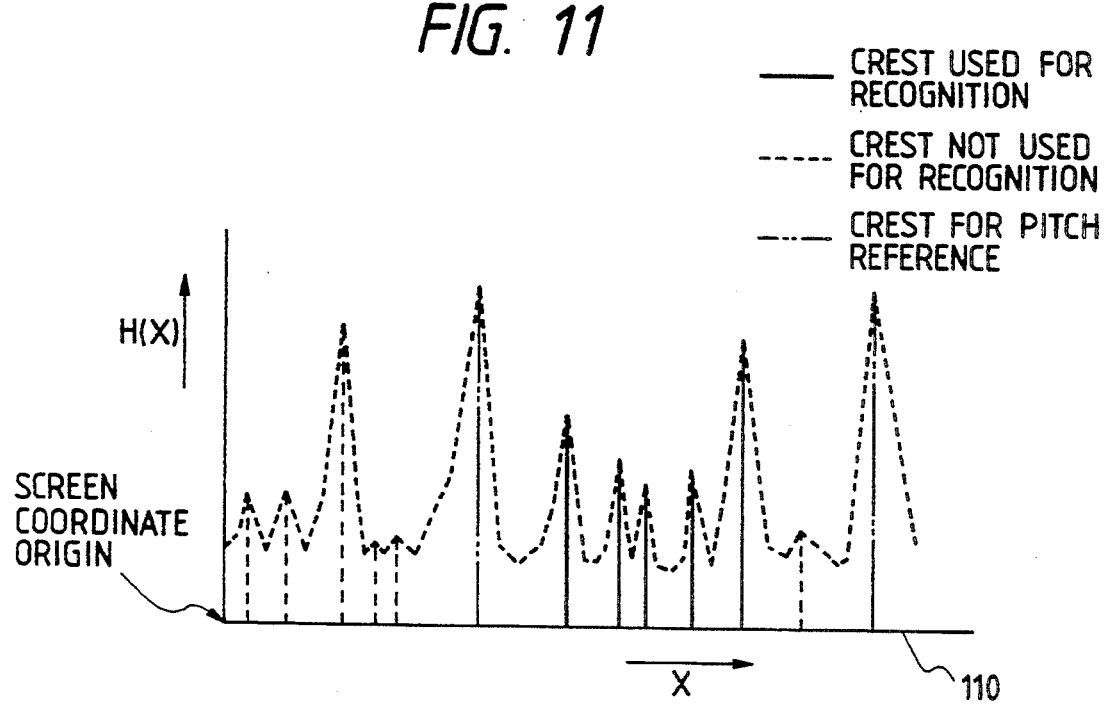
FIG. 11 is another example on a man-machine screen of another modified histogram shown in FIG. 9(b) confirming the crests in the histogram which are selected to be used for pattern recognition.

FIG. 9(a) and FIG. 9(b) are views for explaining a pattern recognition schedule which is effective for a pattern represented by an input screen image 47a having a remarkable crest in one pitch in the generated histogram. In this example, it is necessary to determine which remarkable crests are to be used for the recognition, and which can be easily effected by preparing a screen image including a histogram and adjustable threshold levels as shown in FIG. 9(b). When the threshold value 1 is applied, the crests A and F are selected and when the threshold 2 is applied, the crests A, B, C, D, E and F are selected. As teaching data information Xso representing a key pattern position, values X1~Xm representing relative positions of the crests which are used for recognition and a pitch width PX are stored. Such crest selection can be performed automatically or manually by an operator during the teaching stage. For confirming such selection result, a screen display such as illustrated in FIG. 10 and FIG. 11 is indispensable. In FIG. 10, selected crests and the corresponding histogram are displayed by superposing wherein the selected crests and the nonselected crests are differentiated by different kinds of lines. Further, in FIG. 11, crests representing pitch boundary are indicated by a different kind of line for facilitating recognition. These screen displays are necessary for checking the recognition result and are indispensable when performing a pattern recognition according to the present schedule. In FIG. 10 and FIG. 11, the histogram and the crests are displayed by superposing as well as the input screen image can be displayed by further superposing. It will be easily understood that these screen displays are indispensable for judging validity of the recognition schedule and the crests used for the recognition.

FIG. 12(a) through FIG. 14 are diagrams for explaining actual pattern recognition process by making use of the above taught data. According to the present pattern recognition schedule, histogram values at distances Xo~Xm from a noting point are accumulated to determine the accumulated value as an evaluation value at the noting point and further to determine a noting point giving a local maximum evaluation value as a possible key pattern position. Namely, the possible key pattern position is determined through calculation of the following evaluation function;

$$\omega 1(\zeta) = \sum_{k=o}^{m} H(\zeta + Xk) \qquad (5)$$

Figure 12A:
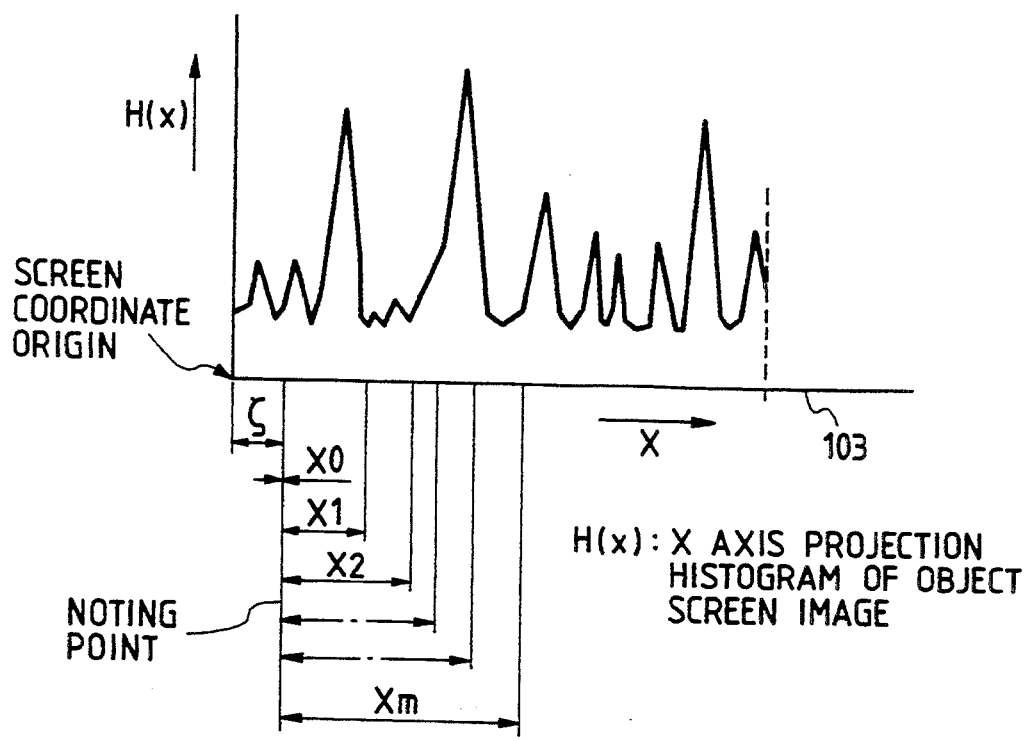
FIG. 12(a) is an X axis projection histogram obtained from an input screen image of the first pattern form on an object for actual pattern matching and FIG. 12(b) is a diagram of the first evaluation function $\omega$ 1 for pattern recognition determined based on the obtained histogram shown in FIG. 12(a).
Figure 12B:
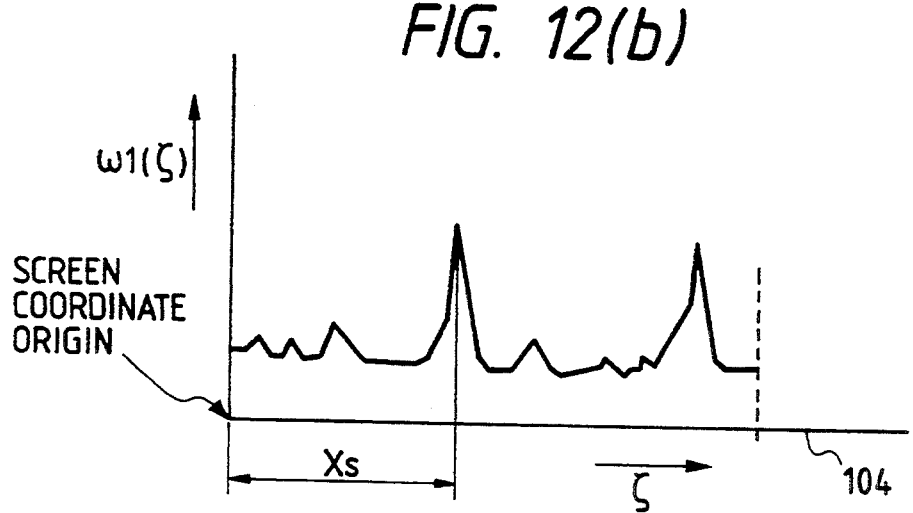
Figure 13:
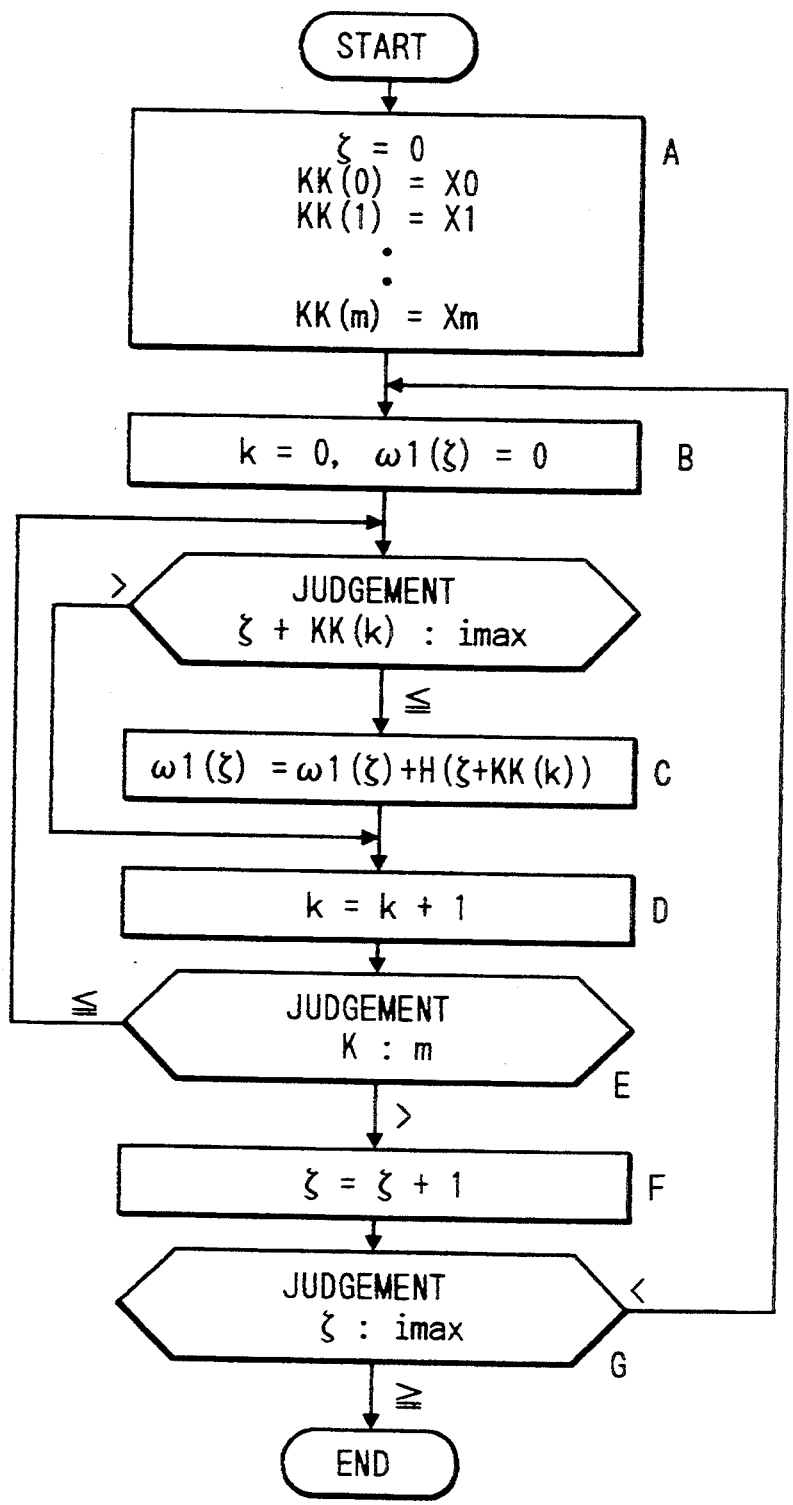
FIG. 13 is a flow chart for explaining the calculation steps of the first evaluation function $\omega$ 1 as shown in FIG. 12(b).

FIG. 12(a) and FIG. 12(b) show diagrams for explaining a relationship between a histogram and the evaluation function. FIG. 13 shows in a flow chart an example of calculation steps of the present evaluation function $\omega$ 1 represented by formula (5). The positions in the evaluation function giving local maximum values as shown in FIG. 12(b) which is obtained by the processing according to the flow chart are assumed as possible key pattern positions and then one desirable local maximum value is selected among others depending on the circumstances (a local maximum value near the center of the evaluation function diagram is usually selected). FIG. 14 shows in a flow chart an example of a key pattern position determination schedule represented by the following formula:

$$Xs = \xi\{\text{at MAX }(\omega 1)\} \qquad (6)$$

wherein MAX, implies that $\omega$ 1 gives a local maximum value.

Hereinabove, information relating to the crest position in the histogram was used for determining the key pattern position, however information relating to the bottom position in the histogram can be used in the same manner for determining the key pattern position wherein the key pattern position is determined by a local minimum value of $\omega$ 1.

Figure 15A:
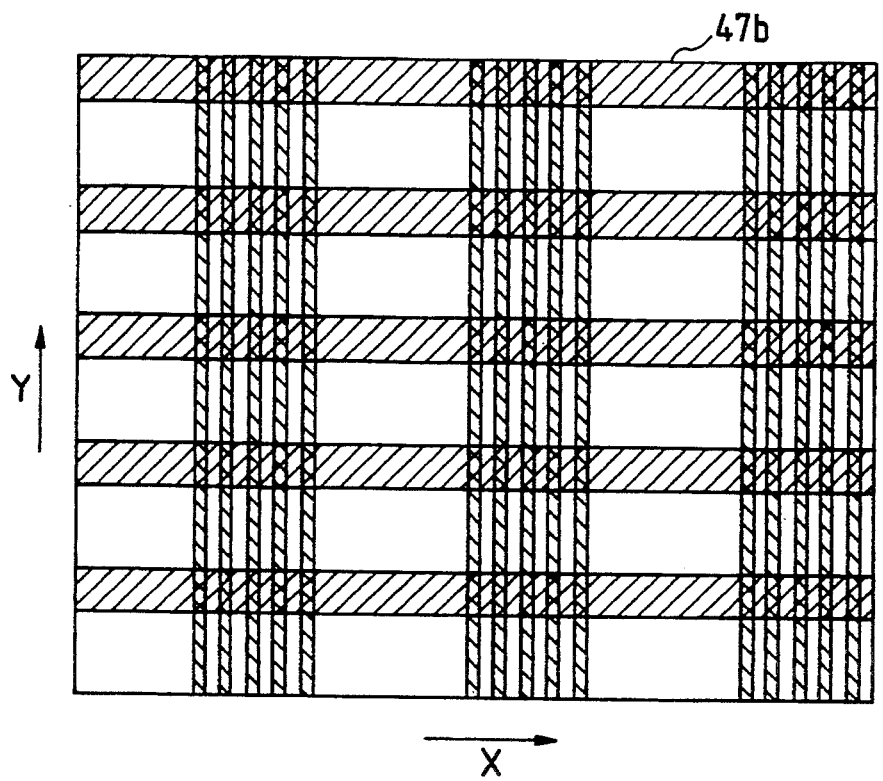
FIG. 15 (a) is an input screen image of a second pattern form constituting an object for the pattern recognition process according to the present invention.
FIG. 15(b) is an X axis projection histogram of the second pattern form prepared based on the input screen image for explaining sampling of teaching data of the second pattern form illustrated in FIG. 15(a).
Figure 15B:
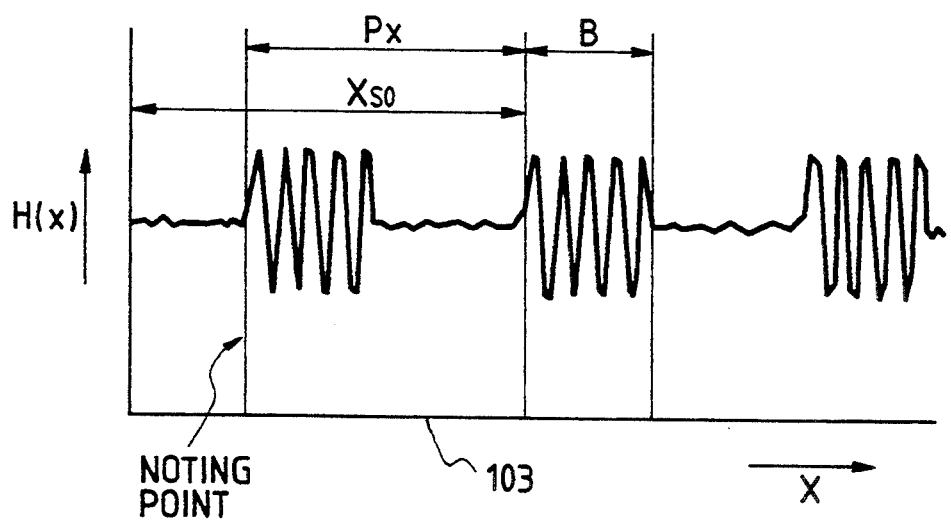
Figure 16A:
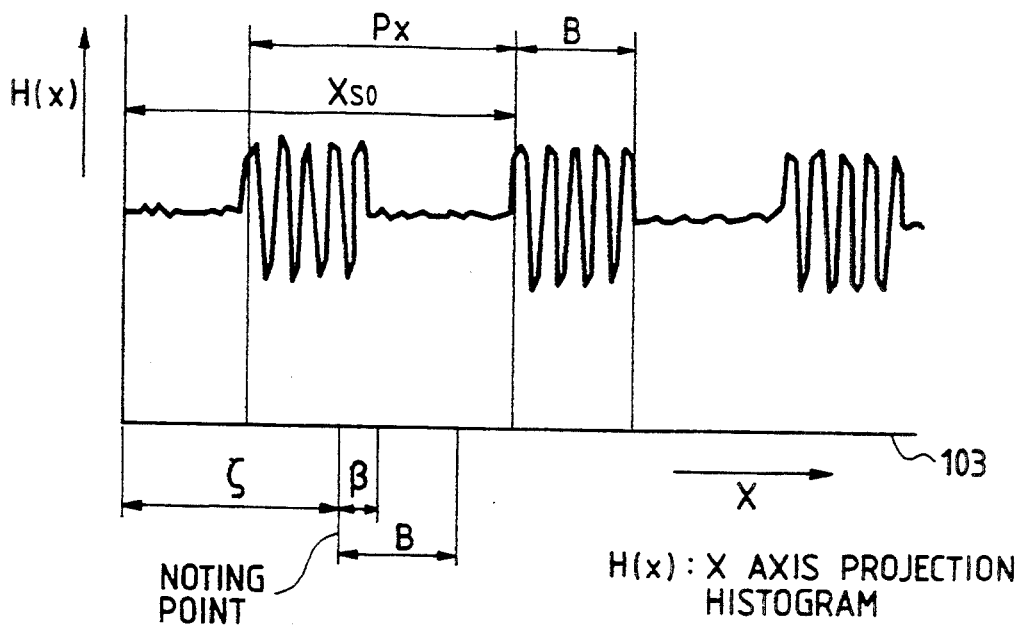
FIG. 16(a) is an X axis projection histogram obtained from an input screen image of the second pattern form on an object for actual pattern matching and FIG. 16(b) is a diagram of a second evaluation function $\omega$ 2 for pattern recognition determined based on the obtained histogram shown in FIG. 16(a).
Figure 16B:
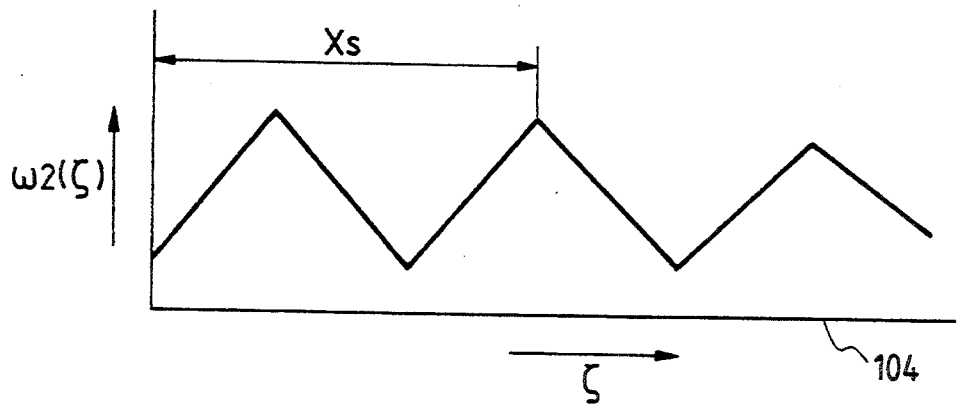

(5) Recognition of a pattern form of which histogram includes two phases of a crowded crest portion and a flat portion:

An example of such pattern form is shown in FIG. 15(a) and FIG. 15(b), and the features of the histogram of such pattern form 47b are enumerated as follows;

(a) The histogram within one pitch consists of a portion having crowded and concentrated crests (namely a portion exhibiting a high frequency) and a flat portion having no crests.

Figure 17:
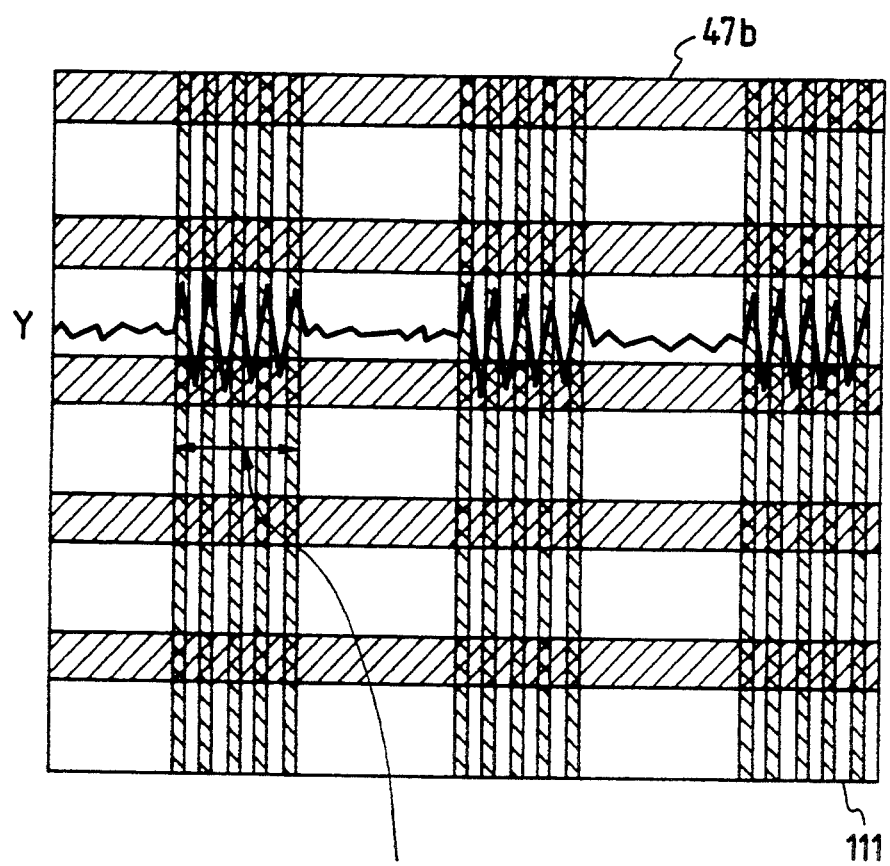
FIG. 17 is a display example on a man-machine screen wherein the obtained X axis projection histogram shown in FIG. 16(a) is superposed on the input screen image of the second pattern for confirming parameters in the histogram which are selected to be used for the pattern recognition.
Figure 18:
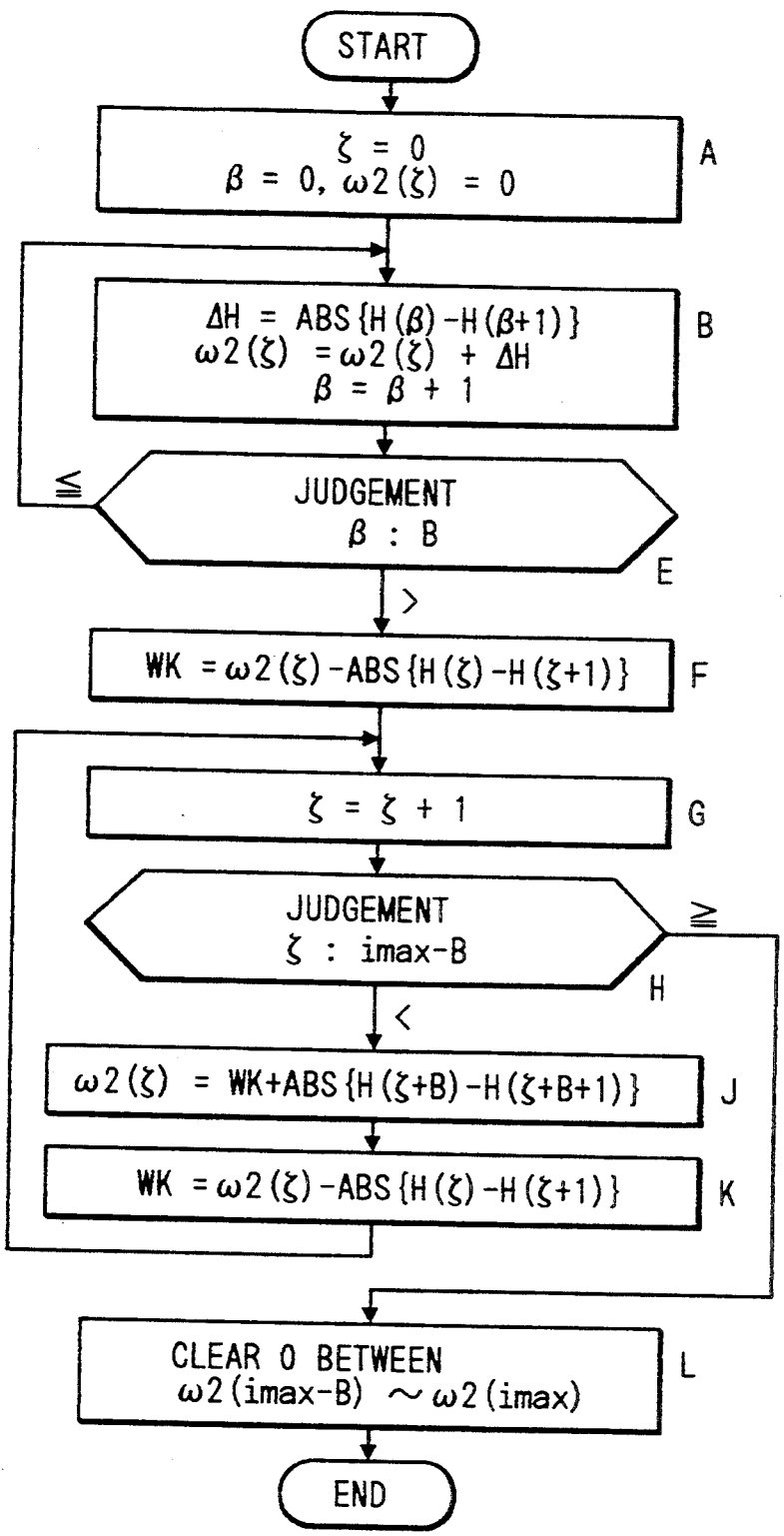
FIG. 18 is a flow chart for explaining the calculation steps of the second evaluation function $\omega$ 2 as shown in FIG. 16(b).

(b) No average value difference in the histogram between the crowded crest concentrated portion and the flat portion with no crests is required. For the present pattern recognition schedule, parameters such as width B of a nonflat portion (the width of flat portion can be likely used), key pattern position information Xso and pattern pitch Px as shown in FIG. 15(b) are stored during teaching stage. The width B of a nonflat portion can be determined automatically or inputted by an operator. However it is important to include such a function which permits a screen display as shown in FIG. 17 for confirming whether the determined result is correct. In FIG. 17, the input screen image, the histogram and the width of nonflat portion are displayed and it will be easily understood that these screen displays are indispensable for determining validity of the present pattern recognition schedule and the width B. During pattern recognition processing, absolute differential values of the histogram are accumulated between the width B starting from a noting point while making use of the taught data to determine the accumulated value as the evaluation value at the noting point and further to determine a noting point giving a maximum evaluation value as a possible key pattern position. FIG. 18 shows in a flow chart calculation steps of the evaluation function represented by the following formula;

$$\omega 2(\zeta) = \sum_{\beta=0}^{B} ABS\{\Delta H(\zeta + \beta)\} \qquad (7)$$

For determining a key pattern position according to the evaluation function, the positions giving local maximum values in the evaluation function are assumed as a possible key pattern position (a plurality of possible key pattern positions usually appear because the screen display of one scene covers more than one pitch) and a most desirable position is determined depending on the individual situation.

Figure 19:
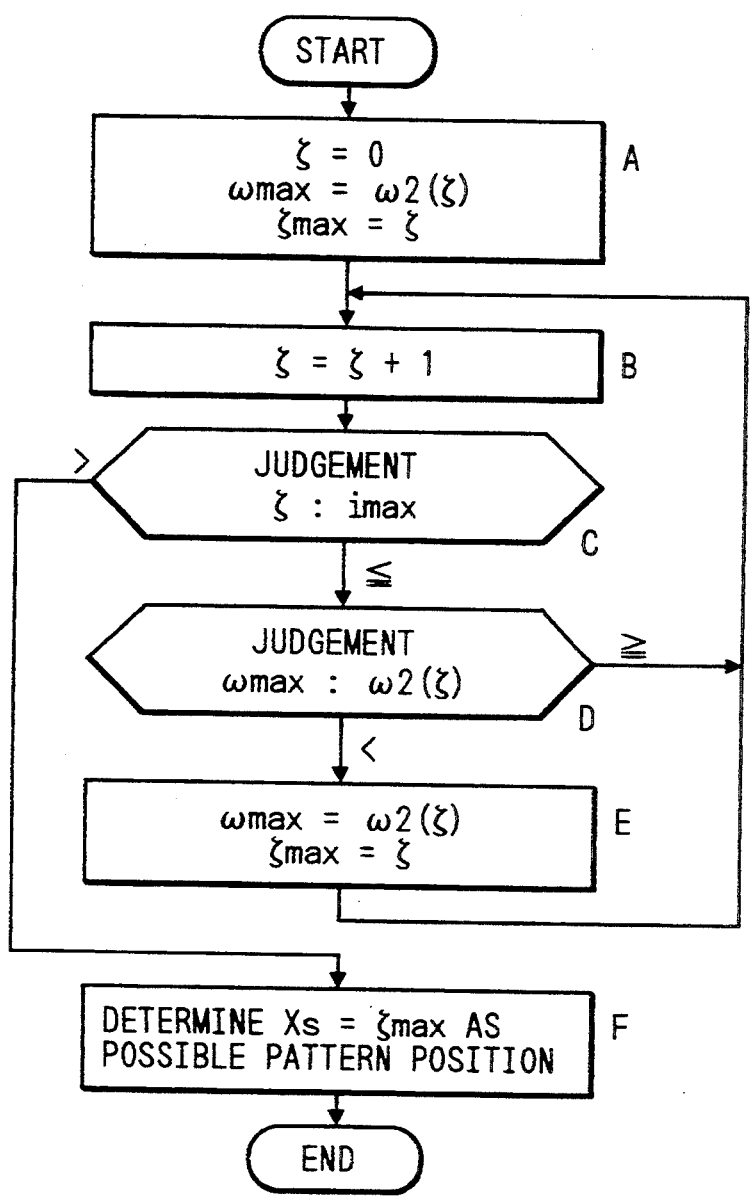
FIG. 19 is a flow chart for determining a key pattern position based on the calculated second evaluation function $\omega$ 2.

FIG. 19 shows in a flow chart the present key pattern determination schedule which is represented by the following formula;

$$Xs = \xi\{\text{at MAX }(\omega 2)\} \qquad (8)$$

(6) Recognition of a pattern form of which histogram consists of two phases consisting of a dark portion and a light portion:

The features of the histogram of such pattern form 47c are enumerated as follows;

(a) The histogram in one pitch consists of two phases, a low flat portion and a high non-flat portion.

(b) However, the high portion is not limited to nonflat.

(c) A sufficient average value difference in the histogram is required between the high portion and the low flat portion.

Figure 20A:
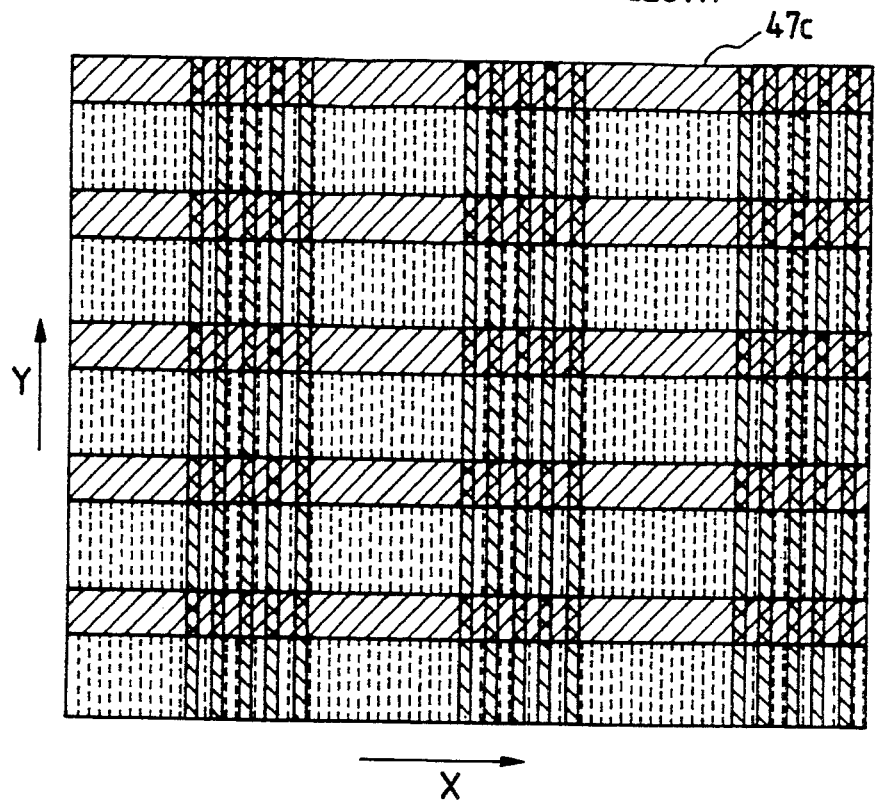
FIG. 20(a) is an input screen image of a third pattern form constituting an object for the pattern recognition process according to the present invention.
Figure 20B:
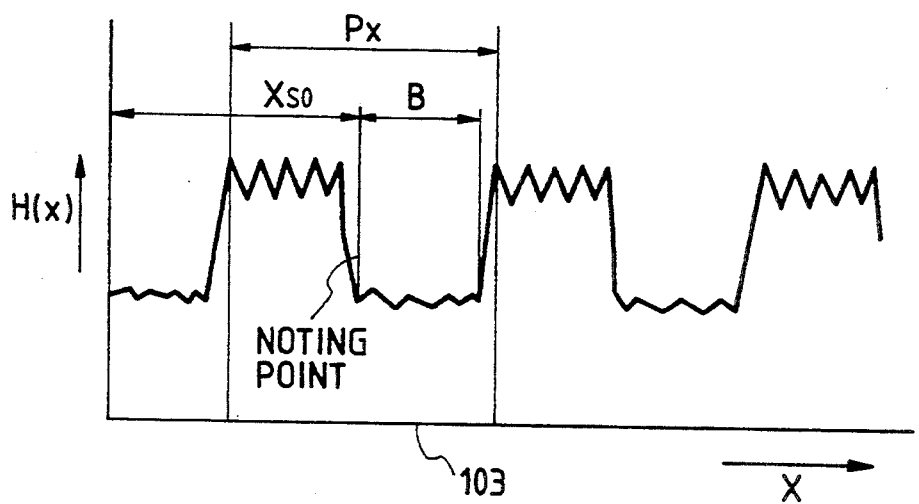
FIG. 20(b) is an X axis projection histogram of the third pattern form prepared based on the input screen image for explaining sampling of teaching data of the third pattern form illustrated in FIG. 20(a).
Figure 21A:
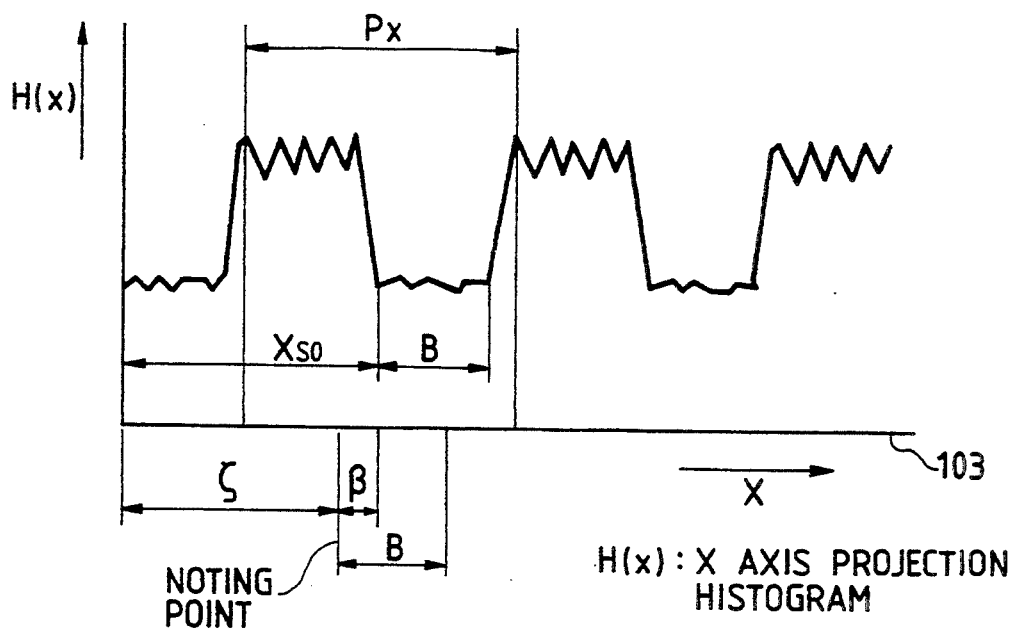
FIG. 21(a) is an X axis projection histogram obtained from an input screen image of the third pattern form on an object for actual pattern matching and FIG. 21(b) is a diagram of a third evaluation function $\omega$ 3 for pattern recognition determined based on the obtained histogram shown in FIG. 21(a).
Figure 21B:
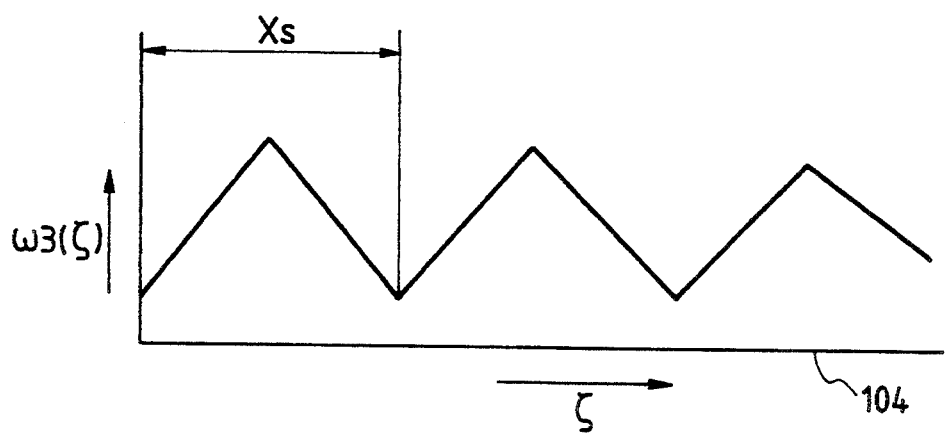
Figure 22:
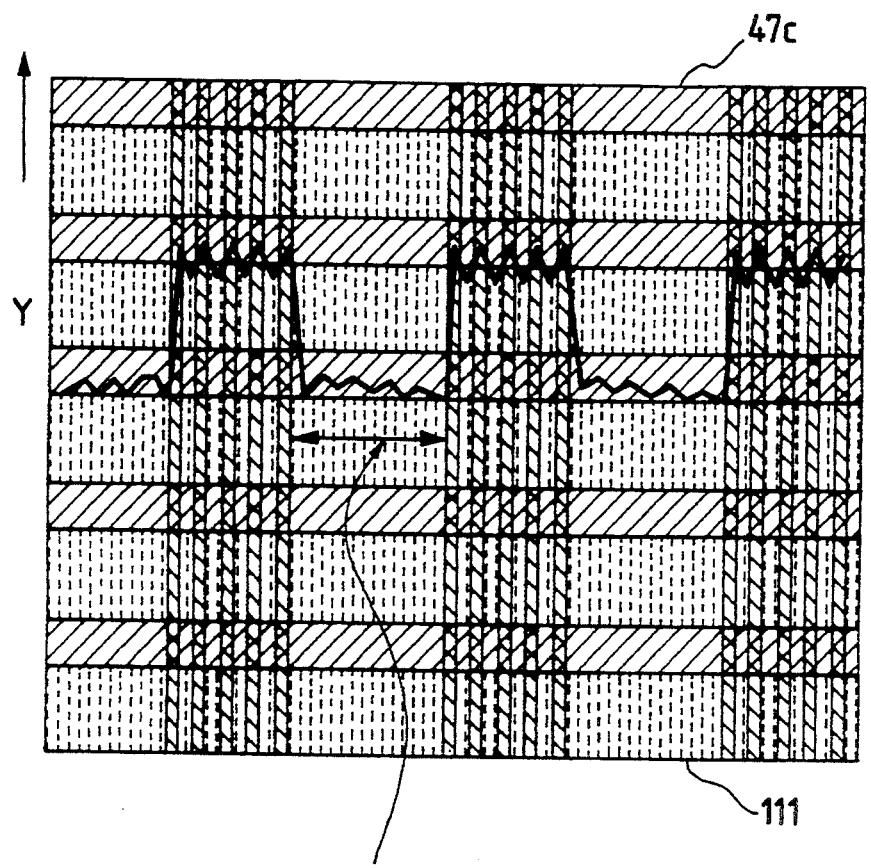
FIG. 22 is a display example on a man-machine screen wherein the obtained X axis projection histogram shown in FIG. 21(a) is superposed on the input screen image of the third pattern for confirming parameters in the histogram which are selected to be used for the pattern recognition.
Figure 23:
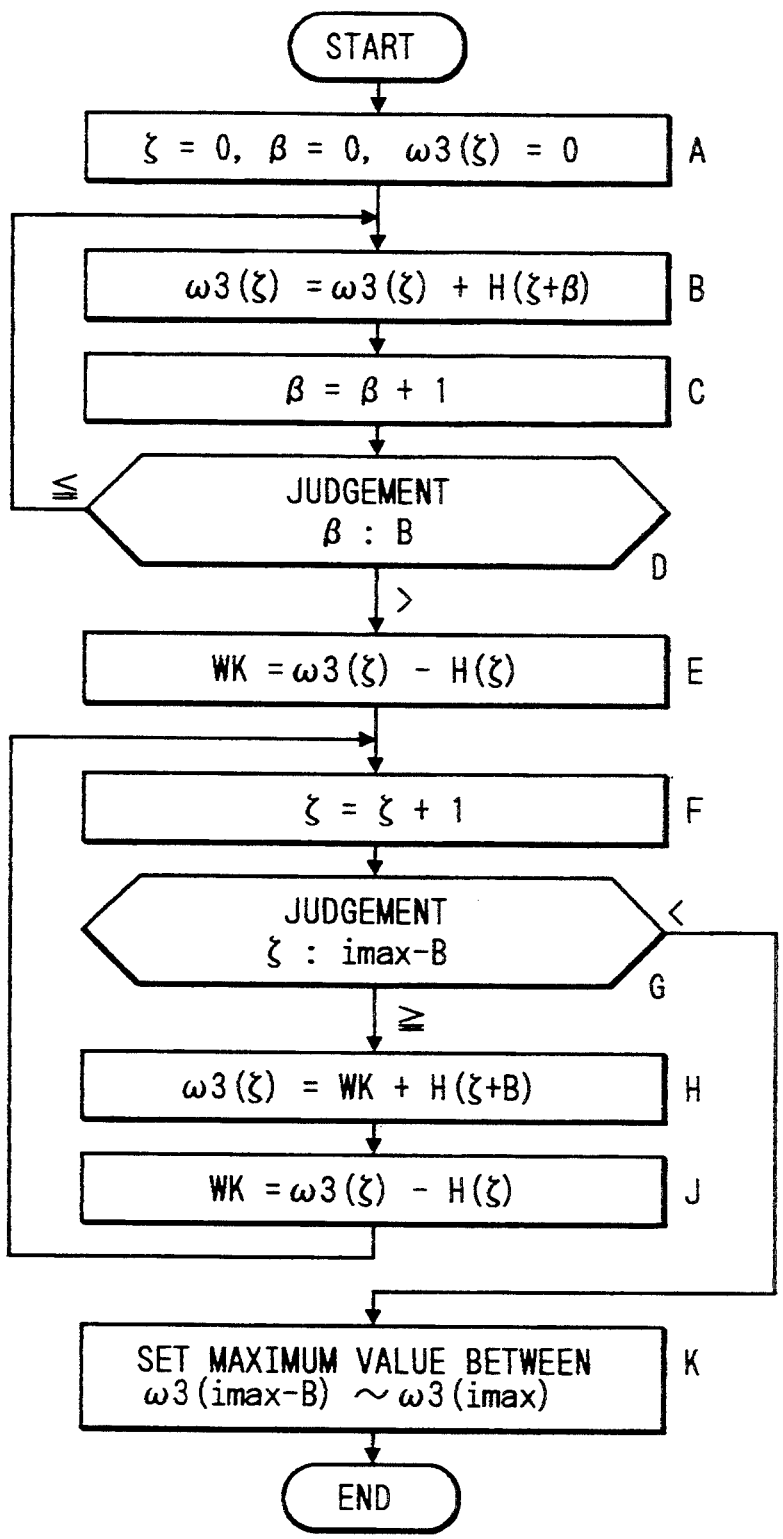
FIG. 23 is a flow chart for explaining the calculation steps of the third evaluation function $\omega$ 3 as shown in FIG. 21(b).

Parameters such as the width B of the lower portion, the key pattern position information Xso and the pattern pitch Px as shown in FIG. 20(b) are stored as teaching data during the teaching stage. The teaching can be performed automatically or manually by an operator. It is important to include such a function which permits confirmation of the taught data on the screen display as shown in FIG. 22, in which the input screen image, the histogram and the width B of the lower portion are displayed by superposing and it will be easily understood that these screen displays are indispensable for determining validity of the present pattern recognition schedule and the width B of the lower portion. During pattern recognition processing, the histogram is accumulated between the width B starting from a noting point while making use of the taught data to determine the accumulated value as the evaluation value at the noting point and further to determine a noting point giving a local minimum evaluation value as a possible key pattern position. FIG. 23 shows in a flow chart calculation steps of the evaluation function represented by the following formula;

$$\omega 3(\zeta) = \sum_{\beta=0}^{B} H(\zeta + \beta) \quad (9)$$

Figure 24:
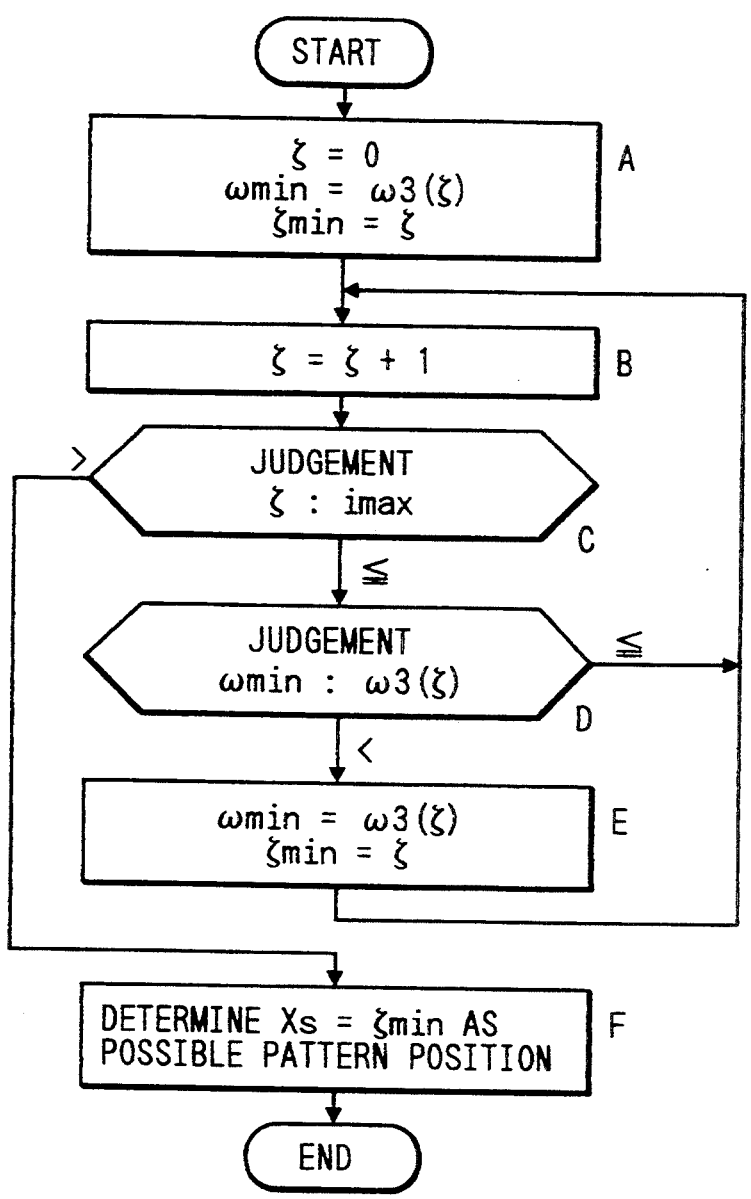
FIG. 24 is a flow chart for determining a key pattern position based on the calculated third evaluation function $\omega$ 3.

FIG. 24 shows in a flow chart the key pattern position determination schedule which is represented by the following formula;

$$Xs = \xi\{\text{at MIN }(\omega 3)\} \quad (10)$$

(7) Recognition of a pattern form of which histogram includes a partially flat and light portion:

The features of the histogram of such pattern form 47d are enumerated as follows;
(a) The histogram consists of two phases of a flat and light portion and a dark portion.
(b) The light portion shows a sufficient lightness difference in average in comparison with the other portions.
(c) The dark portion can be either flat or non flat.

Figure 25A:
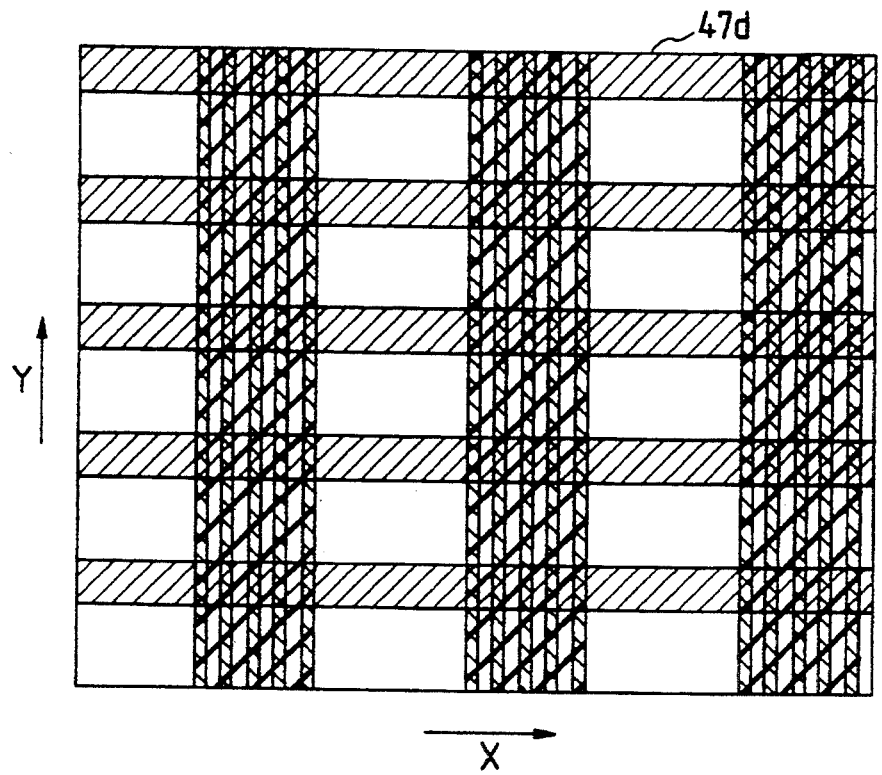
FIG. 25(a) is an input screen image of a fourth pattern form constituting an object for the pattern recognition process according to the present invention.
Figure 25B:
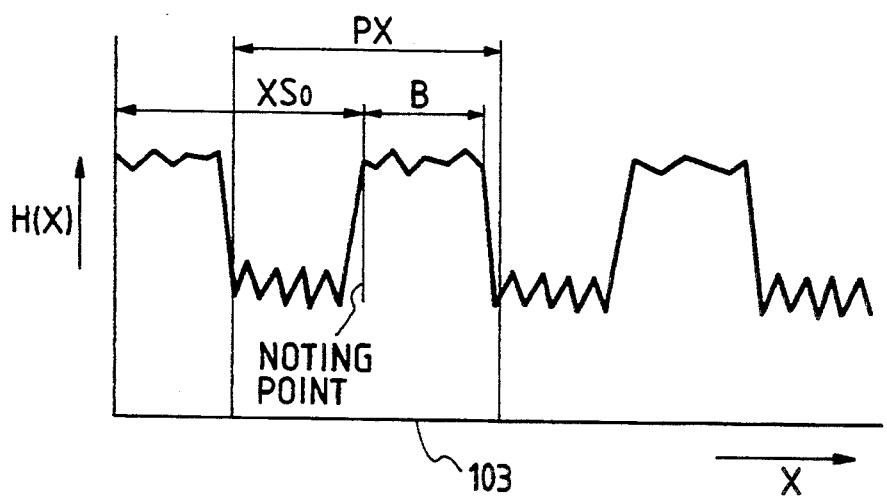
FIG. 25(b) is an X axis projection histogram of the fourth pattern form prepared based on the input screen image for explaining sampling of teaching data of the fourth pattern form illustrated in FIG. 25(a).
Figure 26A:
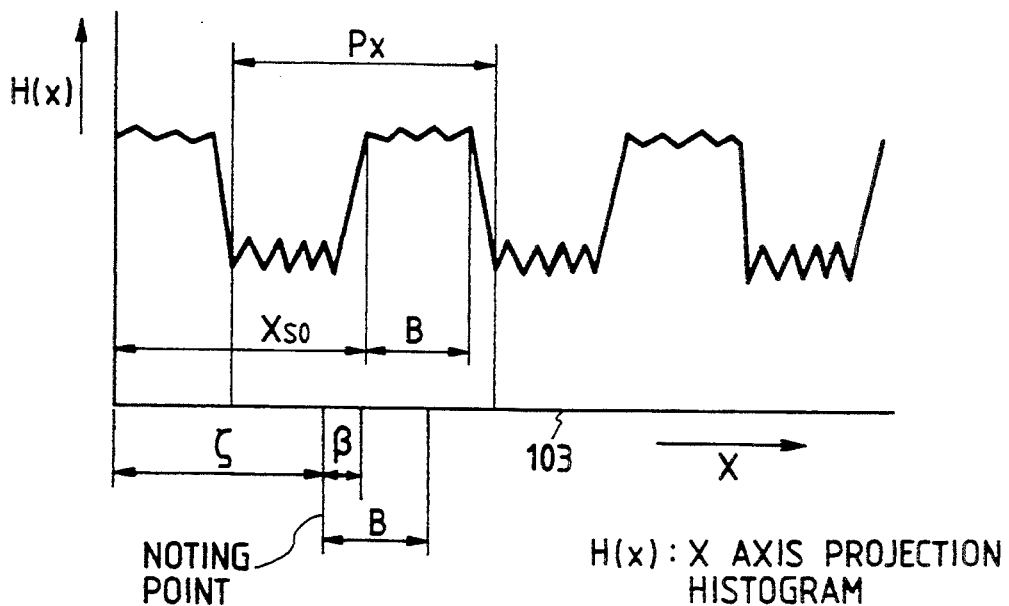
FIG. 26(a) is an X axis projection histogram obtained from an input screen image of the fourth pattern form on an object for actual pattern matching and FIG. 26(b) is a diagram of a fourth evaluation function $\omega$ 4 for pattern recognition determined based on the obtained histogram shown in FIG. 26(a).
Figure 26B:
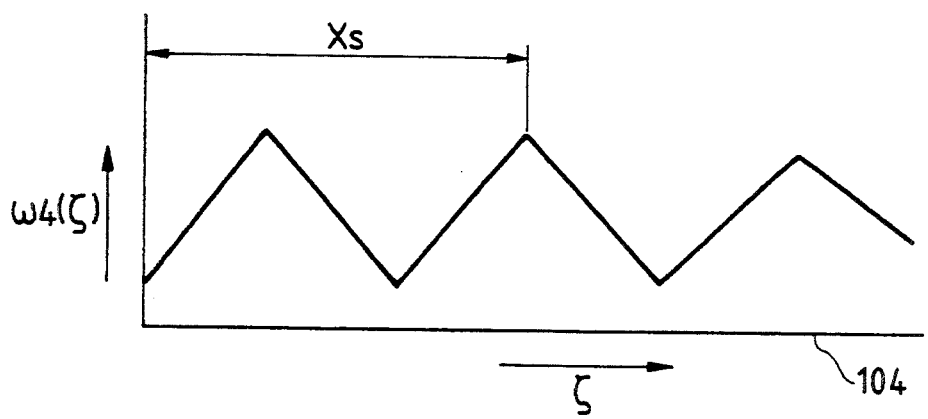
Figure 27:
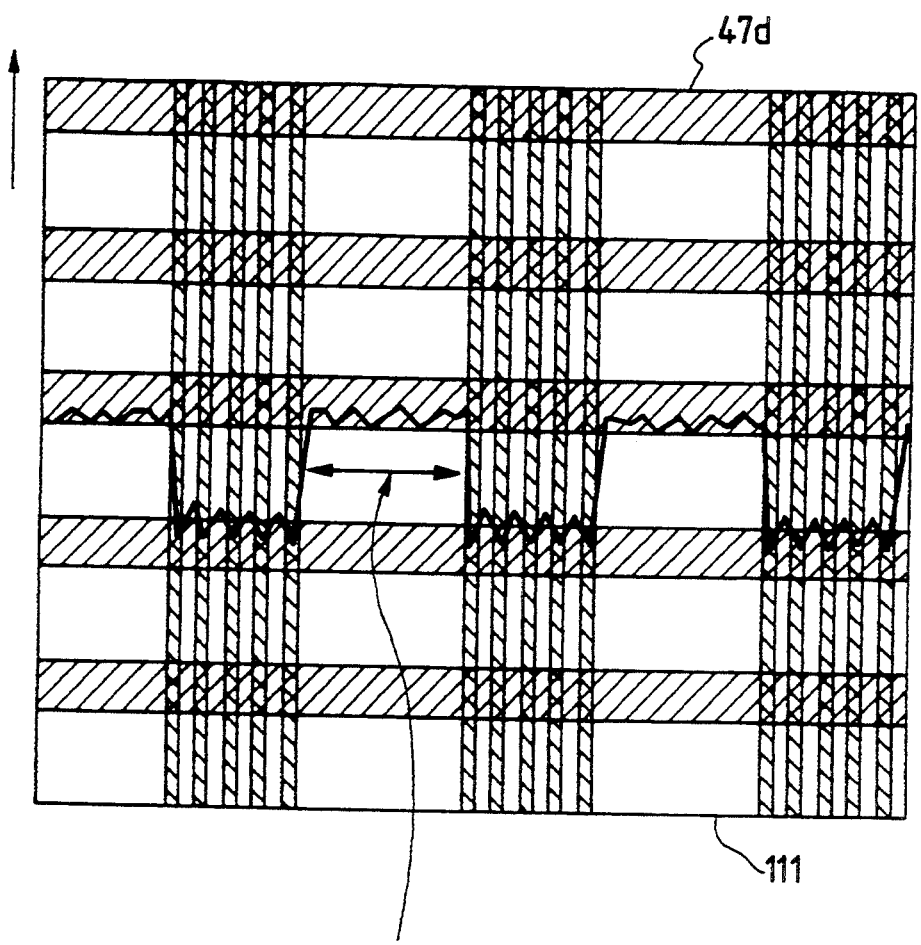
FIG. 27 is a display example on a man-machine screen wherein the obtained X axis projection histogram shown in FIG. 26(a) is superposed on the input screen image of the fourth pattern for confirming parameters in the histogram which are selected to be used for the pattern recognition.

Parameters such as the width B of such as the higher portion, the key pattern position information Xso and the pattern pitch Px as shown in FIG. 25(b) are stored as teaching data during the teaching stage. The teaching can be performed automatically or manually by an operator. It is important to include such a function which permits confirmation of the teaching result on the screen display such as shown in FIG. 27. On the screen as shown in FIG. 27, such as the input screen image, the histogram and the width B of the higher portion are displayed by superposing and it will be easily understood that these screen displays are indispensable for confirming validity of the present pattern recognition schedule and the width B of the higher portion.

Figure 28:
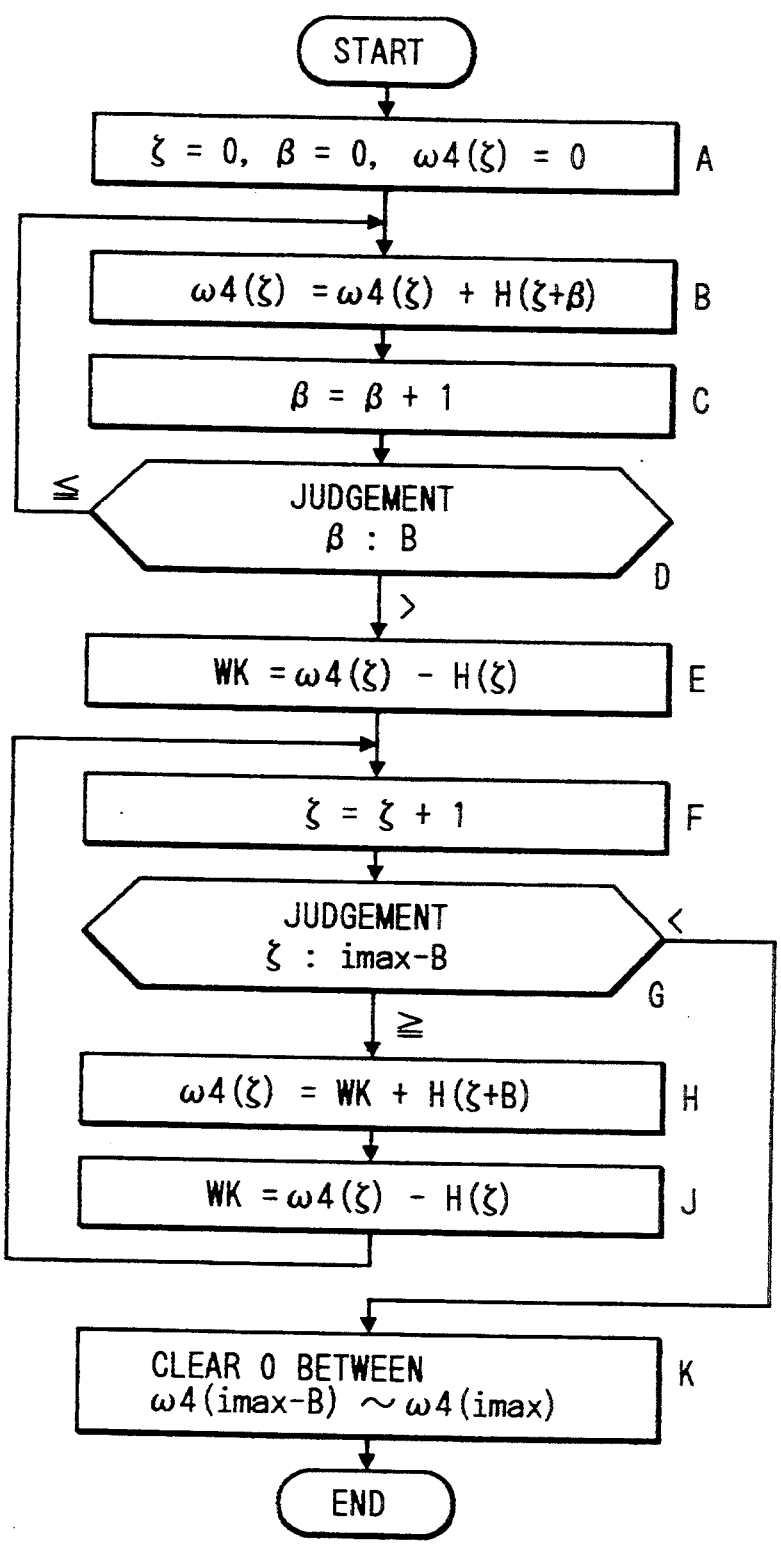
FIG. 28 is a flow chart for explaining the calculation steps of the fourth evaluation function $\omega$ 4 as shown in FIG. 26(b).

During actual pattern recognition stage, the histogram is accumulated over the width B starting from a noting point while making use of the taught data to determine the accumulated value as an evaluation value at the noting point and further to determine a noting point giving a local maximum evaluation value as a posible point for pattern matching point. FIG. 28 shows in a flow chart calculation steps of the evaluation function represented by the following formula:

$$\omega 4(\zeta) = \sum_{\beta=0}^{B} H(\zeta + \beta) \quad (11)$$

Figure 29:
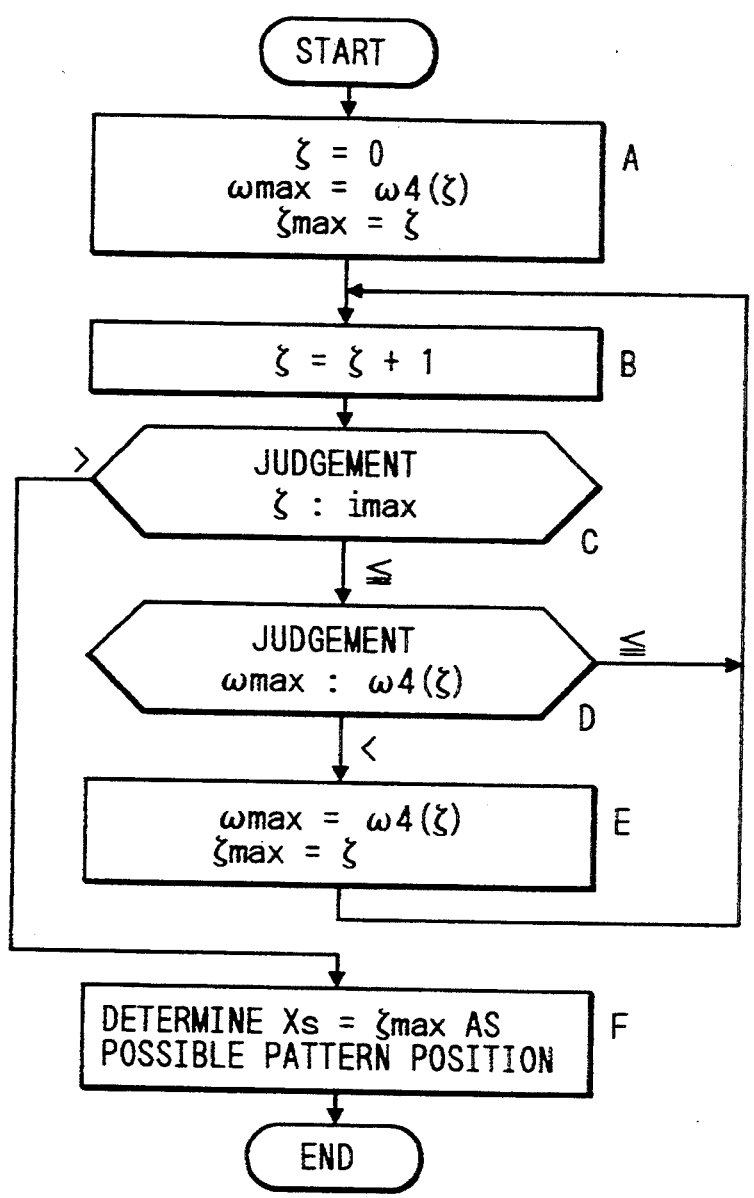
FIG. 29 is a flow chart for determining a key pattern position based on the calculated fourth evaluation function $\omega$ 4.

FIG. 29 shows in a flow chart the key pattern position determination schedule represented by the following formula;

$$Xs = \xi\{\text{at MAX }(\omega 4)\} \quad (12)$$

(8) Recognition of a pattern form of which the histogram includes crowded crests of indefinite height and a stand alone crest on a flat portion:

The features of the histogram of such pattern form 47c are enumerated as follows;
(a) There are a plurality of remarkable crests in a group of comparatively crowded crests and at the same time a single stand alone crest in a flat portion.
(b) The height of the crests in the crowded crest portion can be higher than that of the stand alone crest.

Figure 30A:
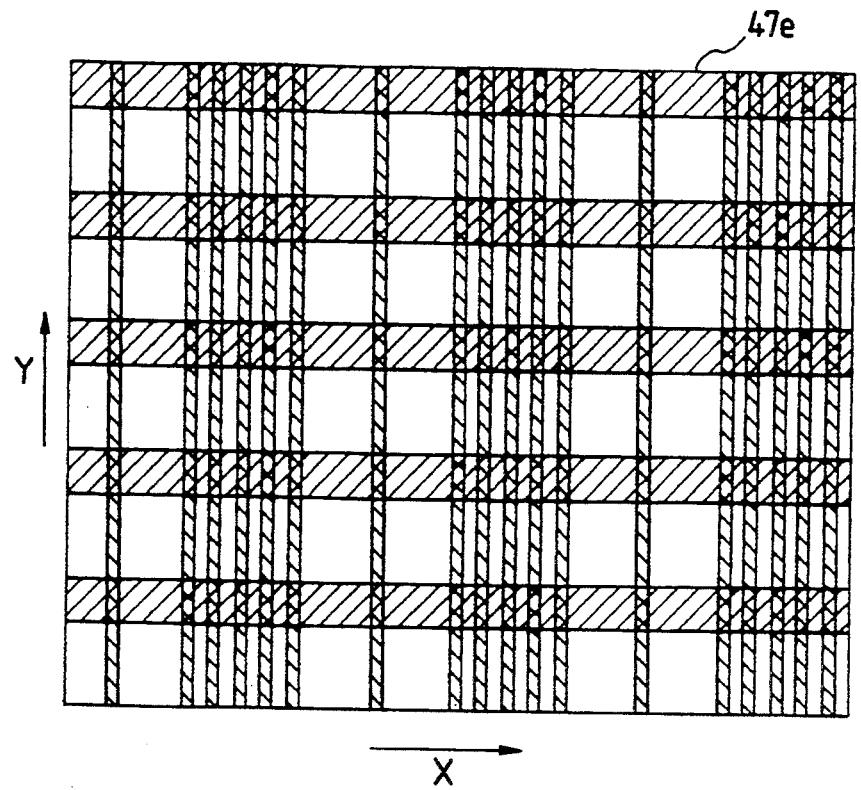
FIG. 30(a) is an input screen image of a fifth pattern form constituting an object for the pattern recognition process according to the present invention.
Figure 30B:
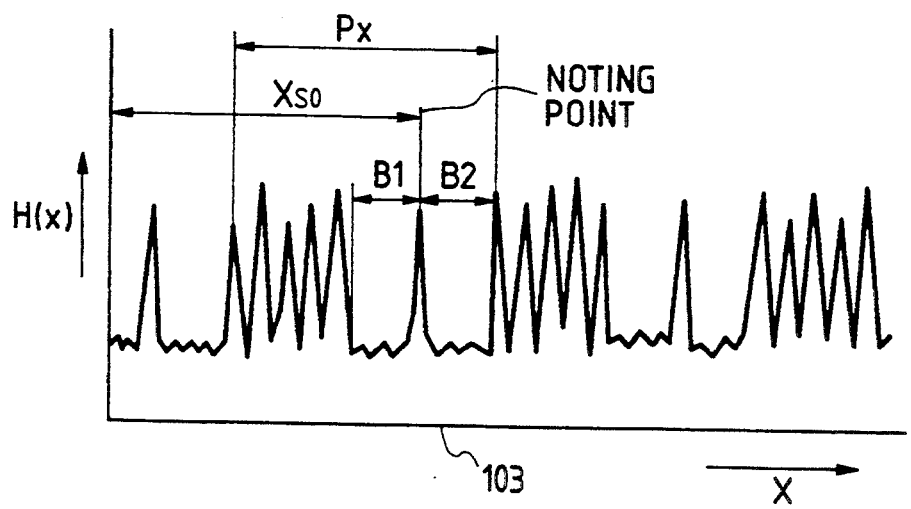
FIG. 30(b) is an X axis projection histogram of the fifth pattern form prepared based on the input screen image for explaining sampling of teaching data of the fifth pattern form illustrated in FIG. 30(a).
Figure 31:
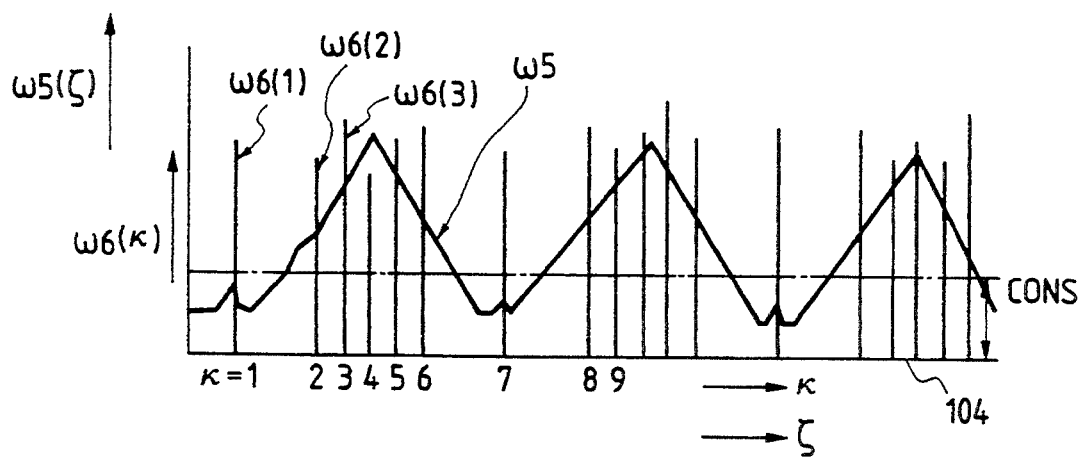
FIG. 31 is a diagram of fifth and sixth evaluation functions $\omega$ 5 and $\omega$ 6 for pattern recognition determined based on the obtained histogram shown in FIG. 30(b).
Figure 33:
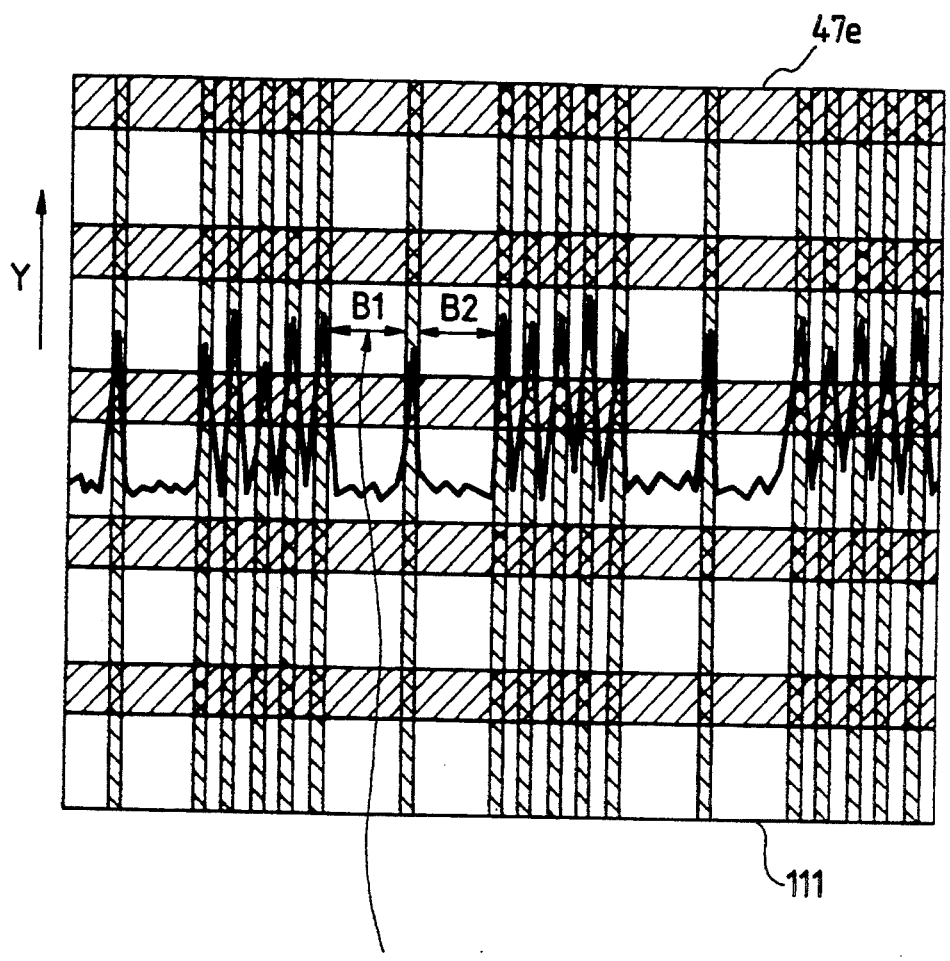
FIG. 33 is a display example on a man-machine screen wherein the obtained X axis projection histogram shown in FIG. 32(a) is superposed on the input screen image of the fifth pattern for confirming parameters in the histogram which are selected to be used for the pattern recognition.

Parameters such as the widths B1 and B2 on the flat portion before and after the stand alone crest, the key pattern position information Xso and the pattern pitch Px as shown in FIG. 30(b) are stored as teaching data during the teaching stage. Further, the histogram is accumulated over the widths B1 and B2 to determine a threshold value CONS for specifying the stand alone crest as shown in FIG. 31. The teaching can be performed automatically or manually by an operator. It is important to incorporate such function which permits confirmation of the taught data on the screen display as shown in FIG. 33. On the screen display in FIG. 33, the input screen image, the histogram and the width B1 and B2 on the flat portion before and after the stand alone crest are displayed in a superposed manner such that it will be easily understood that these screen displays are indispensable for confirming validity of the present pattern recognition schedule and the widths B1 and B2.

Figure 32A:
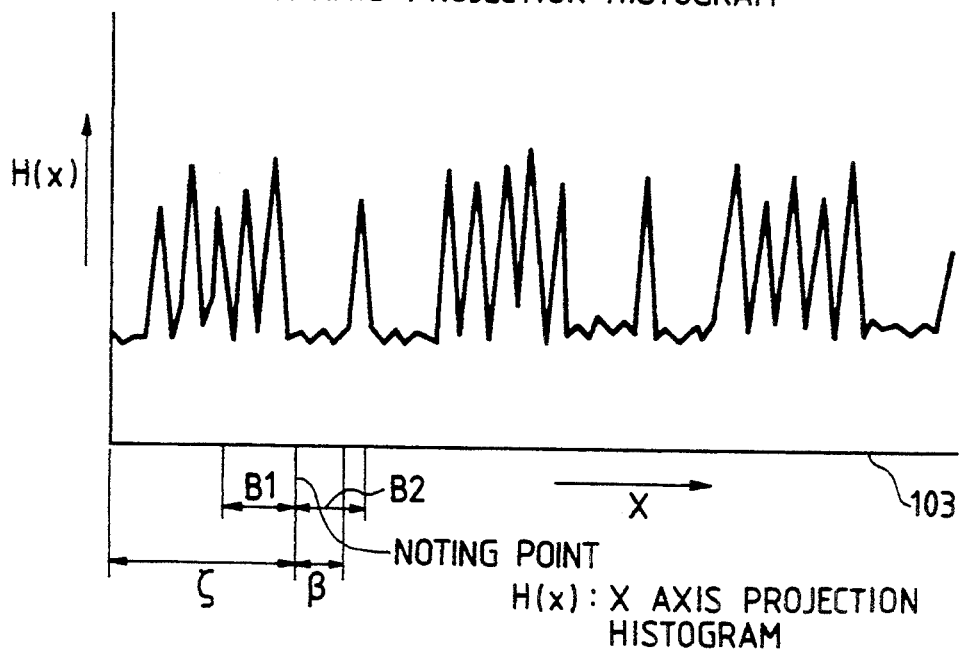
FIG. 32(a) is an X axis projection histogram obtained from an input screen image of the fifth pattern form on an object for actual pattern matching and FIG. 32(b) is a diagram of the fifth and sixth evaluation functions $\omega$ 5 and $\omega$ 6 for pattern recognition determined based on the obtained histogram shown in FIG. 32(a).
Figure 32B:
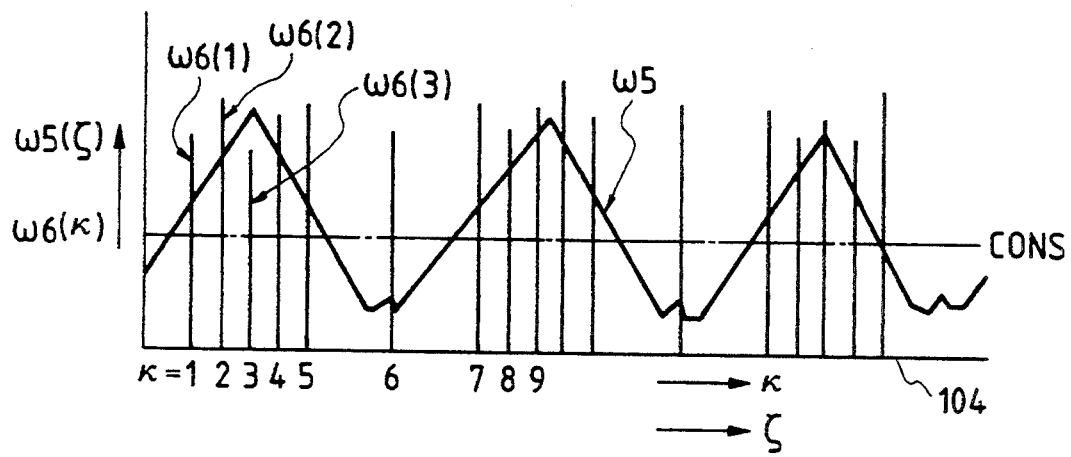
Figure 34:
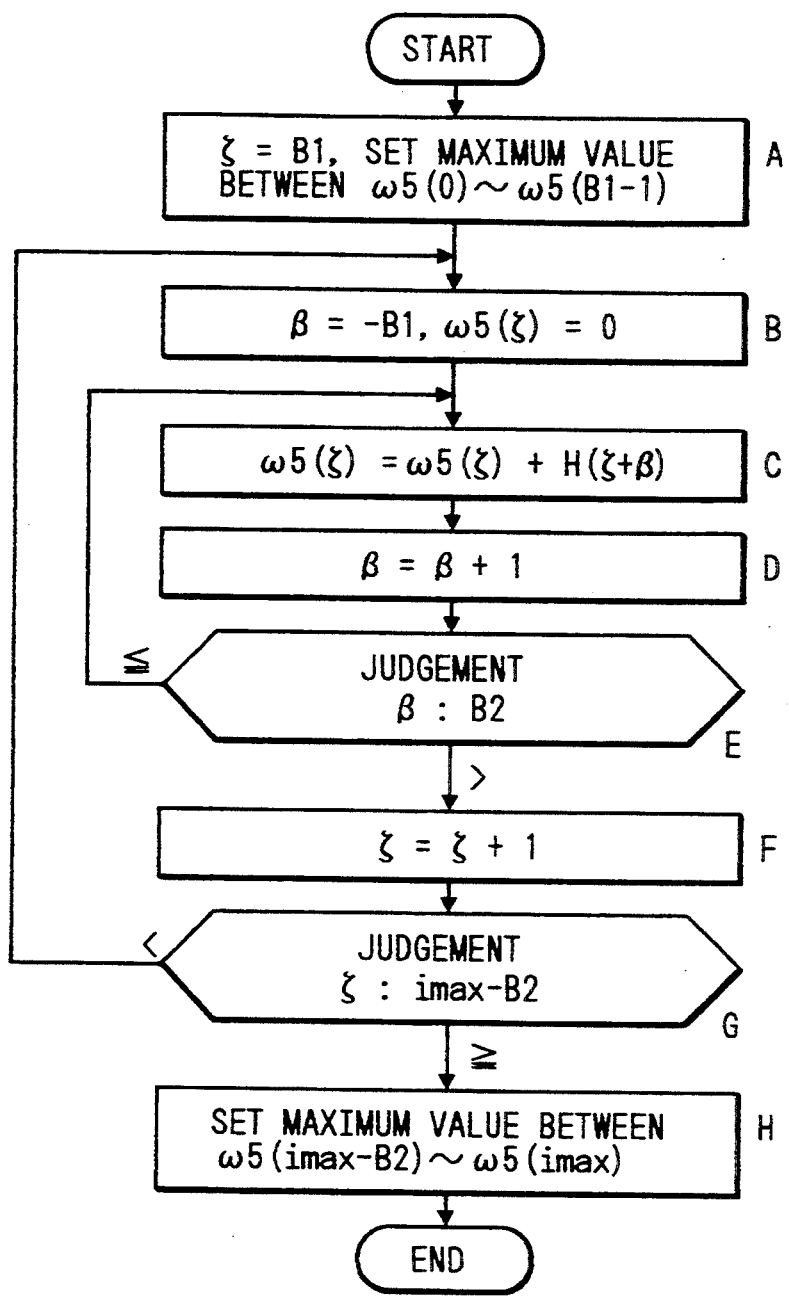
FIG. 34 is a flow chart for explaining the calculation steps of the fifth evaluation function $\omega$ 5 as shown in FIG. 32(b).
Figure 35:
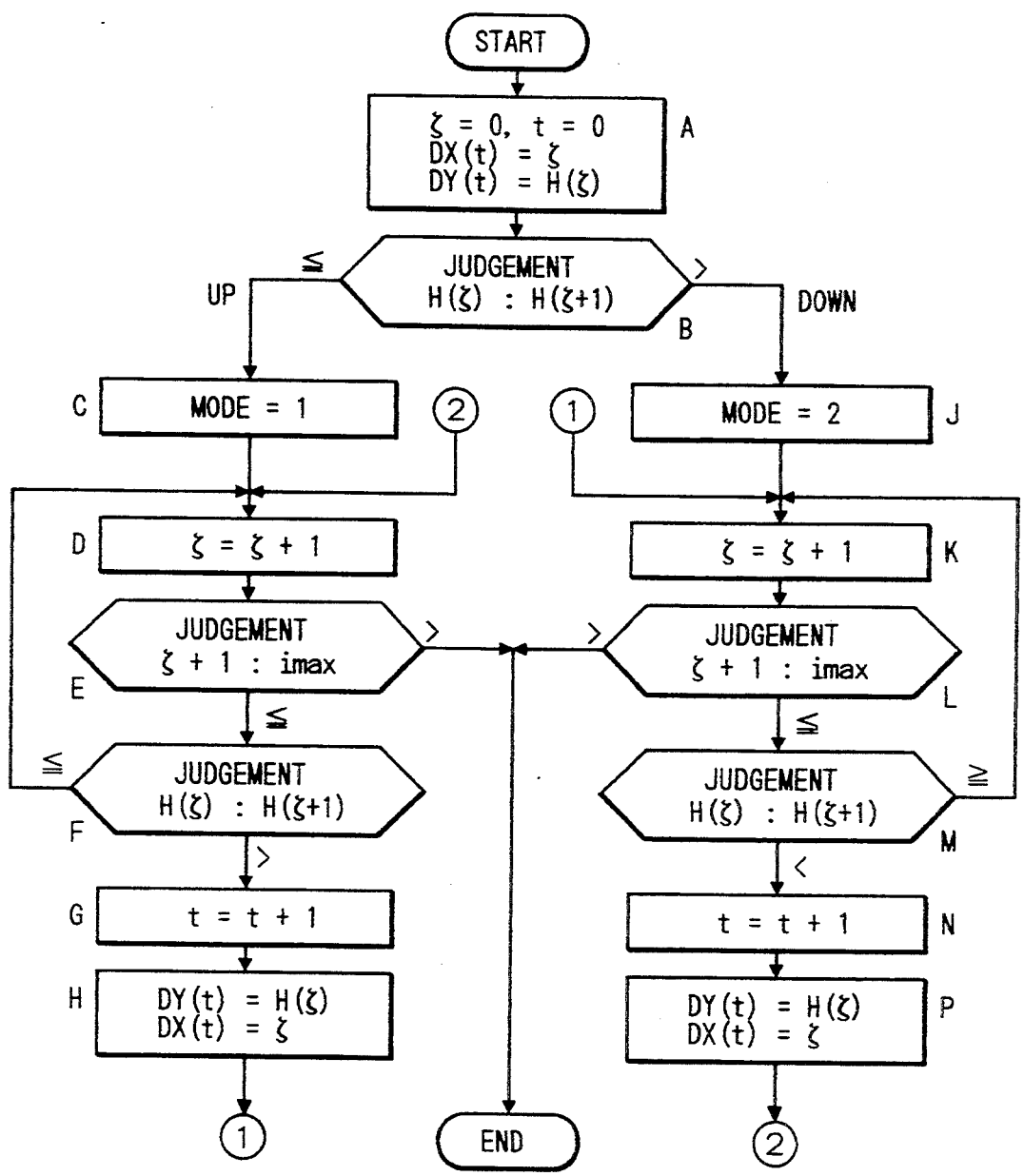
FIG. 35 is a flow chart for explaining the calculation steps of the sixth evaluation function $\omega$ 6 as shown in FIG. 32(b) based on the prepared projection histogram as shown in FIG. 32(a).
Figure 36:
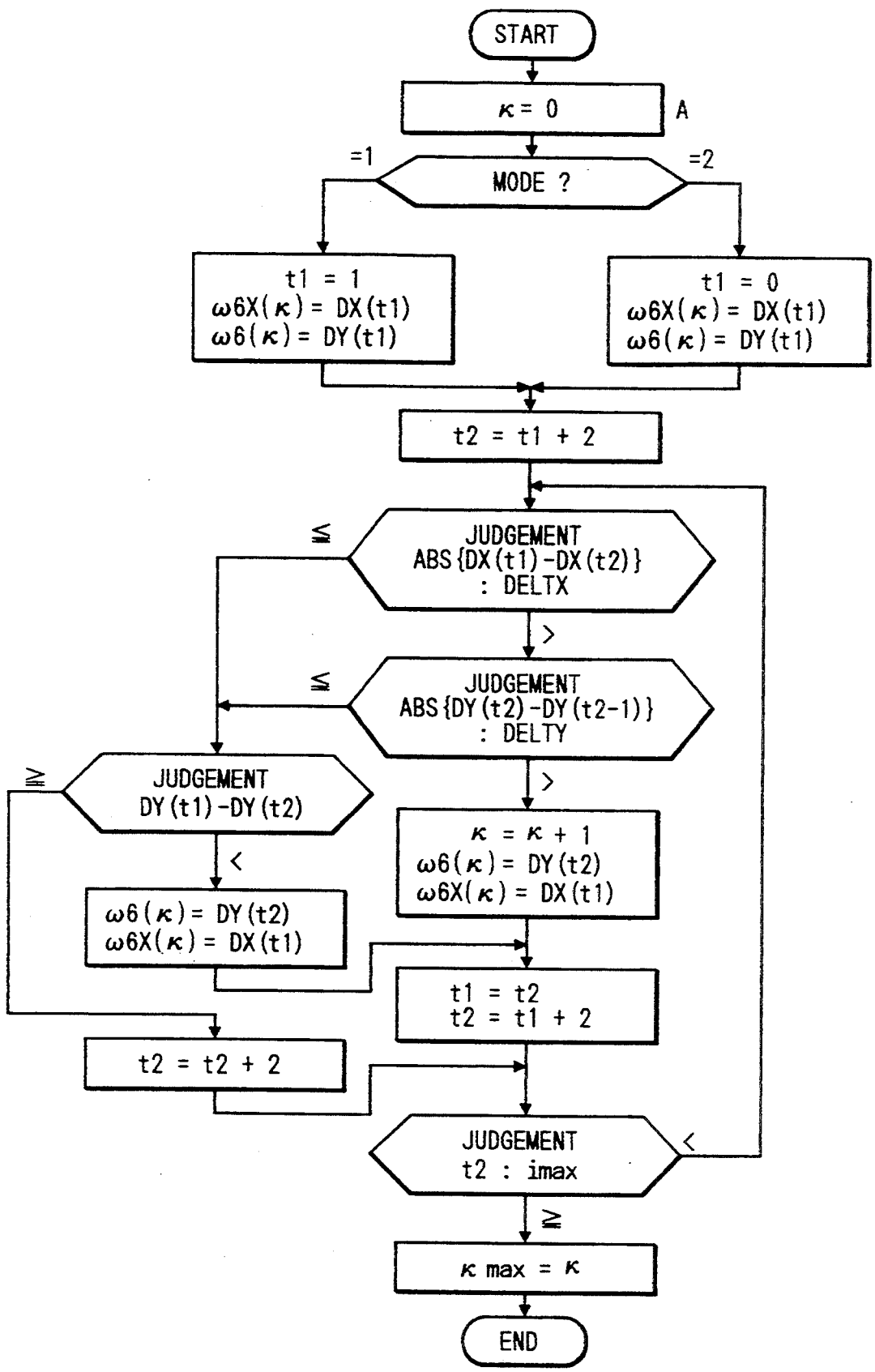
FIG. 36 is a flow chart for explaining counting steps of total crest number based on the calculated sixth evaluation function ω 6.

During an actual pattern recognition, the histogram is accumulated over the widths between $-B1$ and B2 starting from a noting point as illustrated in FIG. 32(a) and FIG. 32(b) to determine the accumulated value as an evaluation value for the noting point, to select crests having an evaluation value below the threshold value CONS as a recognition object and finally to determine a crest having a maximum evaluation value among the crests of recognition object as a possible key pattern position. FIG. 34, FIG. 35 and FIG. 36 show in flow charts calculation steps of the evaluation functions represented by the following formulas;

$$\omega 5(\zeta) = \sum_{\beta=-B1}^{B2} ABS(\Delta H(\zeta + \beta)) \quad (13)$$

$\omega 6(K)$, $\omega 6X(k)$: noncontinuous functions representing the height and position of crests in the histogram (14)

representing the height and position of crests in the histogram wherein k represents appearing order of crests in the histogram, however the crests are limited to remarkable crests and small crests are neglected.

Figure 37:
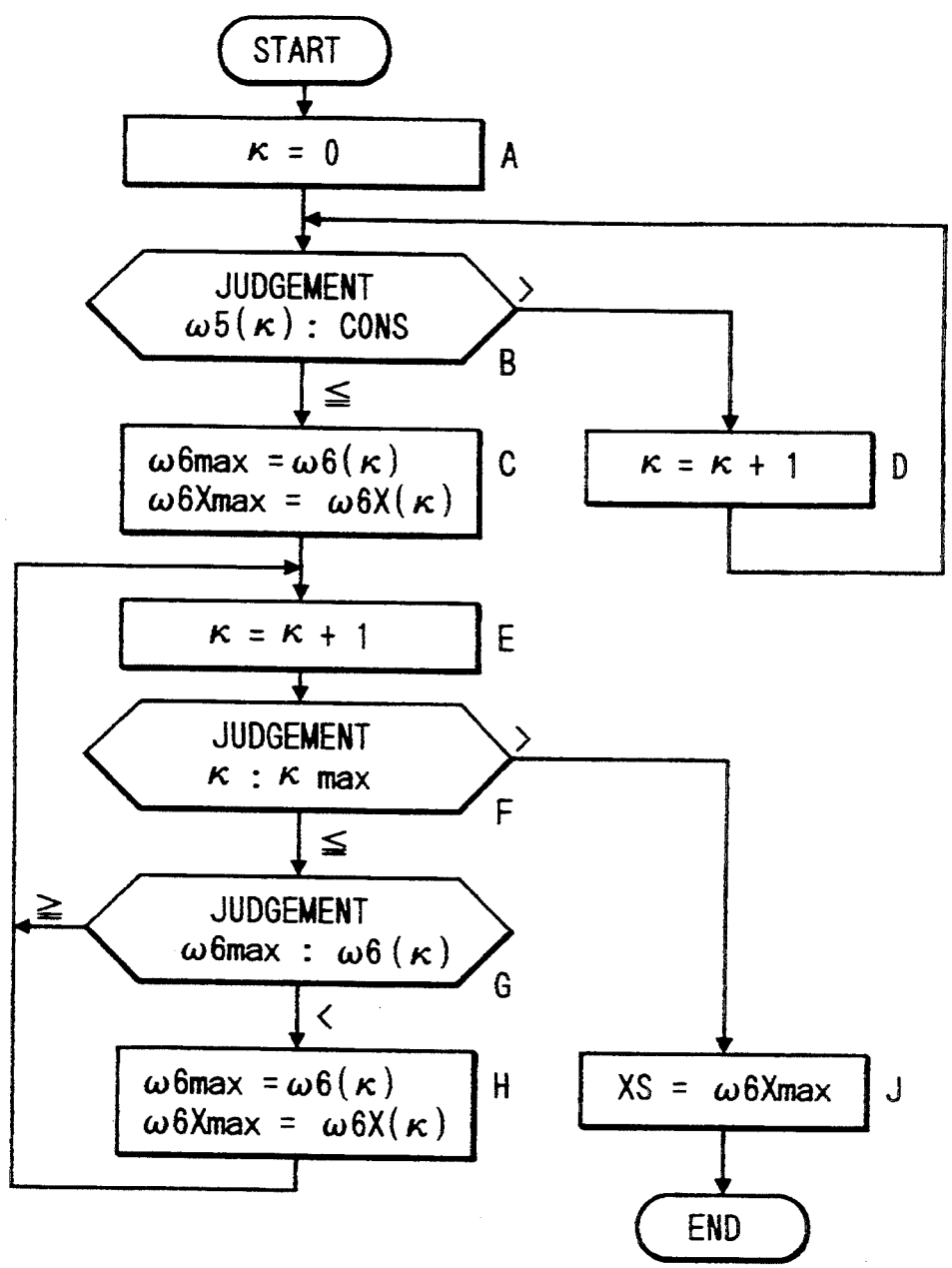
FIG. 37 is a flow chart for determining a key pattern position based on the calculated fifth and sixth evaluation functions ω 5 and ω 6.

FIG. 37 shows in a flow chart the key pattern position determining schedule represented by the following formula;

$$Xs = \xi[\text{at MAX }\{\omega 6(k)\} \text{ AND }\{\omega 5(\xi) < \text{cons}\}] \quad (15)$$

Figure 38A:
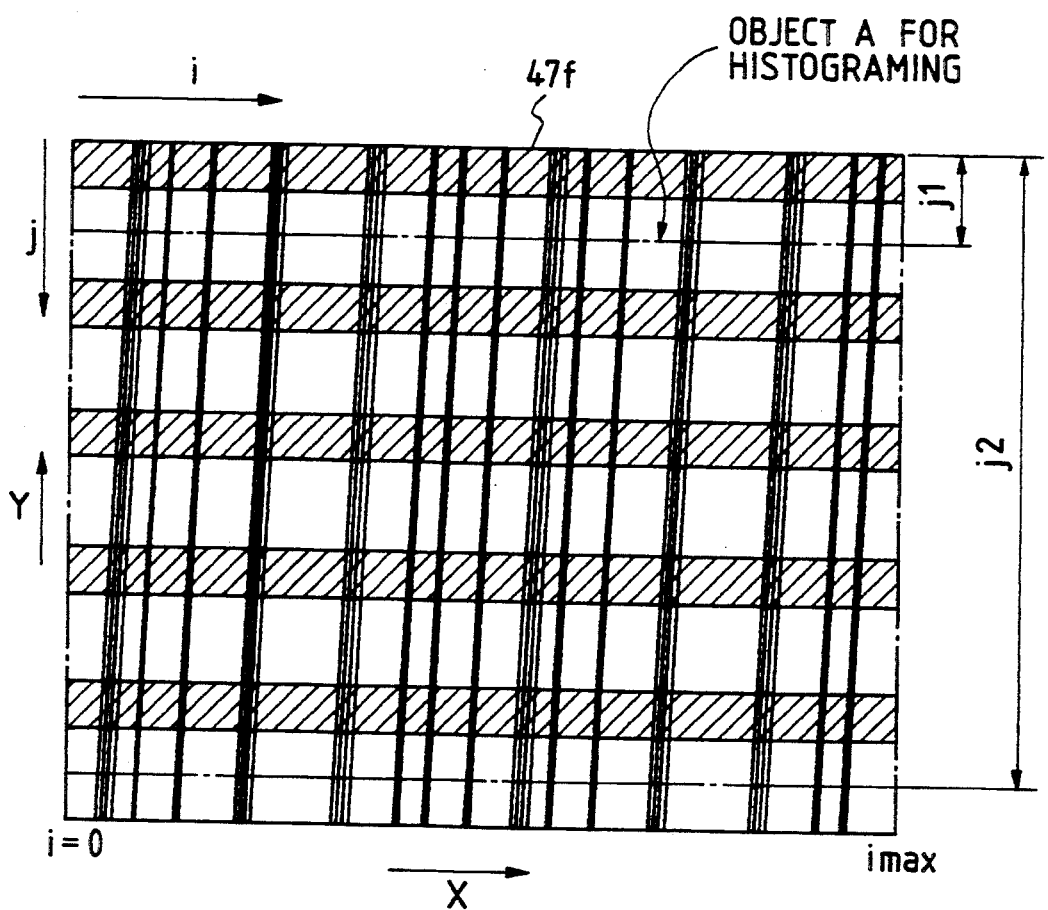
FIG. 38(a) is an input screen image of a sixth pattern form having inclined vertical lines and constituting an object for pattern recognition process according to the present invention.
Figure 38B:
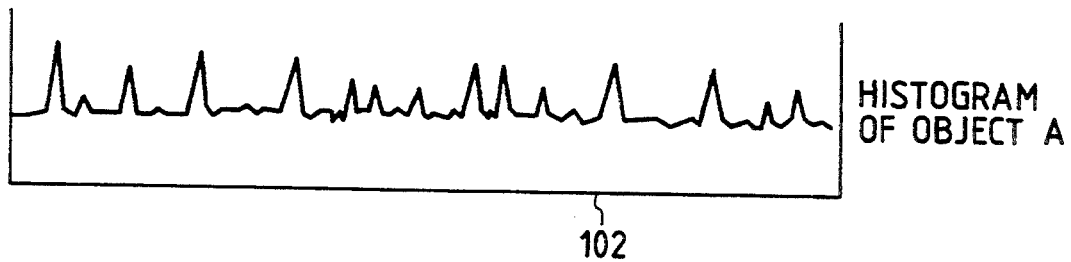
FIG. 38(b) is an X axis projection histogram of the sixth pattern form prepared based on the input screen image over the region indicated as object A for histograming in FIG. 38(a).
Figure 39A:
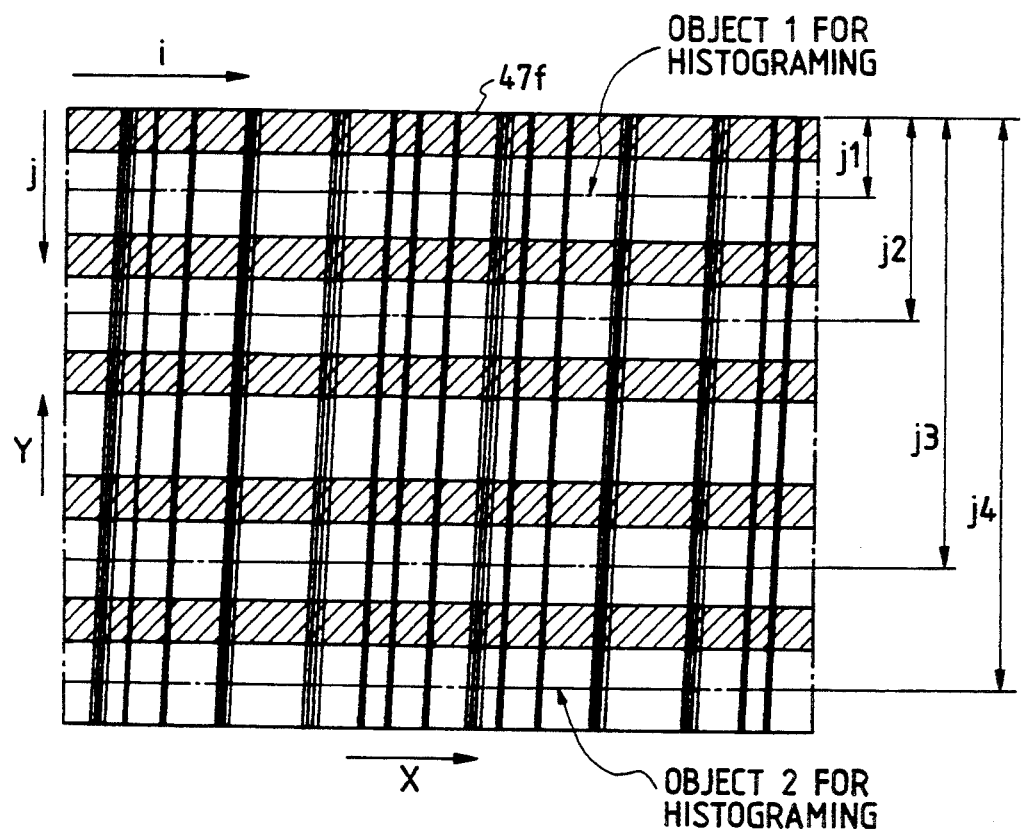
FIG. 39(a) is an input screen image of the sixth pattern form having inclined vertical lines and constituting an object for pattern recognition process according to the present invention.
Figure 39B:
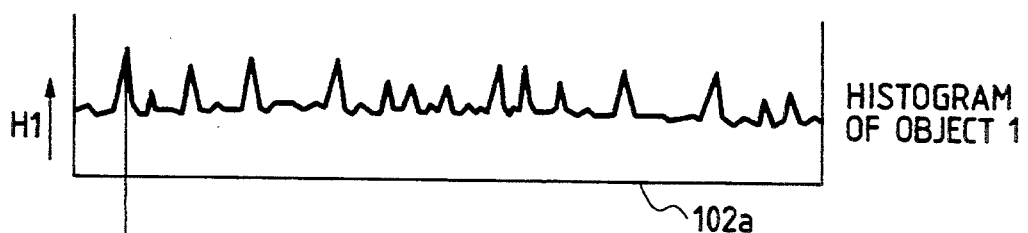
FIG. 39(b) is an X axis projection histogram of the sixth pattern form prepared based on the input screen image over the region indicated as object 1 for histograming in FIG. 39(a) and FIG. 39(c) is an X axis projection histogram of the sixth pattern form prepared based on the input screen image over the region indicated as object 2 for histograming in FIG. 39(a).
Figure 39C:
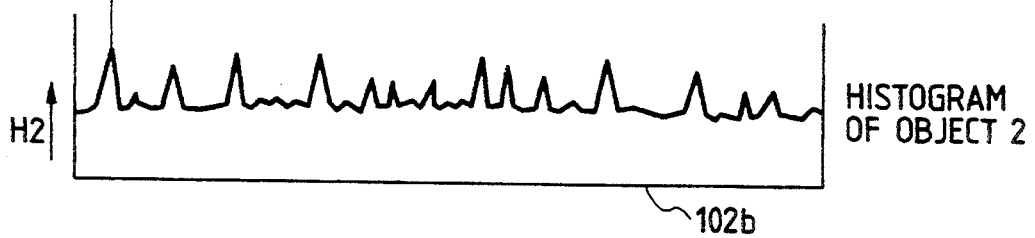
Figure 40:
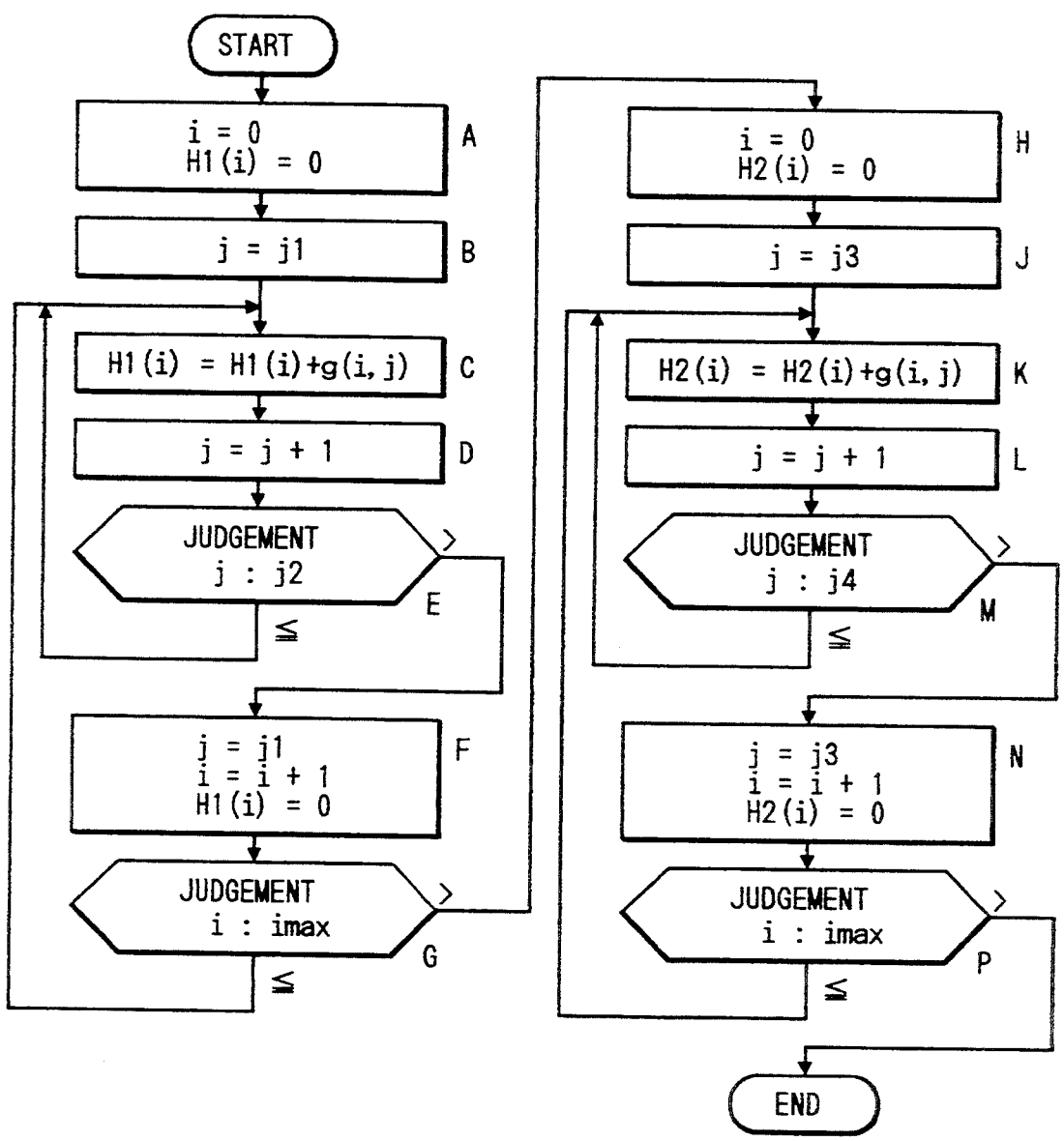
FIG. 40 is a flow chart for explaining the preparation of the two X axis concentration accumulated projection histograms from the sixth pattern form having inclined vertical lines as shown in FIG. 39(b) and FIG. 39(c).
Figure 41:
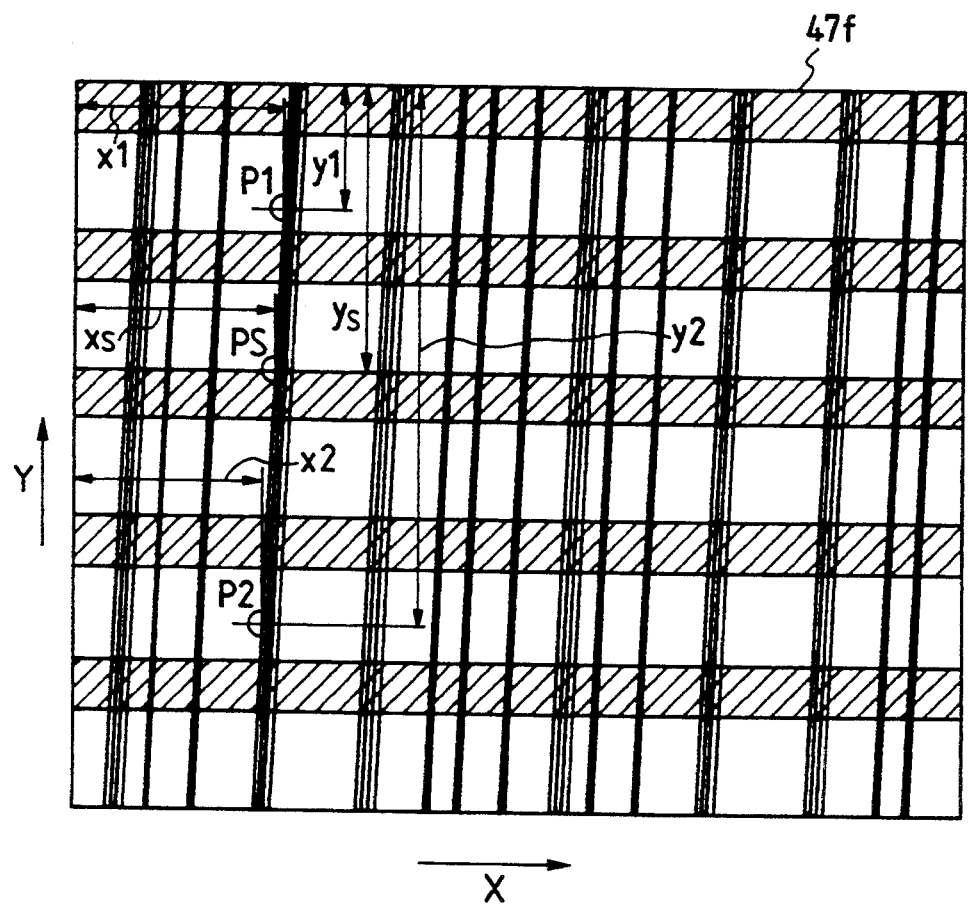
FIG. 41 is a view for explaining a method of determining a key pattern position on the sixth pattern form having inclined vertical lines by making use of the two X axis concentration accumulated projection histograms prepared based on the flow chart of FIG. 40 and as illustrated in FIG. 39(b) and FIG. 39(c).

(9) Recognition of a pattern form including inclined vertical striped pattern:

Now, a highly accurate positioning schedule for a pattern form 47f having slightly inclined stripes is explained. When vertical lines constituting such pattern form are inclined as illustrated in FIG. 38 (a), it was difficult to accurately determine a key pattern position by making use of the histogram as shown in FIG. 38 (b) which was generated of such pattern form by scanning over the region j1~j2. In such instance, an accurate positioning can be realized if histograms at two regions as illustrated in FIG. 39 (a) are separately generated. FIG. 40 shows in a flow chart the generation of the two histograms wherein the histogram generated over the region j1~j2 is indicated as H1 and the histogram generated over the region j3~j4 is indicated as H2. Assuming that a key pattern position to be determined is expressed as PS(Xs, Xy) and the coordinate position Ys of the lateral striped pattern is determined separately based on one of the above explained pattern recognition schedules because the lateral lines of the pattern form are not inclined. The coordinate position Xs of the inclined vertical striped pattern is determined according to the following steps;

Step 1: A first provisional position is determined within the region j1~j2 by making use of the histogram H1 and the resultant first provisional position is identified as P1 (x1, y1), wherein x1 is determined through analysis of the histogram H1 in the same manner as in one of the pattern recognition schedules as explained above, and $$y1 = (j1+j2)/2$$

Step 2: A second provisional position is determined within the region j3~j4 by making use of the histogram H2 and the resultant second provisional position is identified as P2(x2, y2), wherein x2 is determined through analysis of histogram H2 in the same manner as in one of the pattern recognition schedules as explained above, and $$y2 = (j3+j4)/2$$

Step 3: Determination of Ps ($x_S$, $Y_S$)

It is assumed that the coordinate position $Y_s$ of the lateral striped position has been determined as explained above. The coodinate position xs of the vertical striped pattern is determined based on the following formula;

$$Xs = X2 + (x1-x2) \times (y2-y_s)/(y2-y1) \quad (16)$$

Figure 42:
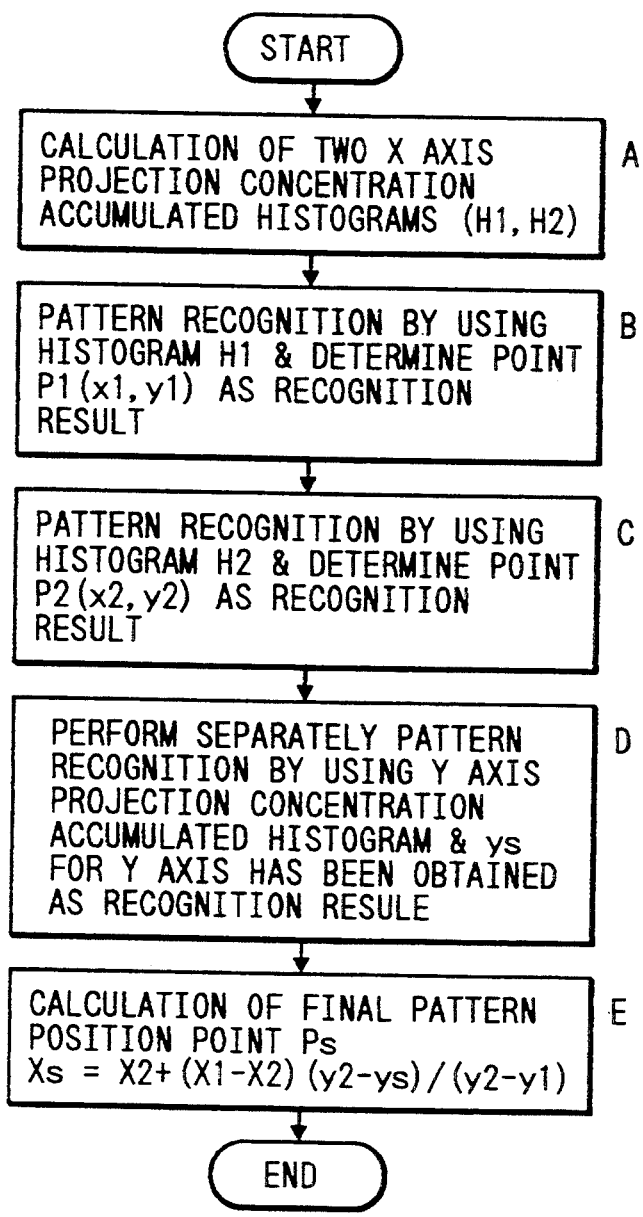
FIG. 42 is a flow chart performed for determining the key pattern position on the sixth pattern form according to the method explained in connection with FIG. 41.

FIG. 42 shows in a flow chart the above explained steps.

In the above, determination of the key pattern position for a pattern form having inclined vertical stripes has been explained, however substantially the same schedule can be applied to a pattern form having inclined lateral stripes, therefore the explanation thereof is omitted.

(10) Determination of a key pattern position for a pattern form having both inclined lateral and vertical stripes:

For the determination of a key pattern position for a pattern form 47g having both inclined lateral and vertical stripes, the following schedule can be used with a resultant high accuracy.

Figure 43:
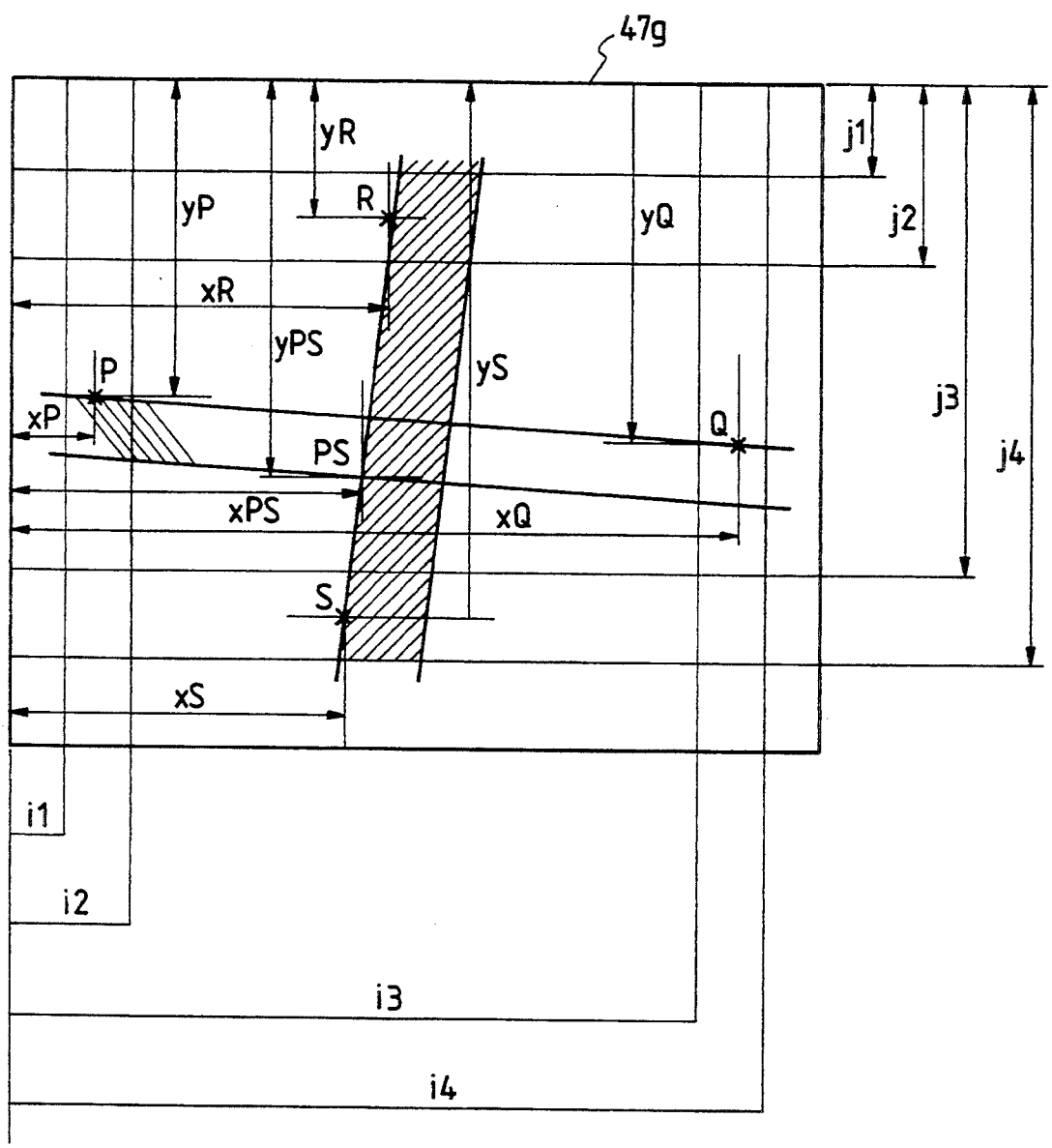
FIG. 43 is a view for explaining a method of determining a key pattern position on a seventh pattern form having inclined vertical and lateral lines by making use of two X axis concentration accumulated projection histograms and two Y axis concentration accumulated projection histograms of the seventh pattern form.

FIG. 43 is a diagram for explaining the determination steps wherein H1x and H2x are first and second X axis projection histograms covering the regions j1~j2 and j3~j4 respectively, and H1y and H2y are first and second Y axis projection histograms covering the regions i1~i2 and i3~i4 respectively.

The following steps are taken for the key pattern position recognition.

Step 1: A first provisional position R (xR, yR) is determined by making use of the first X axis projection histogram H1x, wherein the coordinate position xR is determined via analysis of the first X axis projection histogram H1x in the same manner as in one of the pattern recognition schedules as explained above, and $$yR = (j1+j2)/2$$

Step 2: A second provisional position S (xS, yS) is determined by making use of the second X axis projection histogram H2x, wherein the coordinate position XS is determined via analysis of the second X axis projection histogram H2x in the same manner as in one of the pattern recognition schedules as explained above, and $$YS = (j3+j4)/2$$

Step 3: A third provisional position P (xP, yP) is determined by making use of the first Y axis projection histogram H1y, wherein the coordinate position yP is determined via analysis of the first Y axis projection histogram H1y in the same manner as in one of the pattern recognition schedules as explained above, and $$xP = (i1+i2)/2$$

Step 4: A fourth provisional position Q (xQ, yQ) is determined by making use of the second Y axis projection histogram H2y, wherein the coordinate position yQ is determined via analysis of the second Y axis projection histogram H2y in the same manner as in one of the pattern recognition schedules as explained above, and $$xQ = (i3+i4)/2$$

Step 5: Calculation of a final key pattern position PS (xps, yps) in the coordinates based on the above result.

Figure 44:
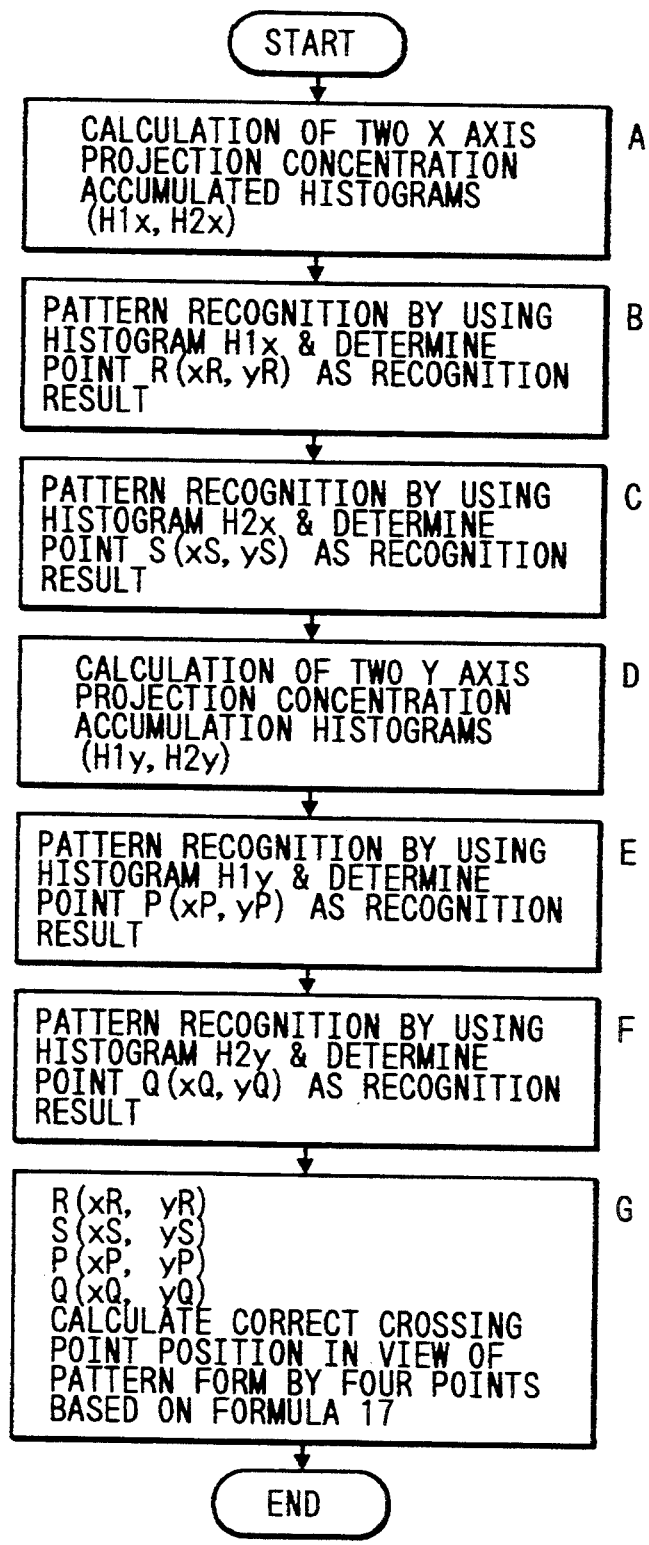
FIG. 44 is a flow chart performed for determining the key pattern position on the seventh form according to the method explained in connection with FIG. 43.

The final key pattern position PS (xps, yps) is determined by the crossing point of a straight line connecting between the points R and S and a straight line connecting between the points P and Q which is expressed by the following formulas;

$$xps = \begin{vmatrix} c1 & b1 \\ c2 & b2 \end{vmatrix} \div \begin{vmatrix} a1 & b1 \\ a2 & b2 \end{vmatrix} \quad (17)$$

$$yps = \begin{vmatrix} a1 & c1 \\ a2 & c2 \end{vmatrix} \div \begin{vmatrix} a1 & b1 \\ a2 & b2 \end{vmatrix} \quad (18)$$

wherein,
a1 = yP − yQ
a2 = yR − yS
b1 = xQ − xP
b2 = xS − xR
c1 = xQ.yP − xP.yQ
c2 = xS.yR − xR.yS FIG. 44 shows in a flow chart the above explained steps.

Figure 45A:
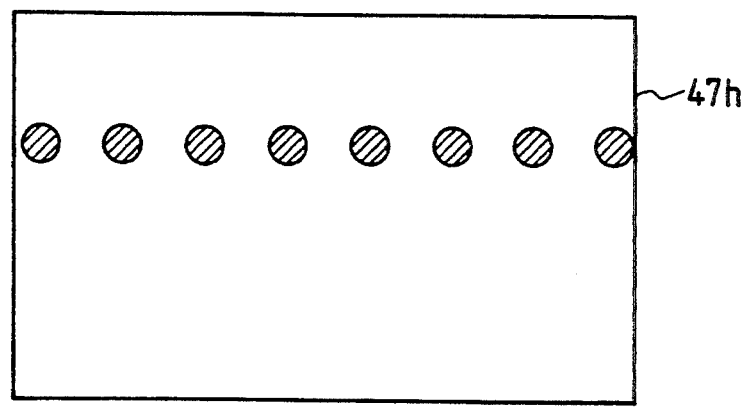
FIG. 45a) is an input screen image of a eighth pattern form having a repeating circular form and constituting an object for pattern recognition process according to the present invention and FIG. 45(b) is an X axis projection histogram of the eighth pattern form prepared based on the input screen image thereof.
Figure 45B:
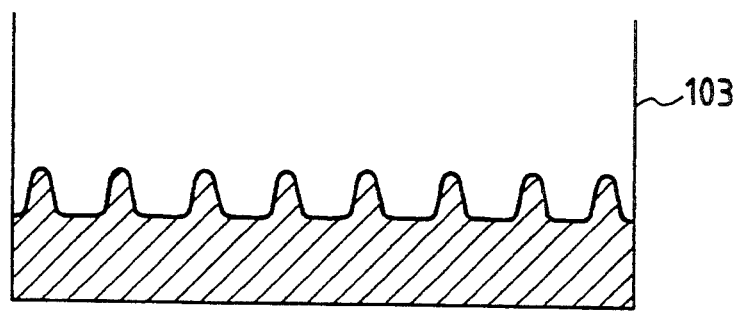

(11) Recognition of a pattern form having a regularly repeating circular form:

FIG. 45(a) shows an input screen image 47h of the pattern form having a regularly repeating circular form and FIG. 45(b) is a X axis projection histogram generated from the input screen image 47h. Judging from the configuration of the generated histogram, it will be understood that any one of the pattern recognition schedules as explained above can be applied for determining a key pattern position of the object pattern form.

Figure 46A:
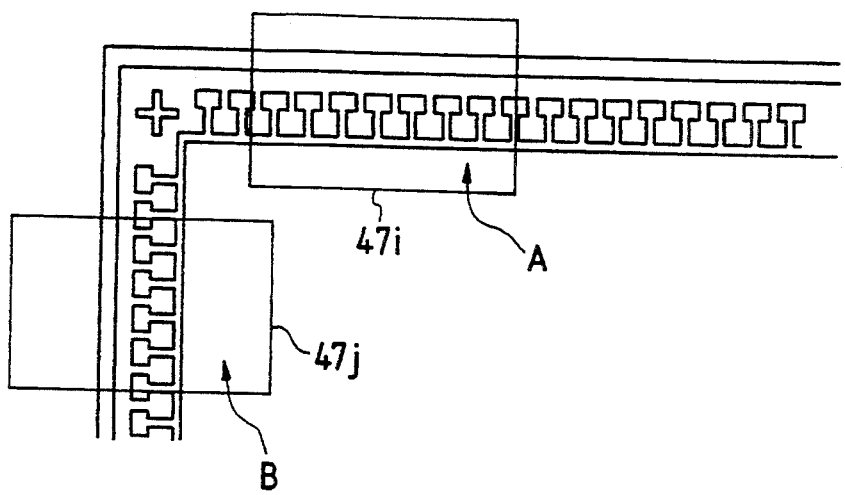
FIG. 46(a) is a partial input screen image of a ninth pattern form on a semiconductor chip having a repeating pattern form and constituting an object for pattern recognition process according to the present invention.
Figure 46B:
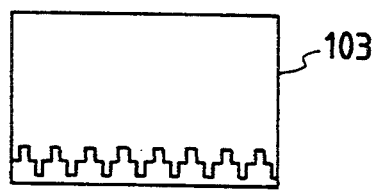
FIG. 46(b) is an X axis projection histogram of the ninth pattern form prepared based on the input screen image over the region indicated by A in FIG. 46(a) and FIG. 46(c) is a Y axis projection histogram of the ninth pattern form prepared based on the input screen image over the region indicated by B in FIG. 46(a).
Figure 46C:
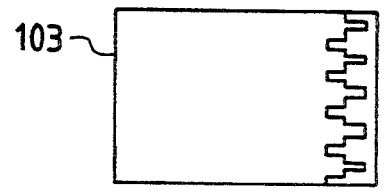

(12) Recognition of a pattern form having circuit pattern form on semiconductor wafer:

FIG. 46(a) shows a part of a semiconductor wafer having a regularly repeating circuit pattern thereon, FIG. 46(b) is an X axis projection histogram generated from the input screen image of part A in FIG. 46 (a) and FIG. 46(c) is a Y axis projection histogram generated from the input screen image of part B in FIG. 46(a). Judging from the configurations of the generated histograms, it will be also understood that any one of the pattern recognition schedules as explained above, for example, by making use of the evaluation function ω 4, can also be applied for determining a key pattern position of the object patten form for accurate positioning.

Now, another embodiment of pattern recognition methods according to the present invention is explained with reference to FIG. 47(a) through FIG. 69.

Figure 47A:
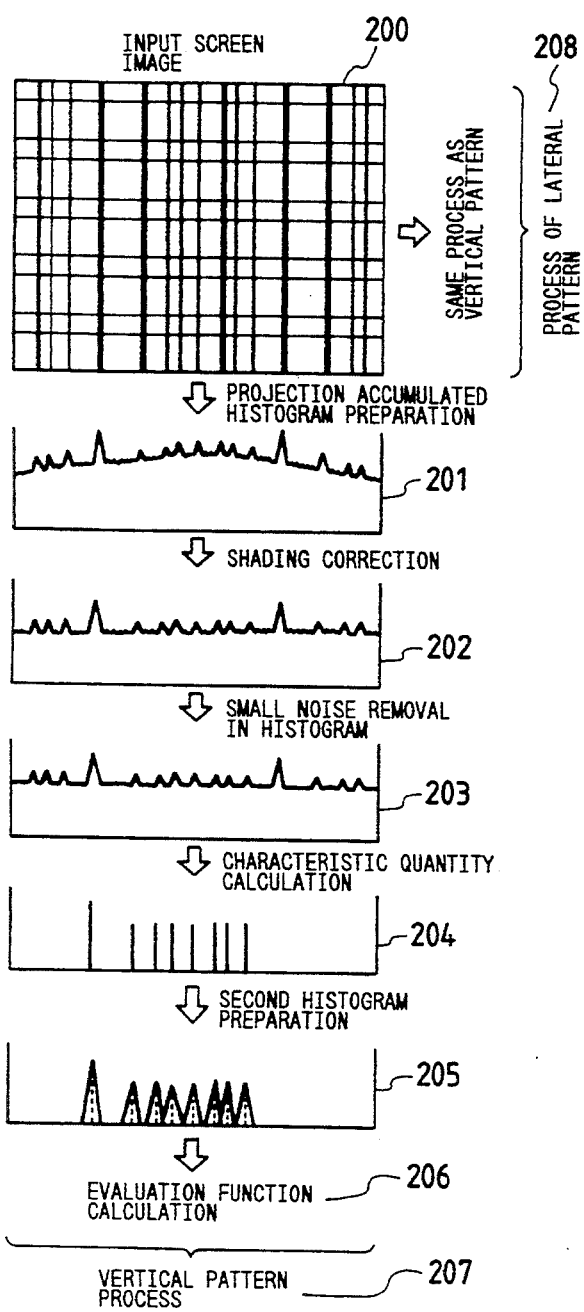
FIG. 47(a) is a view for explaining a major portion of another embodiment of pattern recognition methods according to the present invention.
Figure 47B:
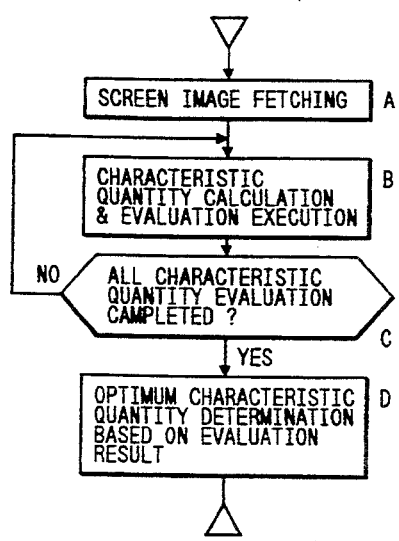
FIG. 47(b) is a flow chart performed for an automatic optimum characteristic quantity determination via data teaching incorporated in the pattern recognition process and FIG. 47(c) is a flow chart performed for determining a key pattern position during actual pattern recognition operation incorporated in the pattern recognition process.
Figure 47C:
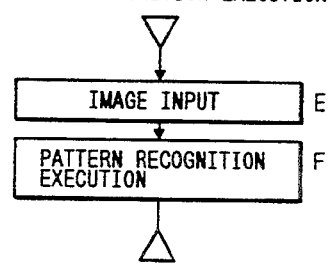

(13) Pattern recognition steps in an automatic pattern match cutting device:

FIG. 47(a) shows an example of a striped pattern recognition steps which makes use of the other embodiment of the pattern recognition methods according to the present invention. Numeral 200 is an input screen image of an object for pattern recognition. Vertical pattern recognition step 207 and lateral pattern recognition step 208 can be performed separately. The difference between the vertical pattern recognition step 207 and the lateral pattern recognition step 208 reside only in their histograms, in that, whether the histogram relates to vertical or lateral pattern, and the others are completely identical, therefore only the vertical pattern recognition step is illustrated in detail in FIG. 47(a). The vertical pattern recognition step 207 includes an X axis concentration accumulated projection histogram generating step 201, a histogram correction step 202, a small histogram noise removing step 203, a characteristic quantity calculating step 204, a second histogram generating step 205, an evaluation function calculation step 206 and so on. An optimum characteristic quantity determining steps as illustrated in a flow chart in FIG. 47(b) is performed during teaching wherein an optimum characteristic quantity for the object pattern form is determined. In an actual key pattern position determination steps as illustrated in a flow chart in FIG. 47(c), an evaluation of the generated histogram is performed by making use of an evaluation function corresponding to a pattern recognition schedule determined in the teaching stage.

Figure 48:
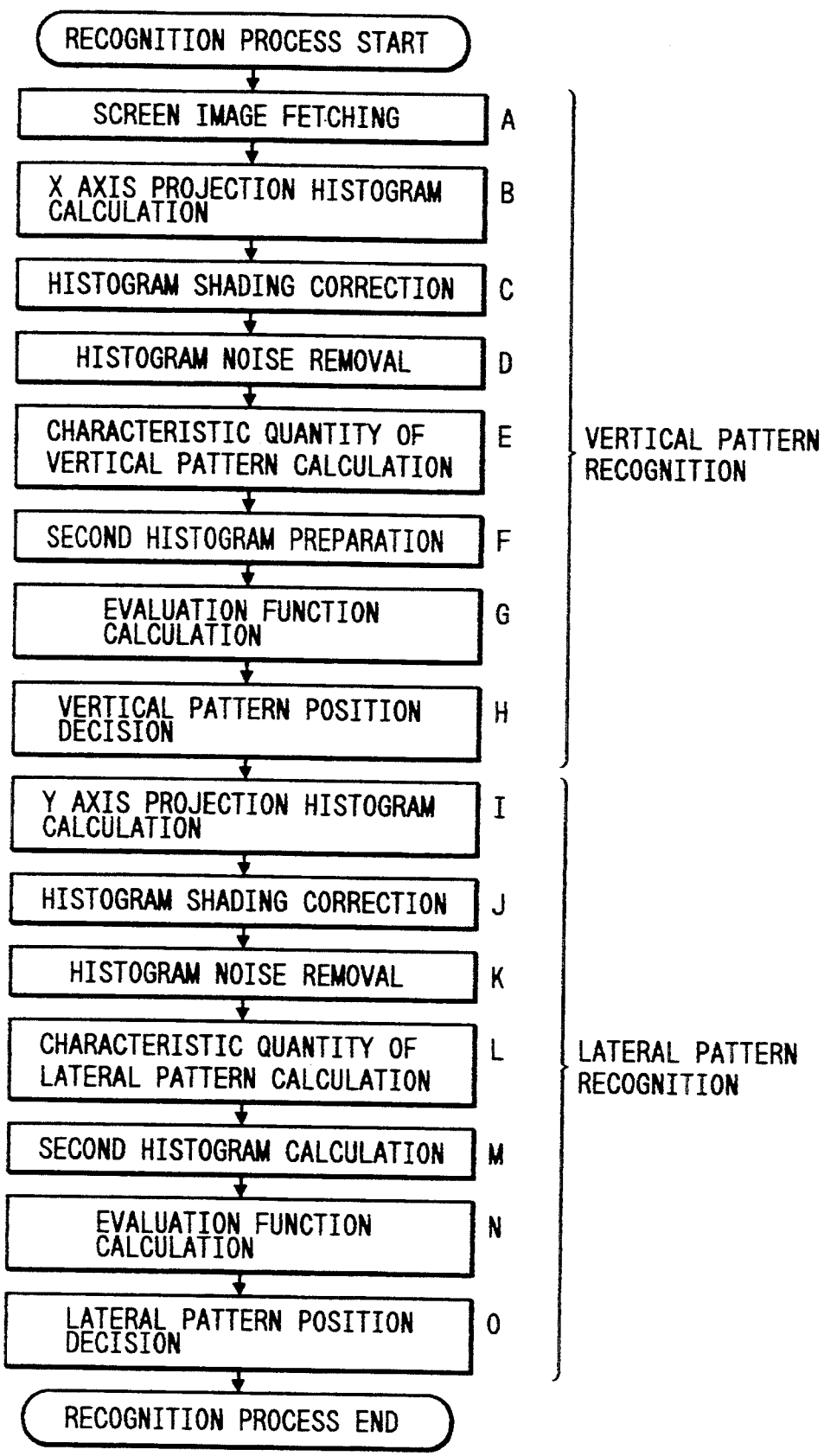
FIG. 48 is a flow chart of a pattern recognition process executed in the embodiment shown in FIG. 47(a) and FIG. 47(c).

FIG. 48 shows in a flow chart an outline of the pattern recognition process according to the present invention as illustrated in FIG. 47(a). The process is performed, for example, in an order of the vertical pattern recognition process and the lateral pattern recognition process. However the order can be reversed. Although not illustrated in FIG. 48 flow chart, when processing a striped pattern it is enough if either the vertical pattern or the lateral pattern is processed. Since the lateral pattern recognition processing is basically the same as the vertical pattern recognition processing, hereinbelow the present embodiment is explained only with reference to the vertical pattern recognition processing thereof, in that the lateral pattern recognition processing can be understood to be performed in the same manner as the vertical pattern recognition processing which will be explained in detail hereinbelow.

Figure 49:
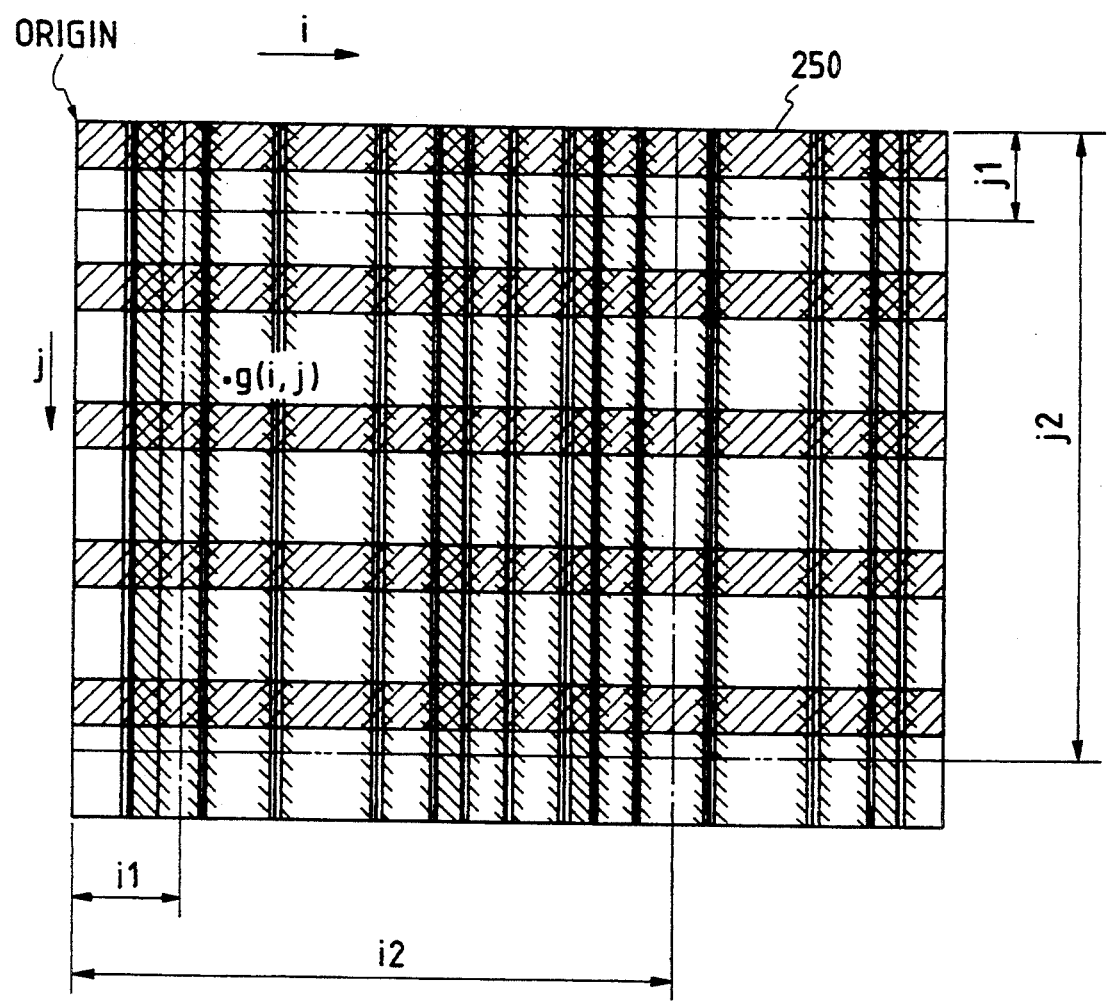
FIG. 49 is an example of input screen images which constitutes an object of the pattern recognition process according to the present invention.
Figure 50:
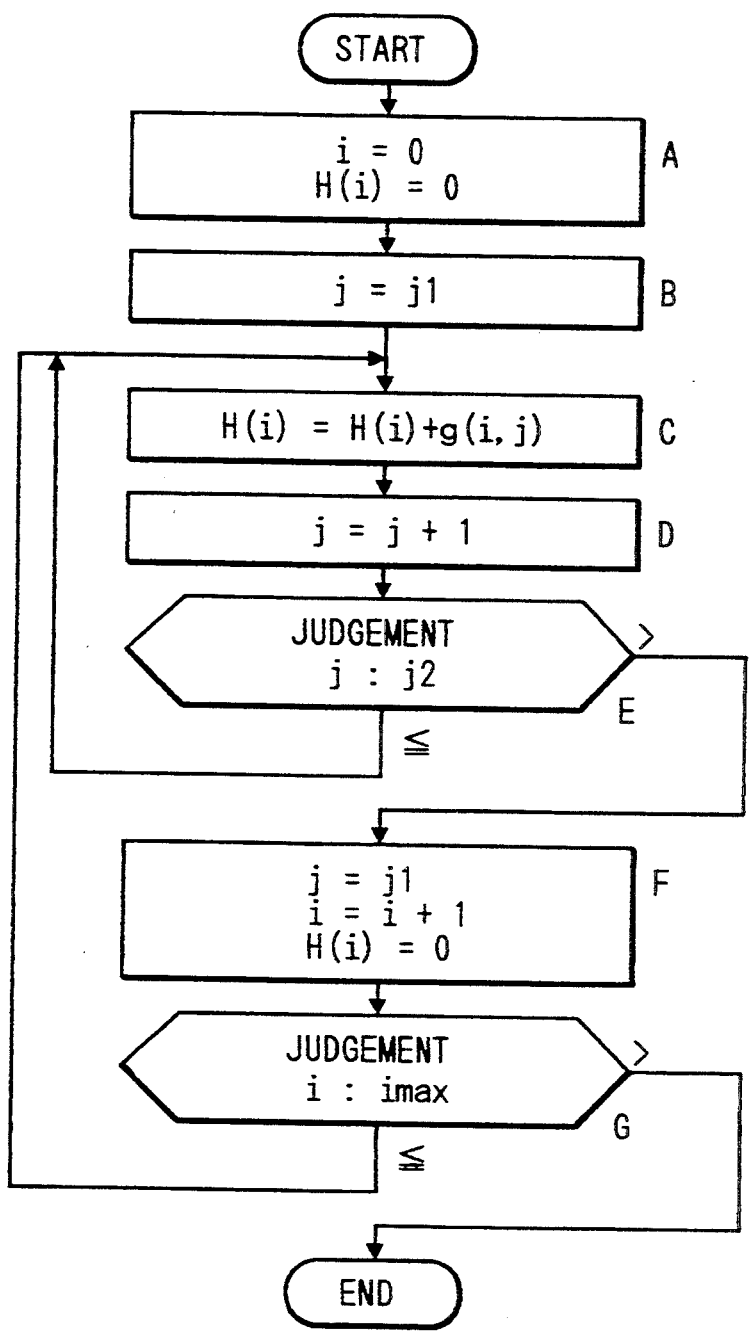
FIG. 50 is a flow chart for preparing X axis concentration accumulated projection histogram in the pattern recognition process according to the present invention.

(14) Removal of small noise in histogram:

FIG. 49 and FIG. 50 are diagrams for explaining generation of a X axis concentration accumulated projection histogram from an input screen image 250. The input screen image 250 is constituted by two dimensional data g(i, j), and the respective data g(i, j) contain brightness information of the respective points on the screen image.

The X axis concentration accumulated projection histogram is obtained by adding the respective pixel values in the vertical direction which is expressed by the following formula;

$$H(i) = \sum_{j=j1}^{j2} g(i,j) \quad (1)$$

The Y axis concentration accumulated projection histogram can be likely expressed by the following formula;

$$H(j) = \sum_{i=i1}^{i2} g(i,j) \quad (2)$$

FIG. 50 shows in a flow chart the generation process of the X axis concentration accumulated projection histogram which is well known.

Figure 51:
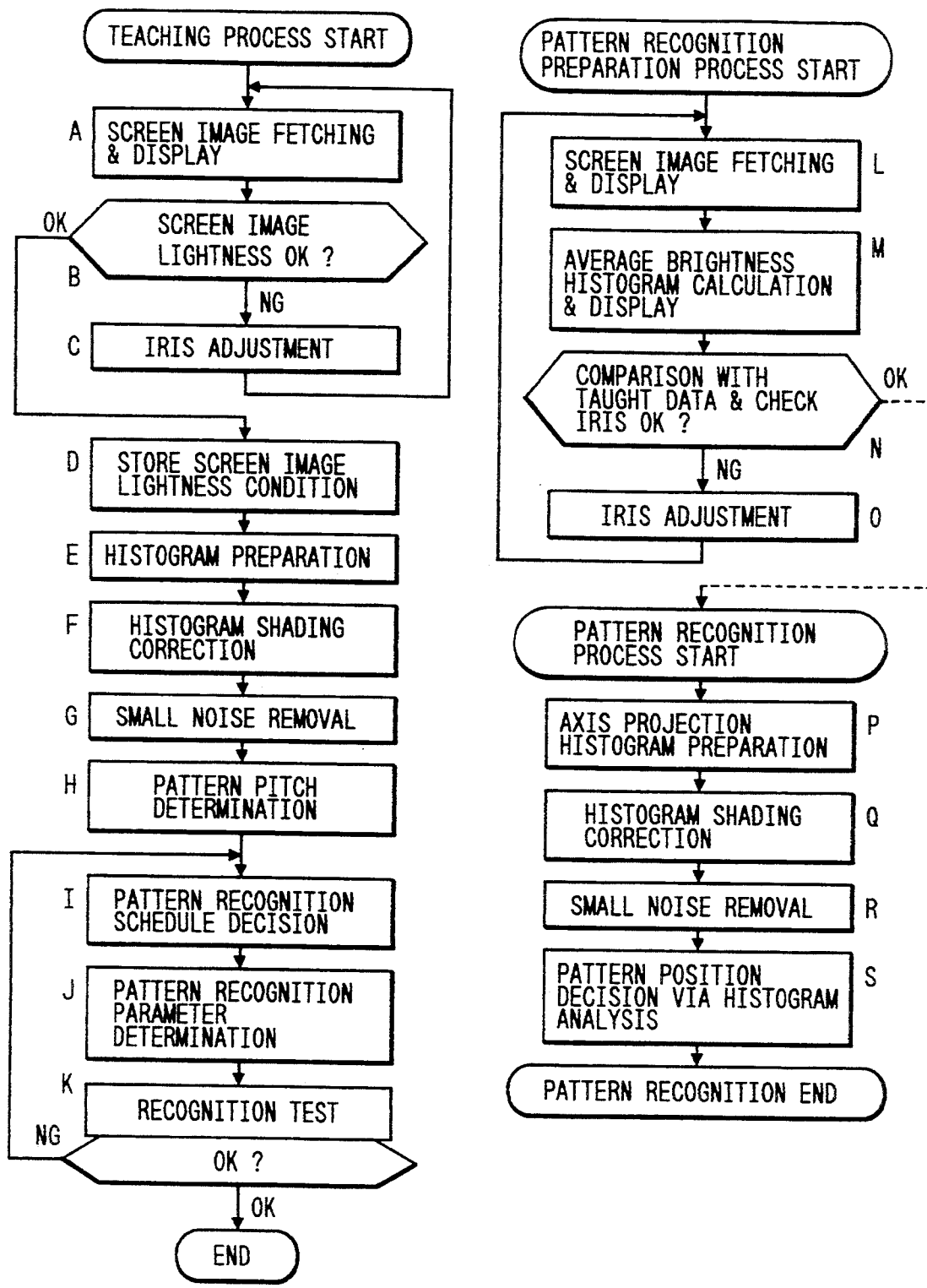
FIG. 51 is a flow chart of a pattern recognition process including a pattern teaching process, a pattern recognition preparation process and an actual pattern recognition process executed in another embodiment of automatic pattern match cutting devices according to the present invention.

FIG. 51 shows in a flow chart the pattern recognition process while dividing the same into three stages of teaching stage, preparation stage and actual pattern recognition stage. In the teaching stage such as an iris optimizing adjustment of the camera, an histogram shading correction (Box, F), a small histogram noise removal (Box, G) and a determination of a pattern recognition schedule and of a pattern recognition parameter are performed. The above mentioned pattern recognition schedule will be explained in detail later. In the preparation stage, an image and brightness information of the image is displayed on the screen and the camera is adjusted to meet the teaching condition (Boxes L~O). In the pattern recognition stage, after generation of a histogram, shading correction thereof and small noise removal therefrom (Boxes P~R), a key pattern position determining process (Box S) are performed.

Figure 52A:
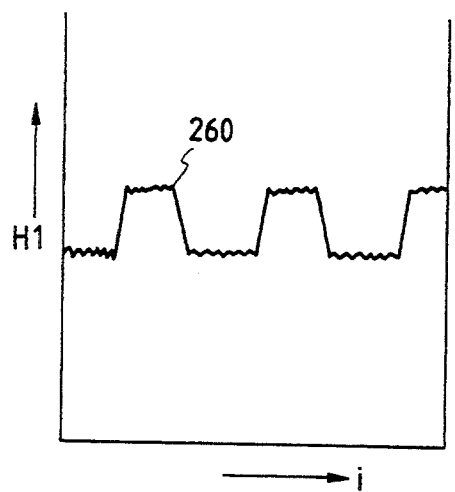
FIG. 52(a) and FIG. 52(b) are views for explaining small noise removal from a prepared histogram performed in the pattern recognition process according to the present invention.
Figure 52B:
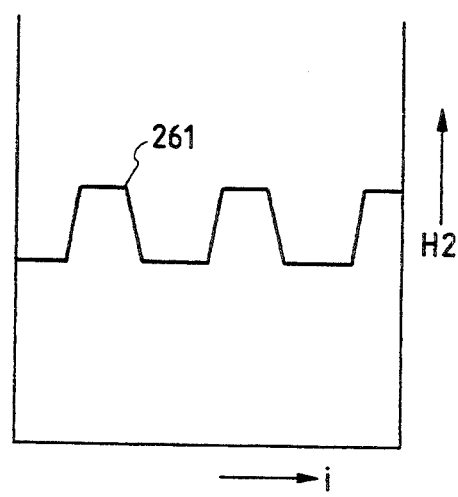
Figure 53:
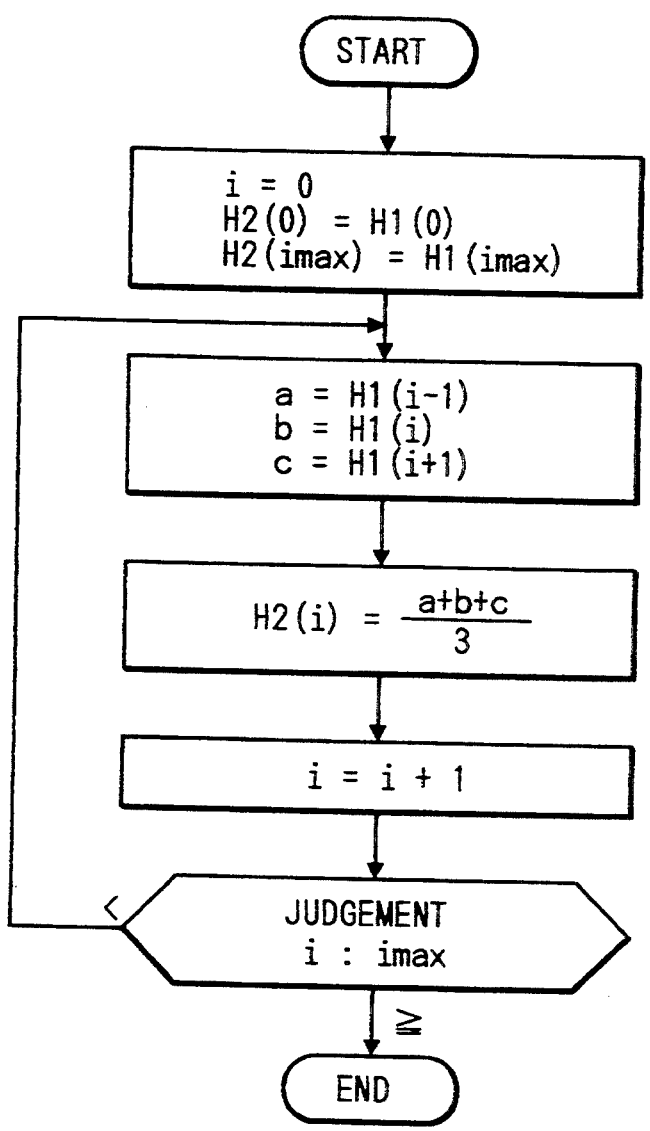
FIG. 53 is an example of flow charts of X axis projection histogram correction via averaging performed in the pattern recognition process according to the present invention.

FIG. 52(a), FIG. 52(b) and FIG. 53 show the small noise removal from the histogram according to the present embodiment. Numeral 260 shows the data of the generated histogram in which small noises are contained and if no processing is applied thereto the treatment of such a histogram is difficult. Hereinbelow the removal of the small noises from the histogram according to the present embodiment is explained in detail.

The small noises appear on the histogram in a form of high frequency components repeating vibrations with a small amplitude. Therefore when a local averaging treatment performed throughout is the generated histogram, the small noises can be removed without deforming the general configuration of the generated histogram. Namely, when the bare data histogram 260 is converted with the following formula, a histogram 261 having noises the small noises removed as shown in FIG. 52(b) is obtained.

$$H2(i) = MEAN\{H1(i-1), H1(i), H1)\} \quad (18)$$

wherein MEAN indicates an average value of H1(i−1), H1(1), H(i+1).

FIG. 53 is an example of a flow chart for performing calculation of the above formula (18). In the flow chart, an average value at three pixels of a noting point and the points before and after one pixel from the noting point is calculated, however the number of points before and after a noting point to be considered can be varied depending on the frequency of the small noises.

Hereinbelow, pattern recognition schedules, which are one of the important features of the present embodiment, are explained.

Figure 54A:
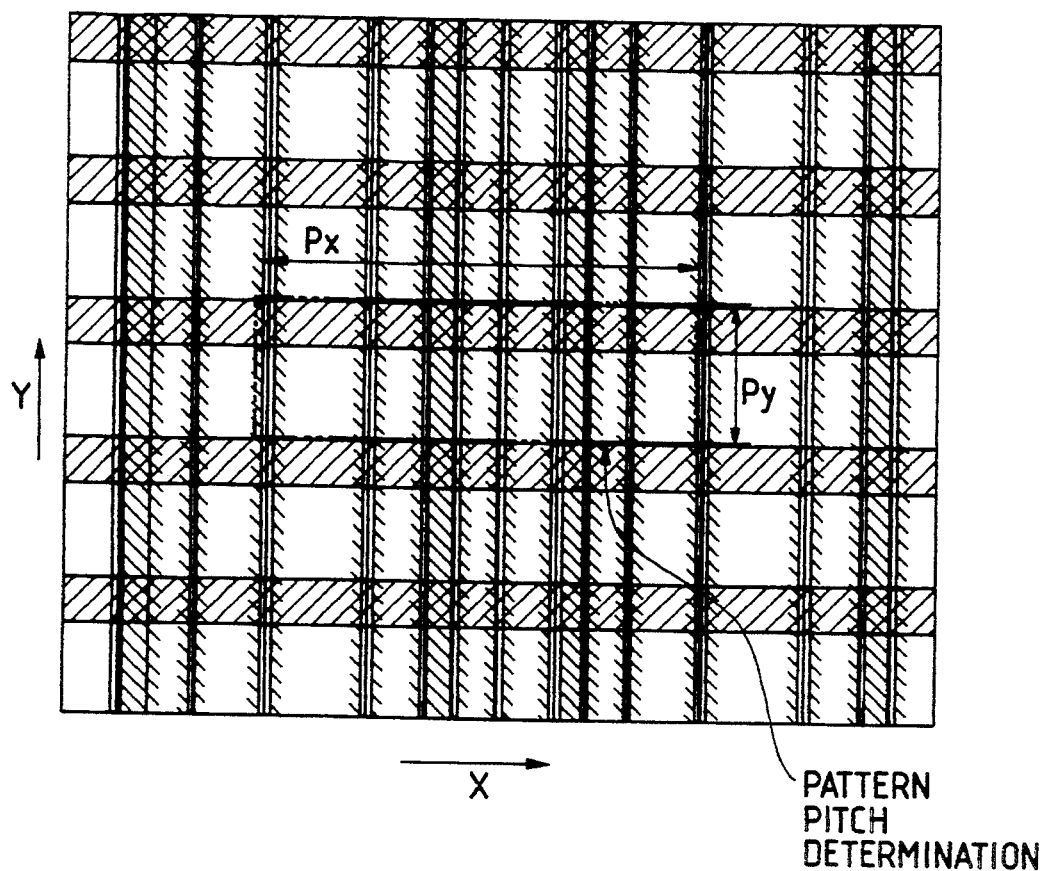
FIG. 54(a) is an example of input screen images of a pattern form for explaining an pattern pitch determination and FIG. 54(b) is a X axis projection histogram prepared based on the input screen image of the FIG. 54(a).
Figure 54B:
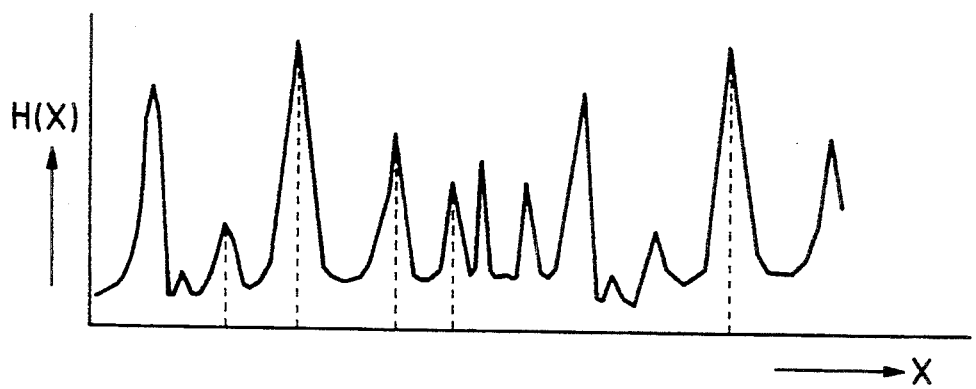

(15) Pattern recognition noting the height difference of crests in a histogram:

FIG. 54(a) is an input screen image of a pattern form for determining the pattern pitch. The pattern pitch can be determined automatically or inputted by an operator. In FIG. 54(a) the automatically determined or operator inputted result is displayed by superposing on the input screen image for confirmation. Further, FIG. 54(b) shows a histogram generated from the input screen image. When the pitch is erroneously determined or inputted the pattern recognition result is significantly affected thereby, therefore the superposed screen display for confirmation is important. After confirming correctness of the pattern pitch in vertical and lateral directions via the screen display as shown in FIG. 54(a), a pattern recognition is performed for every object pattern form according to the following pattern recognition schedule or alogorithm.

Figure 55A:
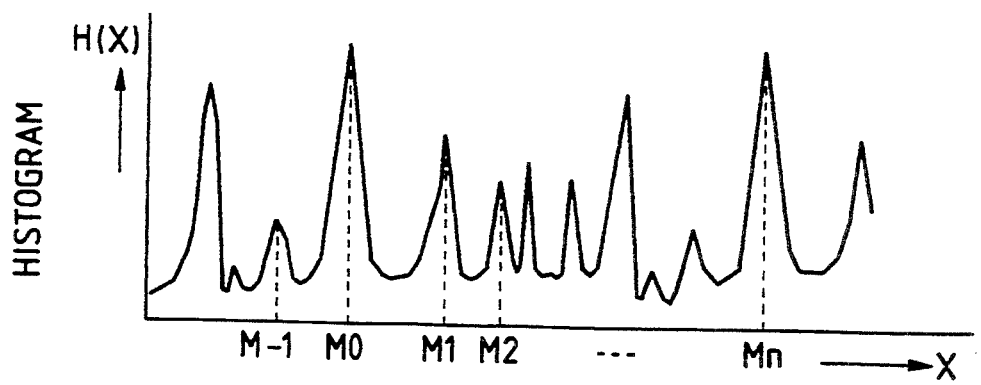
FIG. 55(a), FIG. 55(b) and FIG. 55(c) are views for explaining an example of characteristic quantity calculation, second histogram preparation and sampling of teaching data based on the prepared histogram shown in FIG. 54(b) according to the present invention.
Figure 55B:
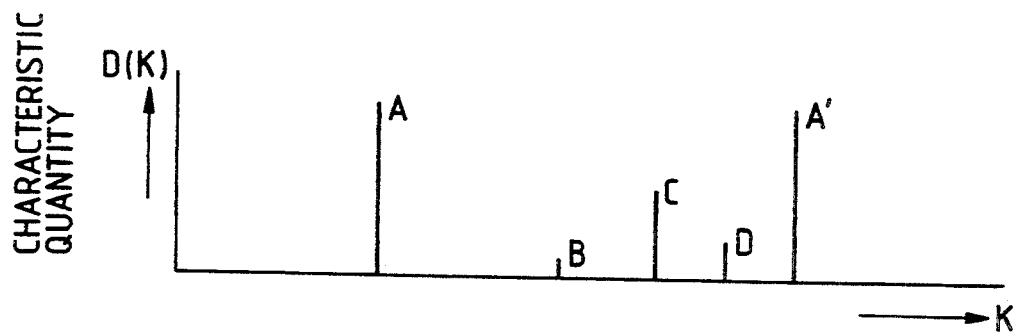
Figure 55C:
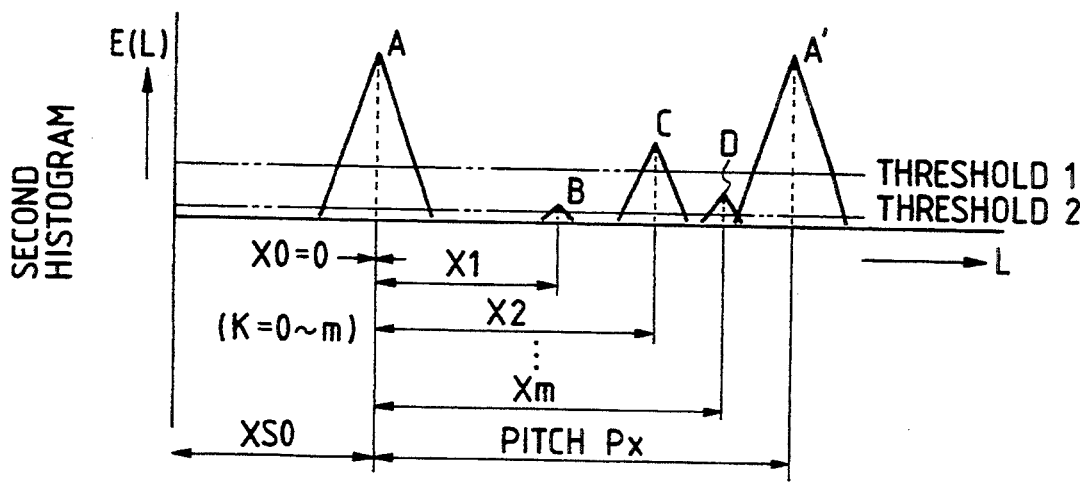

FIG. 55(a), FIG. 55(b) and FIG. 55(c) are diagrams for explaining the process of obtaining a crest height difference as a characteristic quantity from the histogram of the input screen image, FIG. 55(a) shows the histogram of the input screen image. FIG. 55(b) shows a graph representing the characteristic quantity obtained by calculating the height difference between a noting or marking crest and the crest immediately preceeding the noting crest and the characteristic quantity is obtained according to the following formula;

$$D(k) = H(MK) - H(MK-1) \qquad (19)$$

Figure 56:
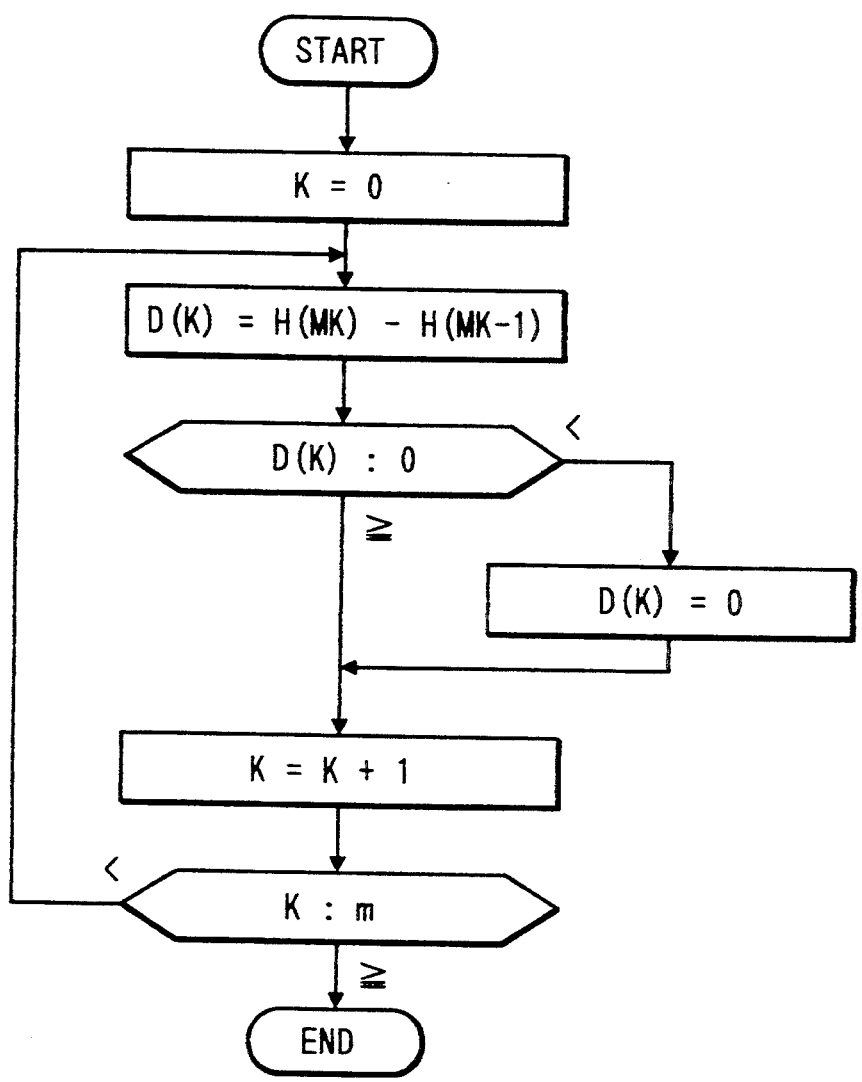
FIG. 56 is a flow chart performed for calculating the characteristic quantity in the pattern recognition process according to the present invention.

FIG. 56 is an example of a flow chart for performing the calculation of the above formula (19). In the flow chart, when the difference shows a negative value the difference is determined as 0, however the difference can be indicated in the negative value as it is.

FIG. 55 (c) is a diagram of a second histogram which is generated by giving a predetermined width for the respective characteristic quantities for clarifying their existence. Since expansion and contraction of a cloth is remarkable, the size of a predetermined pattern form even in a cloth having an indentical pattern form does not always correctly coincide each other. Therefore, the second histogram is introduced in order to permit a correct evaluation even in a case when a positional relationship of crests in the histogram during actual pattern recognition deviates somewhat from that during teaching.

The second histogram is obtained, for example, according to the following formula;

$$E(L) = D(K) - \frac{D(K) \times ABS(L)}{10} \qquad (20)$$

wherein $$K-10 <= L < K+10$$

Figure 57:
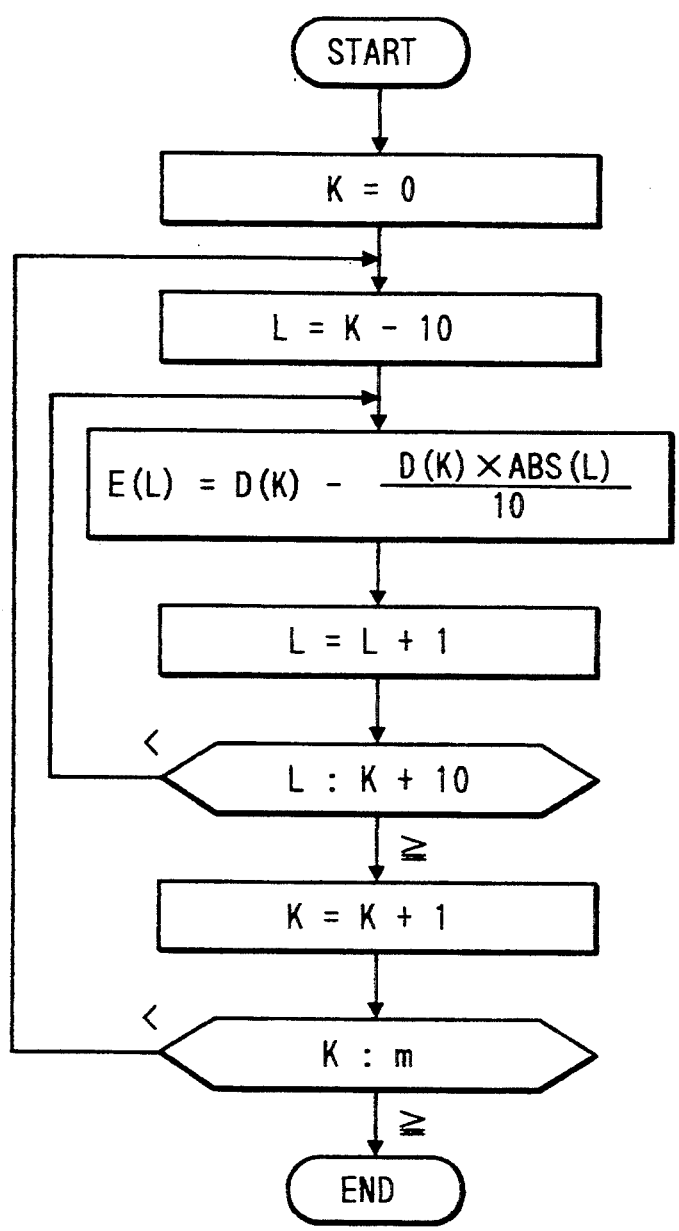
FIG. 57 is a flow chart for preparing the second histogram in the pattern recognition process according to the present invention.

K: position of selected crest
D(K): characteristic quantity of crest
ABS( ): absolute value FIG. 57 shows an example of a flow chart for performing calculation of the above formula (20).

In the present second histogram, the widths are expanded to 10th pixels before and after the noting (or marking) point while reducing gradually the characteristic quantity at the noting point by 10% for every one pixel. However, the manner of giving a predetermined width for the respective characteristic quantities is not limited to the above, for example, a second order curve can be used for clarifying their existence.

Figure 58:
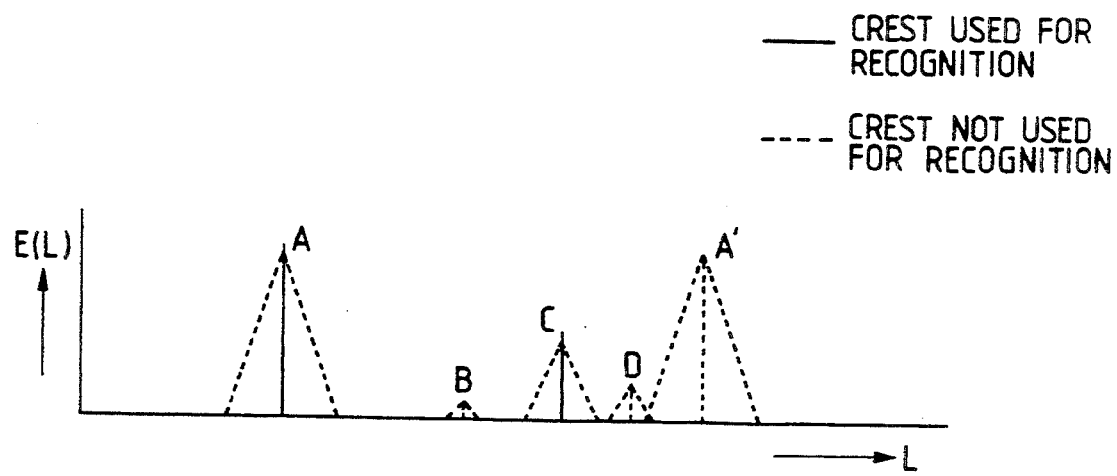
FIG. 58 is one display example on a man-machine screen of a modified second histogram shown in FIG. 55(c) for confirming the crests in the histogram which are selected to be used for the pattern recognition.
Figure 59:
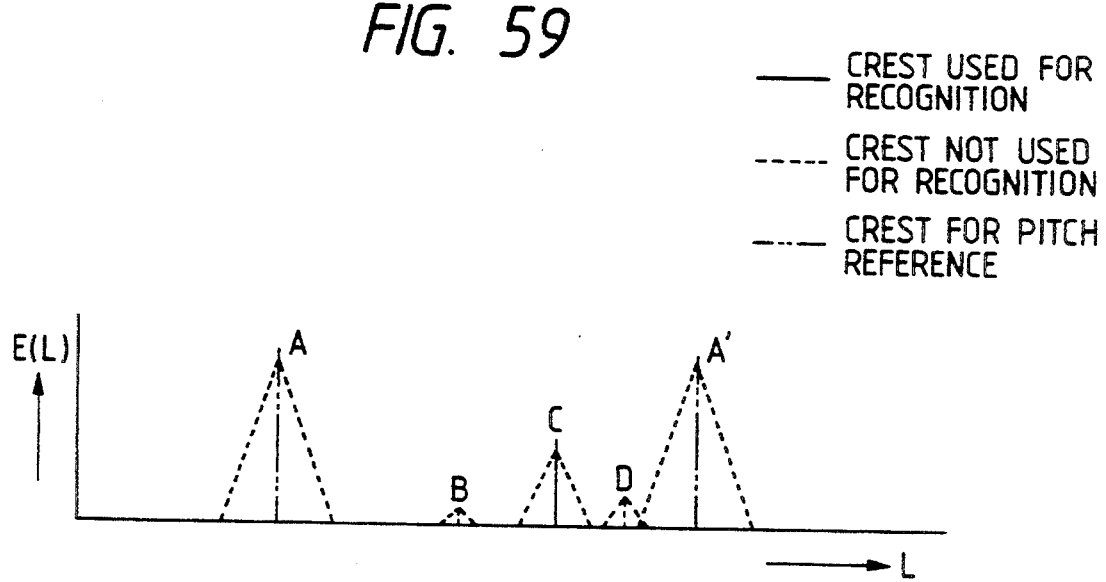
FIG. 59 is another example on a man-machine screen of another modified second histogram shown in FIG. 55(c) for confirming the crests in the histogram which are selected to be used for the pattern recognition.

After generating the second histogram, it is necessary to determine which crest in the second histogram is to be used for the pattern recognition, and which can be easily effected by preparing a screen image including a histogram and adjustable threshold levels as shown in FIG. 55(c). When the threshold value 1 is applied, the crests A and C are selected and when the threshold value 2 is applied, the crests A, B, C and D are selected. As teaching data, information Xso representing a key pattern position, values X1~Xm representing relative positions of the crests which are used for recognition and a pitch width Px are stored. Such crest selection can be performed automatically or manually by an operator during the teaching stage. For confirming such selection result, a screen display such as illustrated in FIG. 58 and FIG. 59 is indispensable. In FIG. 58, selected crests and the corresponding second histogram are displayed by superposing wherein the selected crests and the nonselected crests are differentiated by different kinds of lines. Further, in FIG. 59, crests representing pitch boundary are indicated by a different kind of lines for facilitating recognition. These screen displays are necessary for checking the recognition result and are indispensable when performing a pattern recognition according to the present schedule. In FIG. 58 and FIG. 59, the second histogram and the crests are displayed by superposing as well as the input screen image can be displayed by further superposing. It will be easily understood that these screen displays are indispensable for judging validity of the recognition schedule and the crests used for the recognition.

FIG. 60(a) through FIG. 62 are diagrams for explaining actual pattern recognition process by making use of the above taught data. According to the present pattern recognition schedule, second histogram values at distances X0~Xm from a noting point are accumulated to determine the accumulated value as an evaluation value at the noting point and further to determine a noting point giving a local maximum evaluation value as a possible key pattern position. Namely, the possible key pattern position is determined through calculation of the following evaluation function.

$$\omega 7(\zeta) = \sum_{k=0}^{m} E(\zeta + Xk) \qquad (21)$$

Figure 60A:
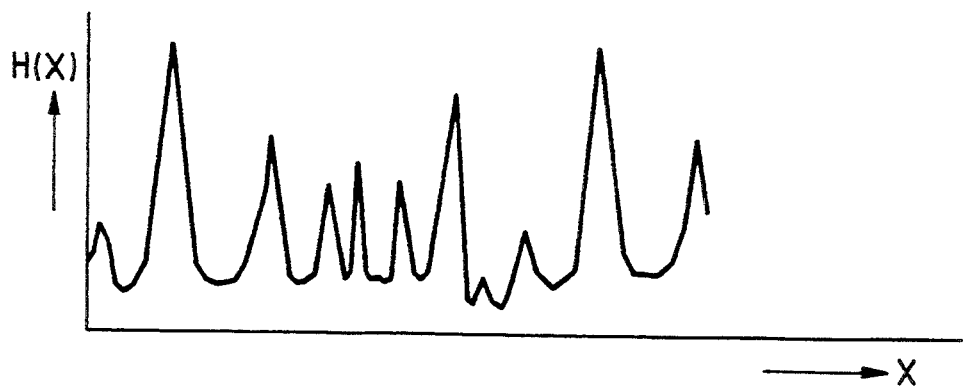
FIG. 60(a), FIG. 60(b) and FIG. 60(c) are diagrams for explaining a relationship between a prepared X axis projection histogram, a second histogram determined base on the X axis projection histogram and a seventh evaluation function ω 7 determined based on the second histogram used for the pattern recognition process according to the present invention.
Figure 60B:
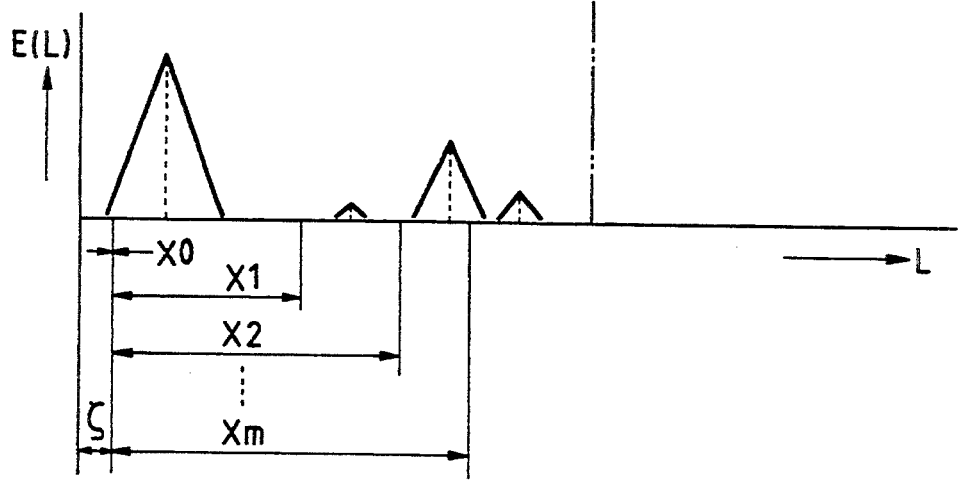
Figure 60C:
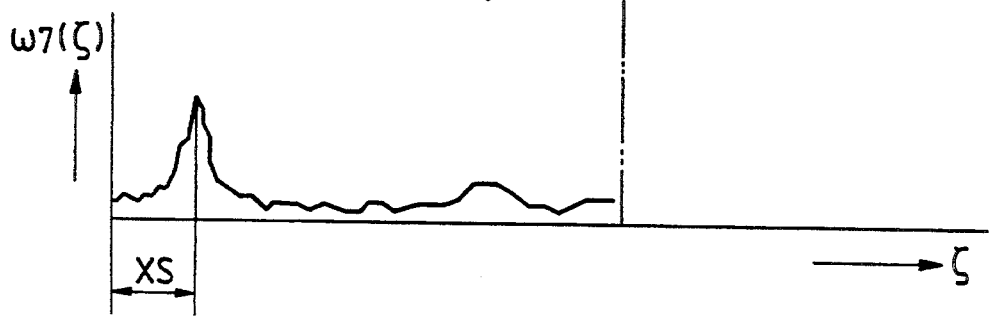
Figure 61:
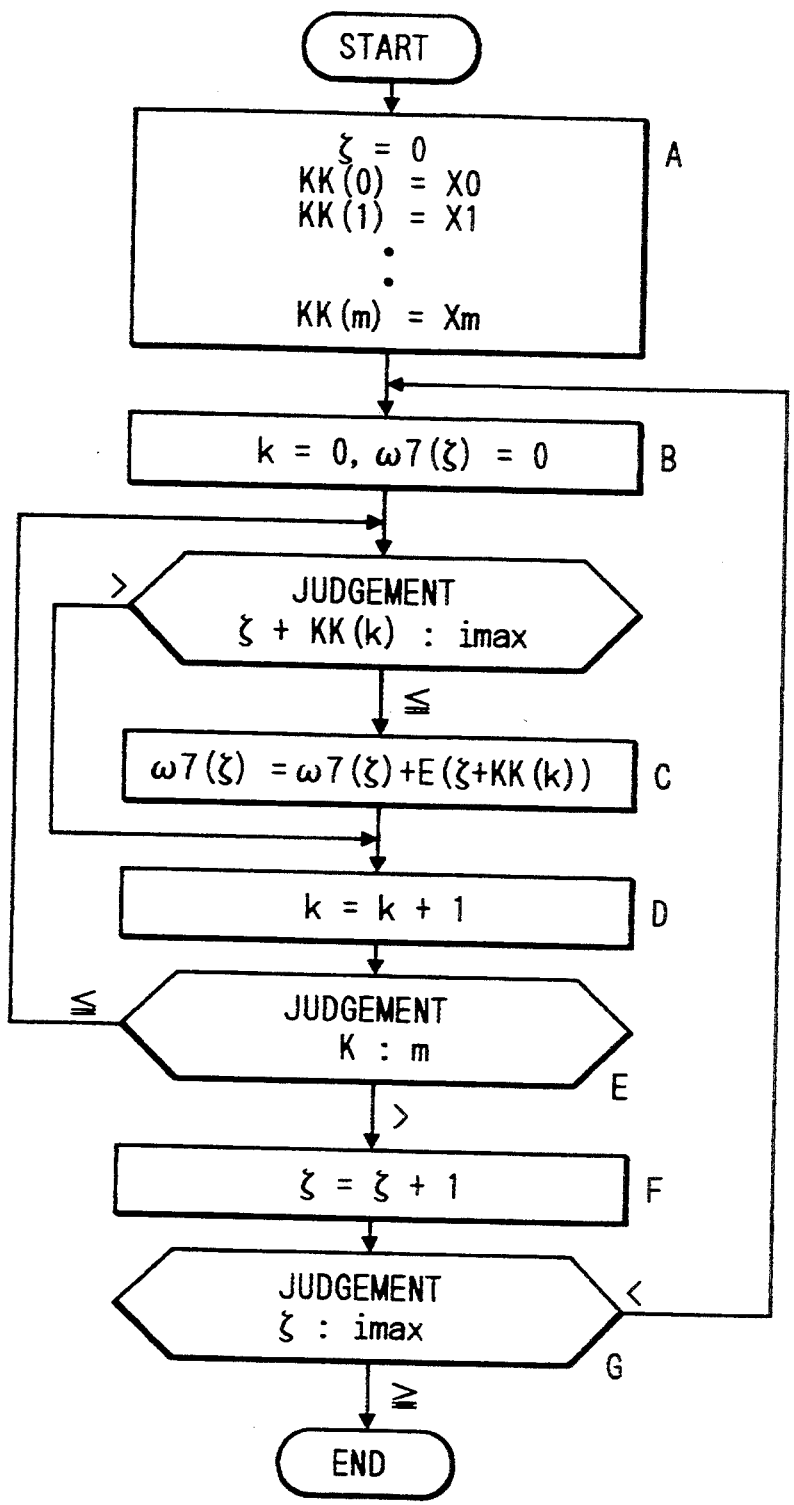
FIG. 61 is a flow chart for explaining the calculation steps of the seventh evaluation function ω 7 as shown in FIG. 60(c).
Figure 62:
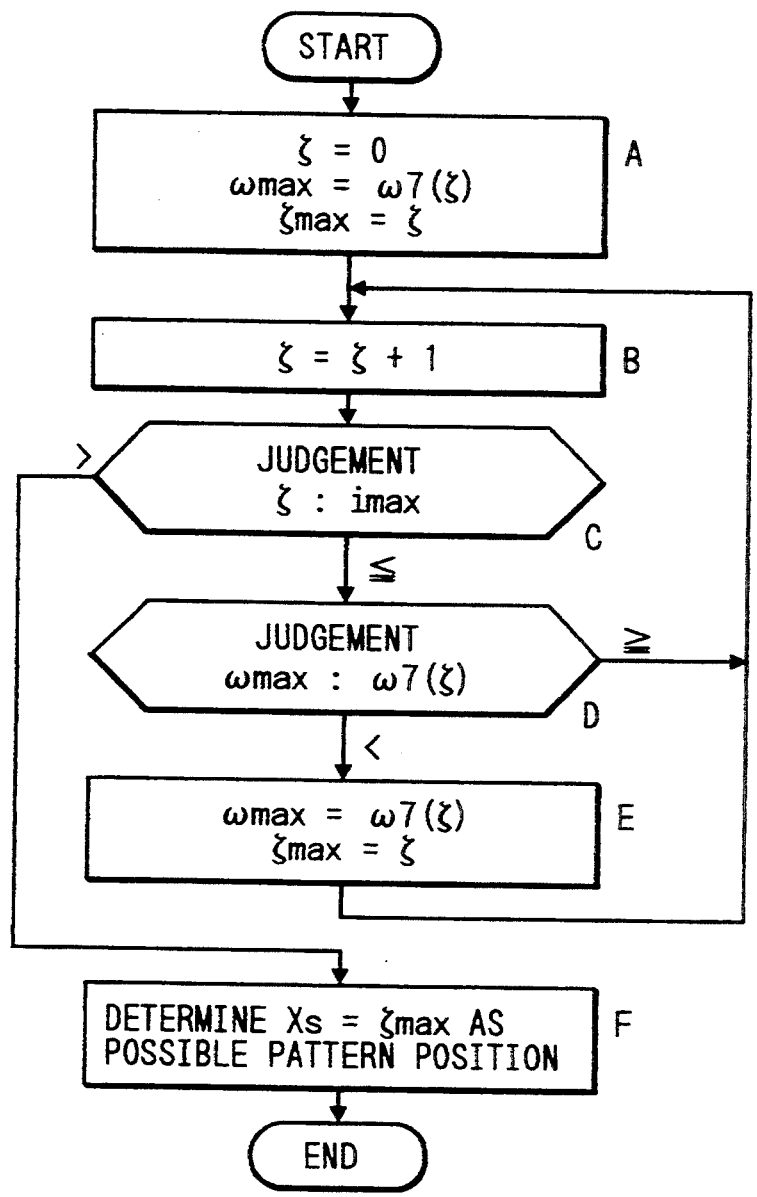
FIG. 62 is a flow chart for determining a key pattern position based on the calculated seventh evaluation function ω 7.

FIG. 60(a) through FIG. 60(c) are diagrams for explaining a relationship between the histograms and the evaluation function. FIG. 61 shows in a flow chart an example of calculation steps of the evaluation function represented by formula (21). The positions in the evaluation function giving local maximum values as shown in FIG. 60(c) which is obtained by the processing according to the flow chart are assumed as possible key pattern positions and then one desiable local maximum value is selected among others depending on the individual circumstances (a local maximum value near the center of the evaluation function diagram is usually selected). FIG. 62 shows in a flow chart an example of key pattern position determination schedules represented by the following formular;

$$Xs = \xi\{at\ MAX\ (\omega 7)\} \qquad (22)$$

wherein MAX, implies that ω 7 gives a local maximum value.

Figure 63A:
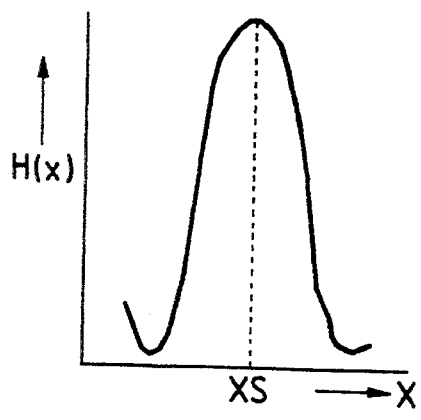
FIG. 63(a) and FIG. 63(b) are examples of crest shapes at key pattern positions in two histograms.
Figure 63B:
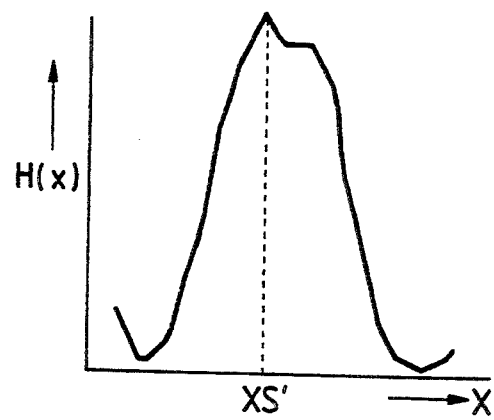

Now, when a top of a crest in a bare histogram data constituting a key pattern position is undistorted as illustrated in FIG. 63(a), position Xs is determined as a key pattern position without any troubles, however when a top of a crest is distorted as illustrated in FIG. 63(b), position XS' may be determined as a key pattern position which does not correspond to a true key pattern position such that a correction of the erroneously determined key pattern position is necessitated which is explained hereinbelow.

Figure 64A:
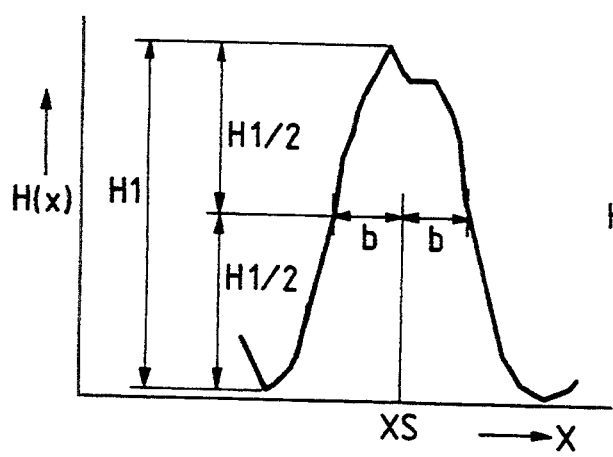
FIG. 64(a) and FIG. 64(b) are views for explaining two key pattern position corrections in the pattern regonition process according to the present invention.
Figure 64B:
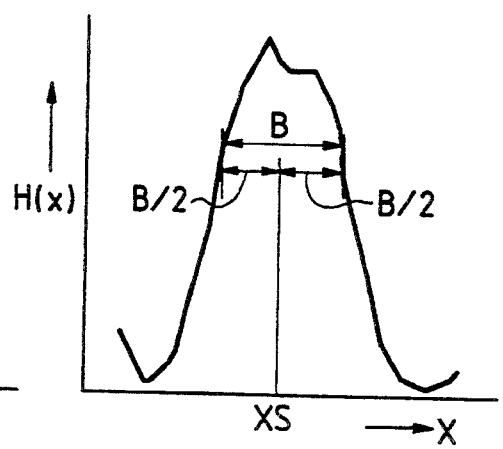

An approach to determine a true key pattern position is to determine an intermediate point of a crest. FIG. 64(a) shows a first example thereof wherein an intermediate point of a crest width at ½ height of the crest is determined as the true key pattern position. FIG. 64(b) shows a second example thereof wherein an intermediate point of a crest width at a crest height showing a constant crest width is determined as the true key pattern position. However, the method of determining the true key pattern position is not limited thereto, for example, the coordinates of the gravity center of a crest can be used as the true key pattern position.

Hereinabove, a pattern recognition method noting a crest height difference was explained, and since the histogram as illustrated in FIG. 55(a) is most common, the present method was explained with reference to such a histogram, however for the histogram as shown in FIG. 55(a) wherein one remarkable highest crest is contained in one pitch, the crest height itself can be used as a characteristic quantity to determine a key pattern position without using in particular the crest height difference as a key pattern position. The present pattern recognition method using a crest height difference as a characteristics quantity is, in particular, effective for a pattern form showing a histogram illustrated in FIG. 65(a). Namely, when the heights of plurality of higher crests are substantially the same, it is difficult to determine a key pattern position by making use of a crest height as a characteristic quantity, instead by making use of the crest height difference as a characteristic quantity the pattern end position Xs can be specified as a key pattern position.

Figure 65A:
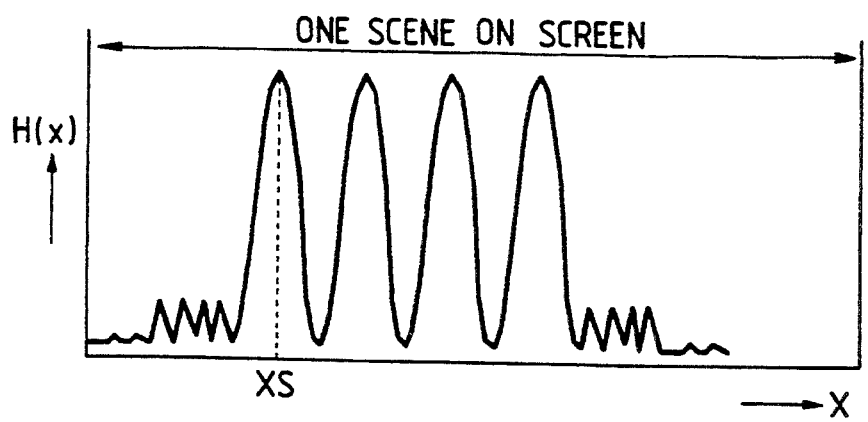
FIG. 65(a), FIG. 65(b) and FIG. 65(c) are three examples of histograms wherein the crest height difference is used as an effective characteristic quantity in the pattern recognition process according to the present invention.
Figure 65B:
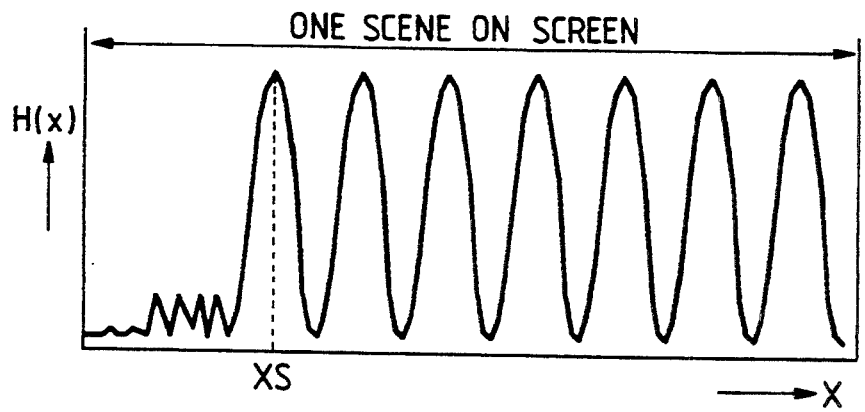

Further, even a scale of one pattern form is wider than one shot scene on the display screen as shown in FIG. 65(b), positioning can be effected by using a pattern end position as a key pattern position.

Figure 65C:
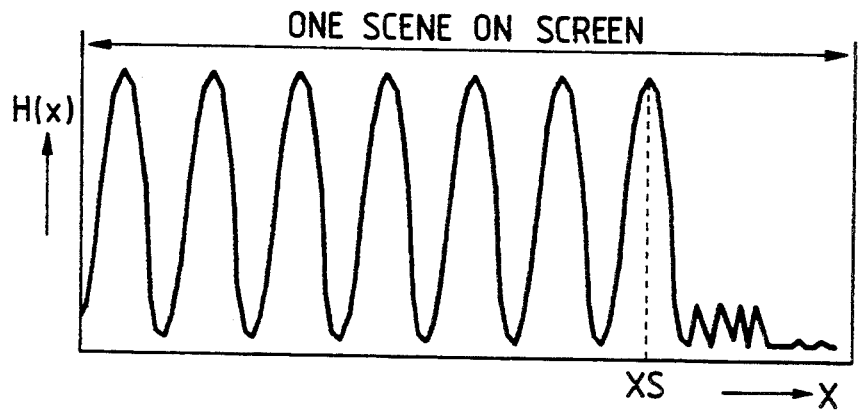

Still further, when a histogram of a pattern form is as shown in FIG. 65(c), a key pattern position can be determined by making use of a crest height difference between a noting crest and an immediately following crest as a characteristic quantity. Which crest immediately before or after a noting crest is to be selected for calculation of the crest height difference is easily determined during teaching stage with reference to magnitudes of their characteristic quantities.

Hereinbelow, other characteristic quantities which can be used for pattern recognition according to the present embodiment are explained.

Figure 66:
FIG. 66 is an example of histograms wherein the crest area is used as an effective characteristic quantity in the pattern recognition process according to the present invention.

(16) Pattern recognition performed by noting a crest area in a histogram:

When heights of plurality of crests in a histogram are substantially the same as illustrated in FIG. 66, no characteristic quantities can be obtained if one notes to a crest height. In such instance, a key pattern position can be specified by making use of a crest area as a characteristic quantity. After calculating the characteristic quantity, the second histogram and the evaluation function are generated to perform a pattern recognition in the same manner as indicated above.

Figure 67:
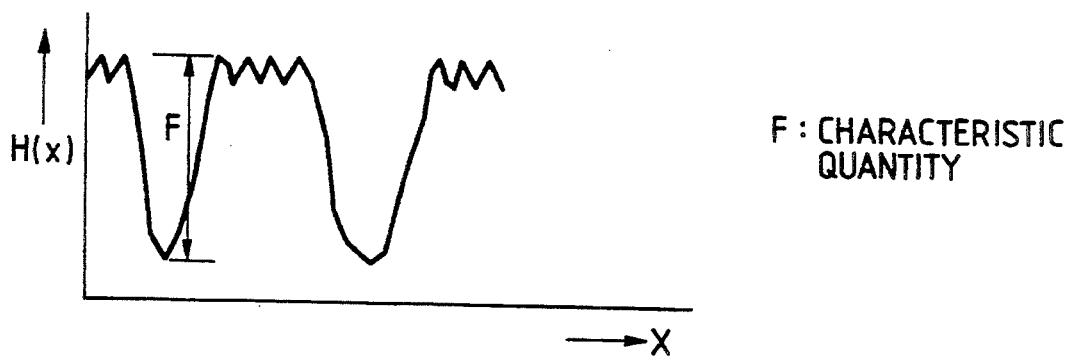
FIG. 67 is an example of histograms wherein the height difference between a crest and a bottom is used as an effective characteristic quantity in the pattern recognition process according to the present invention.

(17) Pattern recognition performed by noting a height difference from a crest to a bottom in a histogram:

When heights and width of a plurality of crests in a histogram are substantially the same as illustrated in FIG. 67, a key pattern position can be specified by making use of a height difference from a crest to a bottom as a characteristic quantity. After calculating the characteristic quantity, the second histogram and the evaluation function are generated to perform a pattern recognition in the same manner as indicated above.

Figure 68:
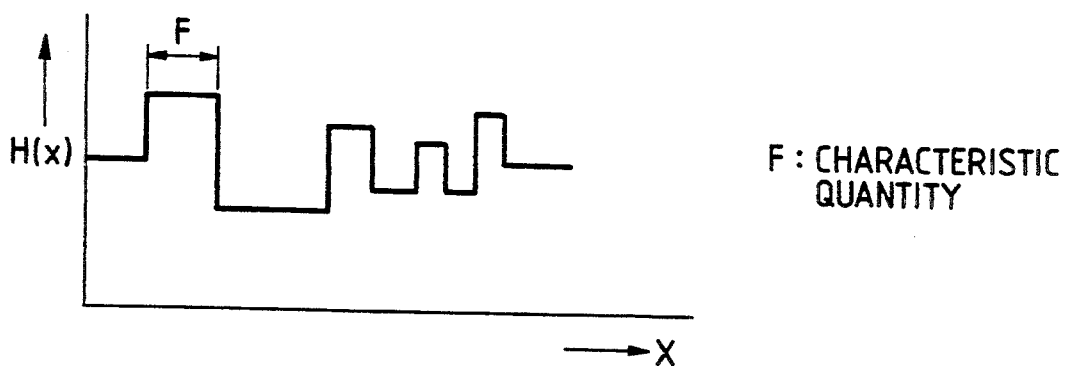
FIG. 68 is an example of histograms wherein the crest width is used as an effective characteristic quantity in the pattern recognition process according to the present invention.

(18) Pattern recognition performed by noting a crest width in a histogram:

When a histogram is a pulse like configration as shown in FIG. 68, a key pattern position can be specified by making use of a crest width as characteristic quantity. After calculating the characteristic quantity, the second histogram and the evaluation function are generated to perform a pattern recognition in the same manner as indicated above.

(19) Automatic selection of characteristic quantity:

In the above pattern recognition schedules (15) through (18), examples of characteristic quantities used for the pattern recognition are explained with reference to histogram configuration, howevers in an actual application judgment which characteristic quantities are to be used for a specific histogram is difficult which can be resolved by selecting an optimum characteristic quantity via automatic analysis of a histogram generated from an object input screen image as explained below.

Figure 69:
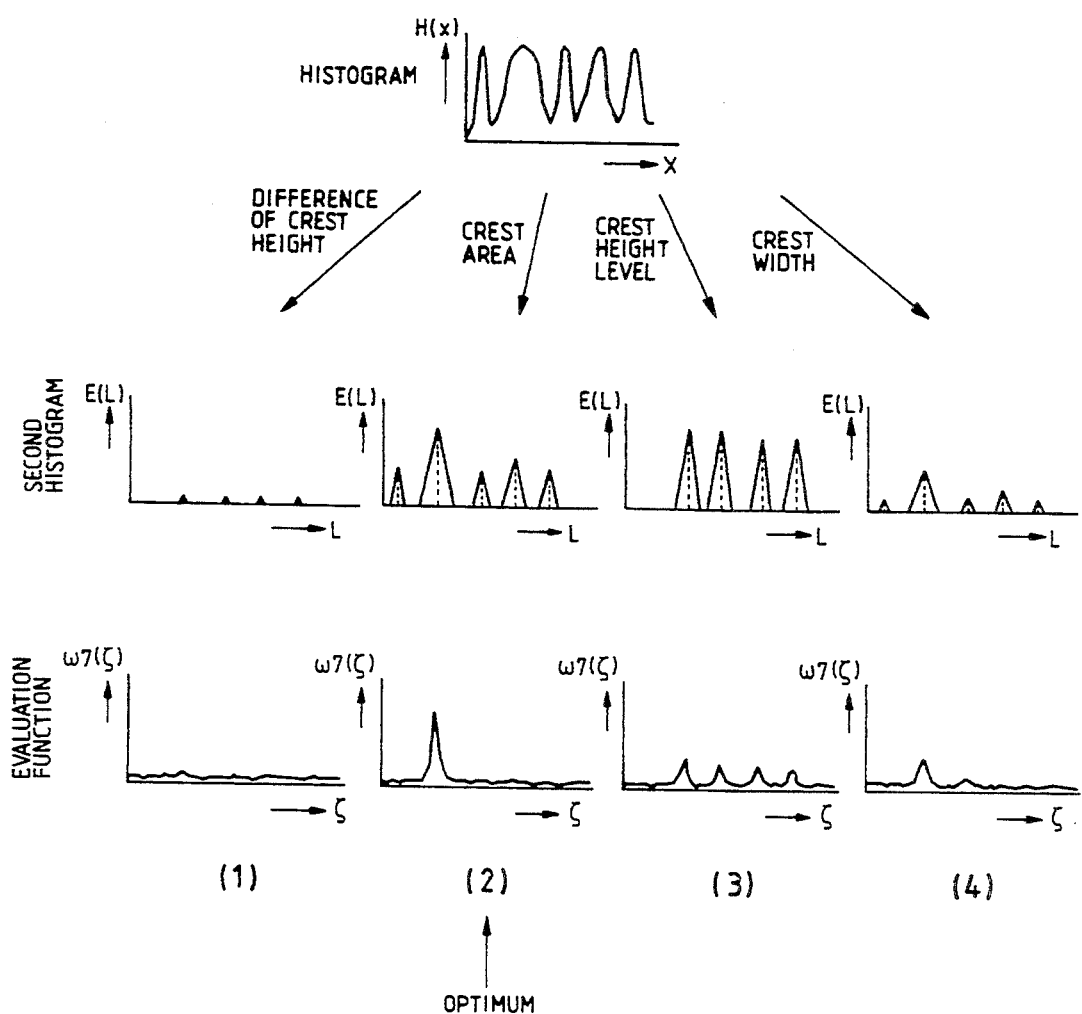
FIG. 69 is a view for explaining an automatic selection of an optimum characteristic quantity in a histogram in the pattern recognition process according to the present invention.

FIG. 47(b) shows in a flow chart an automatic characteristic quantity selection steps according to the present embodiment and FIG. 69 shows a diagram for explaining the automatic characteristic quantity selection wherein a plurality of characteristic quantities are calculated from a common histogram and respective second histograms and evaluation function graphs (1) through (4) are generated based on the respective characteristic quantities, An optimum selection is to select a characteristic quantity of which evaluation function graph includes a sharp and high crest in comparison with other crests. In the present example shown in FIG. 69, the crest area is an optimum characteristic quantity. Further, if necessary, a plurality of shots of scenes of screen image can be taken for analysis in the same way as above to determine an optimum characteristic quantity.

Hereinabove, the embodiments of the present invention are explained, in particular, with reference to cloths having striped pattern and checked pattern. However the present invention is applicable to any pattern recognition and positioning of substances such as semiconductor wafer, metal plate, wood board, paper and leather having a regularly repeating pattern form on the surface thereof without substantial modification of the embodiments of the present invention explained above.

What is claimed is:

1. A pattern recognition method for a substance having a regularly repeating pattern form on the surface thereof comprising the steps of:
inputting the pattern form image for displaying the same on a display screen for teaching;
generating at least one of an X axis concentration accumulated projection histogram and a Y axis concentration accumulated projection histogram from the input screen image at least over one pitch of the regularly repeating pattern form for the teaching;

performing a shading correction on the generated concentration accumulated projection histogram for the teaching;

determining a characteristic quantity and an evaluation function of the shading corrected concentration accumulated projection histogram for the pattern form based on the input screen image and the shading corrected concentration accumulated projection histogram for the teaching;

storing the determined characteristic quantity and the evaluation function for subsequent actual pattern recognition of the pattern form;

further inputting the pattern form image for displaying the same on a display screen for actual pattern recognition;

further generating at least one of an X axis concentration accumulated projection histogram and a Y axis concentration accumulated projection histogram from the input screen image at least over one pitch of the regularly repeating pattern form for the actual pattern recognition;

performing a shading correction on the generated concentration accumulated projection histogram for the actual pattern recognition;

further generating an evaluation function diagram of the shading corrected concentration accumulated projection histogram based on the stored characteristic quantity and the evaluation function during the teaching;

determining a key pattern position on the input screen image of the pattern form based on the generated evaluation function diagram; and applying a predetermined processing on the substance with reference to the determined key pattern position on the input screen image of the pattern form.

2. The pattern recognition method for a substance having a regularly repeating pattern form on the surface thereof according to claim 1, wherein said shading correction includes the steps of:

inputting a no-pattern image for displaying the same on the display screen during the teaching;

generating at least one of an X axis concentration accumulated projection histogram and a Y axis concentration accumulated projection histogram from the input no-pattern image; and correcting shading in the generated concentration accumulated projection histograms of the input screen image of the regularly repeating pattern form during the teaching and the actual pattern recognition based on the generated concentration accumulated projection histograms of the no-pattern image.

3. The pattern recognition method for a substance having a regularly repeating pattern form on the surface thereto according to claim 1, wherein the characteristic quantity includes a pitch distance of the pattern form, the distance from the screen coodinate origin to the position representing a key pattern position in the generated concentration accumulated projection histogram for the teaching, distances between the key pattern position and respective remarkable crests in the generated concentration accumulated projection histogram for the teaching, and the evaluation function at a noting point is defined by an accumulation value obtained by adding respective histogram values at positions having the corresponding distances between the key pattern position and the respective crests from the noting point.

4. The pattern recognition method for a substance having a regularly repeating pattern form on the surface thereof according to claim 1, wherein the characteristic quantity includes a pitch distance of the pattern form, the distance from the screen coordinate origin to the position representing a key pattern position in the generated concentration accumulated projection histogram for the teaching and a predetermined width starting from the key pattern position covering sharp continuous crests having substantially the same height in the generated concentration accumulated projection histogram for the teaching, and the evaluation function at a noting point is defined by an accumulation value obtained by adding respective differentiated histogram absolute values over the predetermined width.

5. The pattern recognition method for a substance having a regularly repeating pattern form on the surface thereof according to claim 1, wherein the characteristic quantity includes a pitch distance of the pattern form, the distance from the screen coordinate origin to the position representing a key pattern position in the generated concentration accumulated projection histogram for the teaching and a predetermined width starting from the key pattern position covering substantially a flat bottom portion in the generated concentration accumulated projection histogram for the teaching, and the evaluation function at a noting point is defined by an accumulation value obtained by adding respective histogram values over the predetermined width.

6. The pattern recognition method for a substance having a regularly repeating pattern form on the surface thereof according to claim 1, wherein the characteristic quantity includes a pitch distance of the pattern form, the distance from the screen coordinate origin to the position representing a key pattern position in the generated concentration accumulated projection histogram for the teaching and a predetermined width starting from the key pattern position covering substantially a flat crest portion in the generated concentration accumulated projection histogram for the teaching, and the evaluation function at a noting point is defined by an accumulation value obtained by adding respective histogram values over the predetermined width.

7. The pattern recognition method for a substance having a regularly repeating pattern form on the surface thereof according to claim 1, wherein the characteristic quantity includes a pitch distance of the pattern form, the distance from the screen coordinate origin to the position representing a key pattern position in the generated concentration accumulated projection histogram for the teaching and a first predetermined width covering substantially a flat bottom portion before the key pattern position and a second predetermined width covering substantially a flat bottom portion after the key pattern position in the generated concentration accumulated projection histogram for the teaching, and the evaluation function at a noting point is defined by an accumulation value obtained by adding respective differentiated histogram absolute values over the predetermined first and second predetermined widths.

8. The pattern recognition method for a substance having a regularly repeating pattern on the surface according to the claim 1, wherein at least either of two X axis concentration accumulated projection histograms or two Y axis concentration accumulated projection histograms for the teaching and the actual pattern recognition each covering separate areas of the input screen image are generated, and further comprises the steps of determining a first provisional key pattern position in accordance with a first generated concentration accumulation projection histogram and a second provisional key pattern position in accordance with a second generated concentration accumulation projection histogram for the actual pattern recognition and further determining the key pattern position on the input screen image of the pattern form in accordance with the determined first and second provisional key pattern positions.

9. The pattern recognition method for a substance having a regularly repeating pattern form on the surface thereof according to claim 1, further comprising the step of displaying the input screen image, the generated concentration accumulated projection histogram and the characteristic quantity in a superposing manner at an identical scale.

10. A pattern recognition device for a substance having a regularly repeating pattern form on the surface thereof comprising:
   means for inputting the pattern form image for displaying the same on a display screen;
   means for generating at least one of an X axis concentration accumulated projection histogram and a Y axis concentration accumulated projection histogram from the input screen image at least over one pitch of the regularly repeating pattern form;
   means for performing a shading correction on the generated concentration accumulated projection histogram;
   means for selecting a characteristic quantity and an evaluation function of the shading corrected concentration accumulated projection histogram for the pattern form based on the input screen image and the shading corrected concentration accumulated projection histogram;
   further means for generating an evaluation function diagram of the shading corrected concentration accumulated projection histogram based on the selected characteristic quantity and the evaluation function;
   means for determining a key pattern position on the input screen image of the pattern form based on the generated evaluation function diagram; and
   means for applying a predetermined processing on the substance with reference to the determined key pattern position on the input screen image.

11. An automatic pattern match cutting device for cutting a cloth having a regularly repeating pattern form on the surface thereof into a predetermined configuration comprising:
   means for inputting the pattern form image of the cloth for displaying the same on a display screen;
   means for generating at least one of an X axis concentration accumulated projection histogram and a Y axis concentration accumulated projection histogram from the input screen image at least over one pitch of the regularly repeating pattern;
   means for performing a shading correction on the generated concentration accumulated projection histogram;
   means for selecting a characteristic quantity and an evaluation function of the shading corrected concentration accumulated projection histogram for the pattern form based on the input screen image and the shading corrected concentration accumulated projection histogram;
   further means for generating an evaluation function diagram of the shading corrected concentration accumulated projection histogram based on the selected characteristic quantity and the evaluation function;
   means for determining a key pattern position on the input screen image of the pattern form based on the generated evaluation function diagram;
   means for cutting the cloth; and,
   means for driving and controlling said cutting means with reference to the key pattern position on the input screen image of the pattern form determined by said determining means so as to cut the cloth into the predetermined configuration.

12. A pattern recognition method for a substance having a regularly repeating pattern form on the surface thereof comprising the steps of:
   inputting the pattern form image for displaying the same on a display screen for teaching;
   generating at least one of a first X axis concentration accumulated projection histogram and a first Y axis concentration accumulated projection histogram from the input screen image at least over one pitch of the regularly repeating pattern form for the teaching;
   performing a shading correction on the generated first concentration accumulated projection histogram for the teaching;
   removing small noises in the shading corrected first concentration accumulated projection histogram for the teaching;
   calculating and selecting a first characteristic quantity of the shading corrected and small noise removed first concentration accumulated rejection histogram optimum for the pattern form for the teaching;
   generating a second concentration accumulation projection histogram based on the calculated first characteristic quantity;
   selecting a second characteristic quantity and an evaluation function of the generated second concentration accumulation projection histogram optimum for the pattern form for the teaching;
   storing the first characteristic quantity, the second characteristic quantity and the selected evaluation function for subsequent actual pattern recognition of the pattern form;
   further inputting the pattern form image for displaying the same on a displaying screen for actual pattern recognition;
   further generating at least one of a first X axis concentration accumulated projection histogram and a first Y axis concentration accumulated projection histogram from the input screen image at least over one pitch of the regularly repeating pattern form for the actual pattern recognition;
   further performing a shading correction on the generated concentration accumulated projection histogram for the actual pattern recognition;
   further removing small noises in the shading corrected first concentration accumulated projection histogram for the actual pattern recognition;
   further calculating the first characteristic quantity of the shading corrected and small noise removed first concentration accumulated projection histogram for the actual pattern recognition;

further generating a second concentration accumulated projection histogram from the calculated first characteristic quantity for the actual pattern recognition;

further generating an evaluation function diagram according to the stored evaluation function from the second concentration accumulated projection histogram based on the stored second characteristic quantity;

determining a key pattern position on the input screen image of the pattern form based on the generated evaluation function diagram;

applying a predetermined processing on the substance with reference to the determined key pattern position on the input screen image of the pattern form.

13. The pattern recognition method for the substance having a regularly repeating pattern form on the surface thereof according to claim 12, wherein said small noise removal from the generated first concentration accumulated projection histogram is performed through a local averaging operation on the values of the generated first concentration accumulated projection histogram throughout thereof.

14. The pattern recognition method for a substance having a regularly repeating pattern form on the surface thereof according to claim 12, wherein the first characteristic quantity includes one of a height difference of two succeeding crests or bottoms, an area of a crest or a bottom, a height difference between succeeding crest and bottom and a width of a crest or a bottom in the generated first concentration accumulated projection histogram, the second characteristic quantity includes a pitch distance of the pattern form, the distance from the screen coordinate origin to the position representing a key pattern position in the generated second concentration accumulated projection histogram for the teaching and distances between the key pattern position and respective remarkable crests in the generated second concentration accumulated projection histogram for the teaching, and the evaluation function at a noting point in the generated second concentration accumulated projection histogram for the actual pattern recognition is defined by an accumulated value obtained by adding respective generated second histogram values at positions having the corresponding distances between the key pattern position and the respective remarkable crests from the noting point.

15. The pattern recognition method for a substance having a regularly repeating pattern form on the surface thereof according to claim 12, wherein the second concentration accumulated projection histogram is generated by adding a predetermined width to the calculated first characteristic quantity determined for the respective positions so as to permit a slight size deviation of the pattern form during the teaching and during the actual pattern recognition.

16. The pattern recognition method for a substance having a regularly repeating pattern form on the surface thereof according to claim 12, further comprising a step of displaying the input screen image and the generated first and second concentration accumulated projection histogram in a superposing manner at an dientical scale.

17. The pattern recognition method for a substance having a regularly repeating pattern form on the surface thereof according to claim 12, wherein in said first characteristic quantity calculating and selecting step the position associated with the first characteristic quantity is determined by selecting an intermediate position of a crest or bottom width in the generated first concentration accumulated projection histogram.

18. A pattern recognition device for a substance having a regularly repeating pattern form on the surface thereof comprising:

means for inputting the pattern form image for displaying the same on a display screen;

means for generating at least one of a first X axis concentration accumulated projection histogram and a first Y axis concentration accumulated projection histogram from the input screen image at least over one pitch of the regularly repeating pattern form;

means for performing a shading correction on the generated first concentration accumulated projection histogram;

means for removing small noises in the shading corrected first concentration accumulated projection histogram;

means for calculating and selecting a first characteristic quantity of the shading corrected and small noise removed first concentration accumulated projection histogram optimum for the pattern form;

means for generating a second concentration accumulation projection histogram based on the calculated first characteristic quantity;

means for determining a second characteristic quantity and an evaluation function relating to the generated second concentration accumulated projection histogram optimum for the pattern form;

further means for generating an evaluation function diagram according to the predetermined evaluation function from the second concentration accumulated projection histogram based on the predetermined second characteristic quantity;

means for determining a key pattern position on the input screen image of the pattern form based on the generated evaluation function diagram; and means for applying a predetermined processing on the substance with reference to the determined key pattern position on the input screen image.

19. An automatic pattern match cutting device for cutting a cloth having a regularly repeating pattern form on the surface thereof into a predetermined configuration comprising:

means for inputting the pattern form image of the cloth for displaying the same on a display screen;

means for generating at least one of first X axis concentration accumulated projection histogram and first Y axis concentration accumulated projection histogram from the input screen image at least over one pitch of the regularly repeating pattern form;

means for performing a shading correction on the generated first concentration accumulated projection histogram;

means for removing small noises in the shading corrected first concentration accumulated projection histogram;

means for calculating and selecting a first characteristic quantity of the shading corrected and small noise removed first concentration accumulated projection histogram optimum for the pattern form;

means for generating a second concentration accumulation projection histogram based on the first calculated characteristic quantity;

means for determining a second characteristic quantity and an evaluation function relating to the generated second concentration accumulated projection histogram optimum for the pattern form;
further means for generating an evaluation function diagram according to the predetermined evaluation function from the second concentration accumulated projection histogram based on the predetermined second characteristic quantity;

means for determining a key pattern position on the input screen image of the pattern form based on the generated evaluation function diagram;
means for cutting the cloth; and
means for driving and controlling said cutting means with reference to the key pattern position on the input screen image of the pattern form determined by said determining means so as to cut the cloth into the predetermined configuration.

* * * * *

UNITED STATES PATENT AND TRADEMARK OFFICE
CERTIFICATE OF CORRECTION

PATENT NO. : 5,412,578
DATED : 2 May 1995
INVENTOR(S) : Yoichi TAKAGI et al

It is certified that error appears in the above-identified patent and that said Letters Patent is hereby corrected as shown below:

| Column | Line | Corrections |
|--------|------|-------------|
| 1 | 8 | Before "pattern" insert --a--. |
| 1 | 50 | Change "JP-A-4-240261" to --JP-A-4-240260-- |
| 2 | 18 | Change "noises" to --noise--. |
| 2 | 35 | Change "determined" to --determine--. |
| 2 | 59 | Change "acumulated" to --accumulated--. |
| 3 | 38 | Change "of which" to --whereby the--. |
| 3 | 43 | Change "at same" to --at the same--. |
| 4 | 4 | Before "depth" insert --the--. |
| 5 | 9 | After "is" change "a" to --an--. |
| 7 | 50 | Before "eighth" change "a" to --an--. |

UNITED STATES PATENT AND TRADEMARK OFFICE
CERTIFICATE OF CORRECTION

PATENT NO. : 5,412,578
DATED : 2 May 1995
INVENTOR(S) : Yoichi TAKAGI et al It is certified that error appears in the above-identified patent and that said Letters Patent is hereby corrected as shown below:

| Column | Line | Corrections |
|---|---|---|
| 8 | 33 | Change "an" to --a--. |
| 8 | 34 | Change "a" to --an--. |
| 10 | 58 | Change "a" to --an--. |
| 13 | 2 | Change "as well as" to --and--. |
| 13 | 3 | After "can" insert --also--. |
| 16 | 42 | Delete entire line. |
| 16 | 43 | Delete "histogram". |
| 17 | 27 | Change "$Y_s$" to --$y_s$--. |
| 17 | 28 | Change "$Y_s$" to --$y_s$--. |
| 18 | 6 | Change "YS" to --yS--. |

UNITED STATES PATENT AND TRADEMARK OFFICE
CERTIFICATE OF CORRECTION

PATENT NO. : 5,412,578

DATED : 2 May 1995

INVENTOR(S) : Yoichi TAKAGI et al

It is certified that error appears in the above-identified patent and that said Letters Patent is hereby corrected as shown below:

| Column | Line | Corrections |
|---|---|---|
| 18 | 46 | Change "c1=xQ.yP-xP.yQ" to --c1=xQ·yP-xP·yQ--. |
| 18 | 47 | Change "c2=xS.yR-xR.yS" to --c2=xS·yR-xR·yS--. |
| 19 | 11 | Before "striped" delete "a". |
| 19 | 19 | Change "reside" to --resides--. |
| 20 | 32 | Change "are" to --is--. |
| 20 | 44 | After "Therefore" insert --,--. |
| 20 | 45 | Before "performed" insert --is--; after "throughout" delete "is". |
| 20 | 50 | Delete "noises" (first occurrence). |

UNITED STATES PATENT AND TRADEMARK OFFICE
CERTIFICATE OF CORRECTION

PATENT NO. : 5,412,578

DATED : 2 May 1995

INVENTOR(S) : Yoichi TAKAGI et al

It is certified that error appears in the above-identified patent and that said Letters Patent is hereby corrected as shown below:

| Column | Line | Corrections |
|---|---|---|
| 20 | 53 | Change "...H1)}" to --...H1(i+1)}--. |
| 20 | 56 | Change "H(i+1)" to --H1(i+1)--. |
| 21 | 55 | Change "<=" to --≦--. |
| 22 | 65 | Change "formular" to --formula--. |
| 24 | 27 | Change "howevers" to --however,--. |
| 24 | 28 | After "cation" insert --,--; after "judgment" insert --as to --. |
| 24 | 29 | Change "which" to --but--. |
| 24 | 33 | After "chart" delete "an". |
| 24 | 41 | After "quantities" change "," to --.--. |

UNITED STATES PATENT AND TRADEMARK OFFICE
CERTIFICATE OF CORRECTION

PATENT NO. : 5,412,578
DATED : 2 May 1995
INVENTOR(S) : Yoichi TAKAGI et al Page 5 of 5

It is certified that error appears in the above-identified patent and that said Letters Patent is hereby corrected as shown below:

| Column | Line | Corrections |
|--------|------|-------------|
| 24 | 42 | Before "evaluation" insert --the--. |
| 28 | 36 | Change "rejection" to --projection--. |
| 29 | 63 | Change "dientical" to --identical--. |

Signed and Sealed this

Ninth Day of April, 1996

*Attest:*

BRUCE LEHMAN

*Attesting Officer*     Commissioner of Patents and Trademarks